United States Patent
Ishida et al.

(10) Patent No.: US 8,041,122 B2
(45) Date of Patent: Oct. 18, 2011

(54) IMAGE PROCESSING APPARATUS, METHOD FOR CONTROLLING IMAGE PROCESSING APPARATUS, AND STORAGE MEDIUM STORING RELATED PROGRAM

(75) Inventors: Yoshihiro Ishida, Yokohama (JP); Xiaoyan Dai, Yokohama (JP); Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 11/871,796

(22) Filed: Oct. 12, 2007

(65) Prior Publication Data
US 2008/0137961 A1 Jun. 12, 2008

(30) Foreign Application Priority Data

Dec. 12, 2006 (JP) ................................ 2006-335070

(51) Int. Cl.
*G06K 9/48* (2006.01)

(52) U.S. Cl. ....................................... 382/197; 382/199

(58) Field of Classification Search .................. 382/173, 382/190, 197, 199, 284
See application file for complete search history.

(56) References Cited

U.S. PATENT DOCUMENTS

| 5,878,161 | A | 3/1999 | Ishida et al. |
| 6,404,921 | B1 | 6/2002 | Ishida |
| 2005/0238244 | A1 | 10/2005 | Uzawa |
| 2007/0230809 | A1 | 10/2007 | Ishida |

FOREIGN PATENT DOCUMENTS

| JP | 4-157578 A | 5/1992 |
| JP | 5-174140 A | 7/1993 |
| JP | 7-121699 A | 5/1995 |
| JP | 08-214306 A | 8/1996 |
| JP | 2005-346137 A | 12/2005 |
| JP | 2006-107290 A | 4/2006 |

*Primary Examiner* — Daniel Mariam
(74) *Attorney, Agent, or Firm* — Canon U.S.A. Inc., I.P. Division

(57) ABSTRACT

An image processing apparatus can generate a vector sequence representing each color region of a color image. The image processing apparatus divides the image into plural regions based on attribute information of the image, and extracts region boundary information relating to a boundary line between different regions. The image processing apparatus generates inter-edge point vector data for each boundary connecting a first edge point to a second edge point corresponding to intersections of boundaries between neighboring regions, based on the extracted region boundary information. The image processing apparatus identifies one or more inter-edge point vector data representing a boundary of each divided region based on the generated inter-edge point vector data, and generates individual region vector data.

12 Claims, 51 Drawing Sheets

| REGION NUMBER | REGION VALUE | |
|---|---|---|
| 1 | $(R_1, G_1, B_1)$ | ～201 |
| 2 | $(R_2, G_2, B_2)$ | |
| 3 | $(R_3, G_3, B_3)$ | |
| 4 | $(R_4, G_4, B_4)$ | |
| 5 | $(R_5, G_5, B_5)$ | |

FIG.4

HORIZONTAL BOUNDARY POINT TABLE 401

| HORIZONTAL BOUNDARY POINT COORDINATES | NEIGHBORING REGION NUMBER | |
|---|---|---|
| ⋮ | ⋮ | ⋮ |
| B : (10, 20) | 1 | 2 |
| ⋮ | ⋮ | ⋮ |
| A : (14, 15) | 1 | 2 |
| ⋮ | ⋮ | ⋮ |
| C : (22, 40) | 2 | 3 |
| ⋮ | ⋮ | ⋮ |
| E : (38, 40) | 2 | 3 |
| ⋮ | ⋮ | ⋮ |
| D : (54, 10) | 1 | 4 |
| ⋮ | ⋮ | ⋮ |
| H : (64, 58) | 1 | 5 |
| ⋮ | ⋮ | ⋮ |
| I : (64, 66) | 1 | 5 |
| ⋮ | ⋮ | ⋮ |

VERTICAL BOUNDARY POINT TABLE 402

| VERTICAL BOUNDARY POINT COORDINATES | NEIGHBORING REGION NUMBER | |
|---|---|---|
| ⋮ | ⋮ | ⋮ |
| D : (54, 10) | 1 | 4 |
| ⋮ | ⋮ | ⋮ |
| A : (14, 15) | 1 | 2 |
| ⋮ | ⋮ | ⋮ |
| B : (10, 20) | 1 | 2 |
| ⋮ | ⋮ | ⋮ |
| C : (22, 40) | 1 | 2 |
| ⋮ | ⋮ | ⋮ |
| E : (38, 40) | 2 | 4 |
| ⋮ | ⋮ | ⋮ |
| H : (64, 58) | 1 | 5 |
| ⋮ | ⋮ | ⋮ |
| I : (64, 66) | 1 | 5 |
| ⋮ | ⋮ | ⋮ |

DIAGONAL BOUNDARY POINT TABLE 403

| DIAGONAL BOUNDARY POINT COORDINATES | NEIGHBORING REGION NUMBER | |
|---|---|---|
| ⋮ | ⋮ | ⋮ |
| A : (14, 15) | 1 | 2 |
| ⋮ | ⋮ | ⋮ |
| B : (10, 20) | 1 | 2 |
| ⋮ | ⋮ | ⋮ |
| J : (10, 28) | 1 | 2 |
| ⋮ | ⋮ | ⋮ |
| C : (22, 40) | 1 | 2 |
| ⋮ | ⋮ | ⋮ |
| K : (18, 15) | 1 | 2 |
| ⋮ | ⋮ | ⋮ |
| H : (64, 58) | 1 | 5 |
| ⋮ | ⋮ | ⋮ |
| I : (64, 66) | 1 | 5 |
| ⋮ | ⋮ | ⋮ |

FIG.5

HORIZONTAL BOUNDARY POINT TABLE 401

| HORIZONTAL BOUNDARY POINT COORDINATES | NEIGHBORING REGION NUMBER | |
|---|---|---|
| ...... | ...... | ...... |
| B : (10, 20) | 1 | 2 |
| A : (14, 15) | 1 | 2 |
| C : (22, 40) | 2 | 3 |
| E : (38, 40) | 2 | 3 |
| D : (54, 10) | 1 | 4 |
| H : (64, 58) | 1 | 5 |
| I : (64, 66) | 1 | 5 |
| ...... | ...... | ...... |

VERTICAL BOUNDARY POINT TABLE 402

| VERTICAL BOUNDARY POINT COORDINATES | NEIGHBORING REGION NUMBER | |
|---|---|---|
| ...... | ...... | ...... |
| D : (54, 10) | 1 | 4 |
| A : (14, 15) | 1 | 2 |
| B : (10, 20) | 1 | 2 |
| C : (22, 40) | 1 | 2 |
| E : (38, 40) | 2 | 4 |
| H : (64, 58) | 1 | 5 |
| I : (64, 66) | 1 | 5 |
| ...... | ...... | ...... |

DIAGONAL BOUNDARY POINT TABLE 403

| DIAGONAL BOUNDARY POINT COORDINATES | NEIGHBORING REGION NUMBER | |
|---|---|---|
| ...... | ...... | ...... |
| A : (14, 15) | 1 | 2 |
| B : (10, 20) | 1 | 2 |
| J : (10, 28) | 1 | 2 |
| C : (22, 40) | 1 | 2 |
| K : (18, 15) | 1 | 2 |
| H : (64, 58) | 1 | 5 |
| I : (64, 66) | 1 | 5 |
| ...... | ...... | ...... |

FIG.6

| INTERSECTION | NEIGHBORING REGION NUMBER |
|---|---|
| C : (22, 40) | 1, 2, 3 |
| E : (38, 40) | 2, 3, 4 |
| F : (44, 24) | 1, 2, 4 |
| G : (50, 56) | 1, 3, 4 |
| H : (64, 58) | 1, 5 |
| I : (64, 66) | 1, 5 |

~601

INPUT LINE IMAGE
(BINARY IMAGE)

THINNED LINE IMAGE
(BY HILDITCH)

EDGE POINT (INTERSECTION)
DETECTION & INTER-EDGE POINT
CONTOUR (SURROUNDING)
VECTOR EXTRACTION RESULT

INTER-EDGE POINT LINE
CORE (SURROUNDING)
VECTOR SEQUENCE

INTER-EDGE POINT AUXILIARY
VECTOR INCLUSION (SURROUNDING)
VECTOR SEQUENCE

INTER-EDGE POINT SMOOTHED
VECTOR SEQUENCE

CASE 0

CASE 1

CASE 2

CASE 3

FIG.18
CASE 6
UP_RIGHT
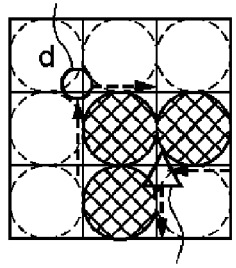
LEFT DOWN
UP_RIGHT
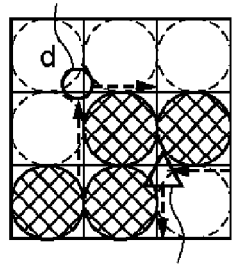
LEFT DOWN
UP_RIGHT
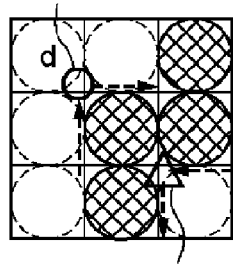
LEFT DOWN
UP_RIGHT
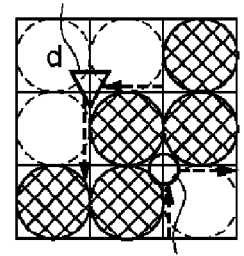
LEFT_DOWN

FIG.19

CASE 8

CASE 9

FIG.22
CASE 10
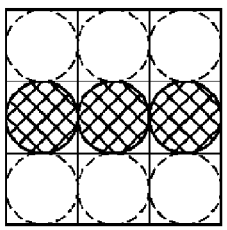 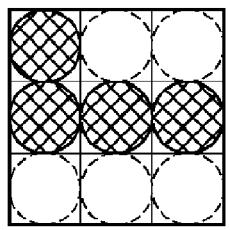 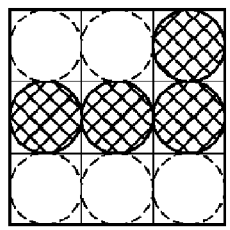 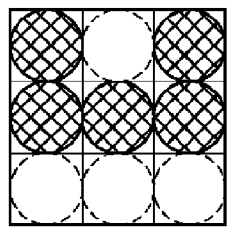
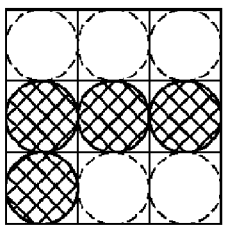 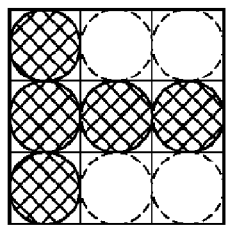 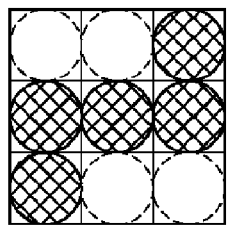 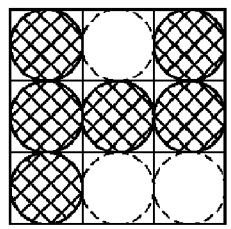
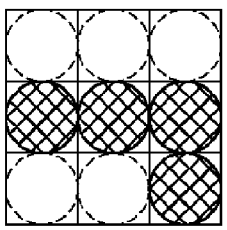 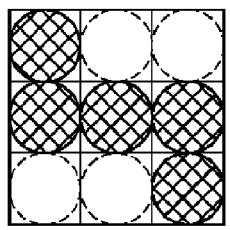 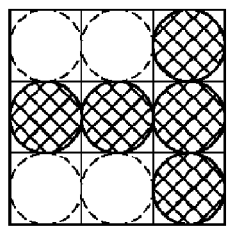 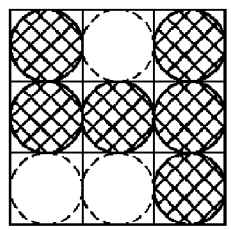
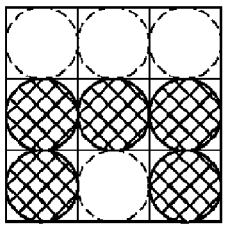 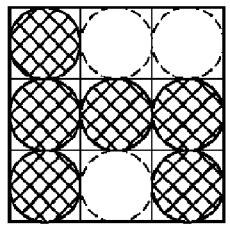 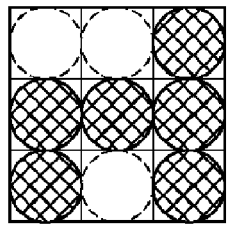

FIG.26
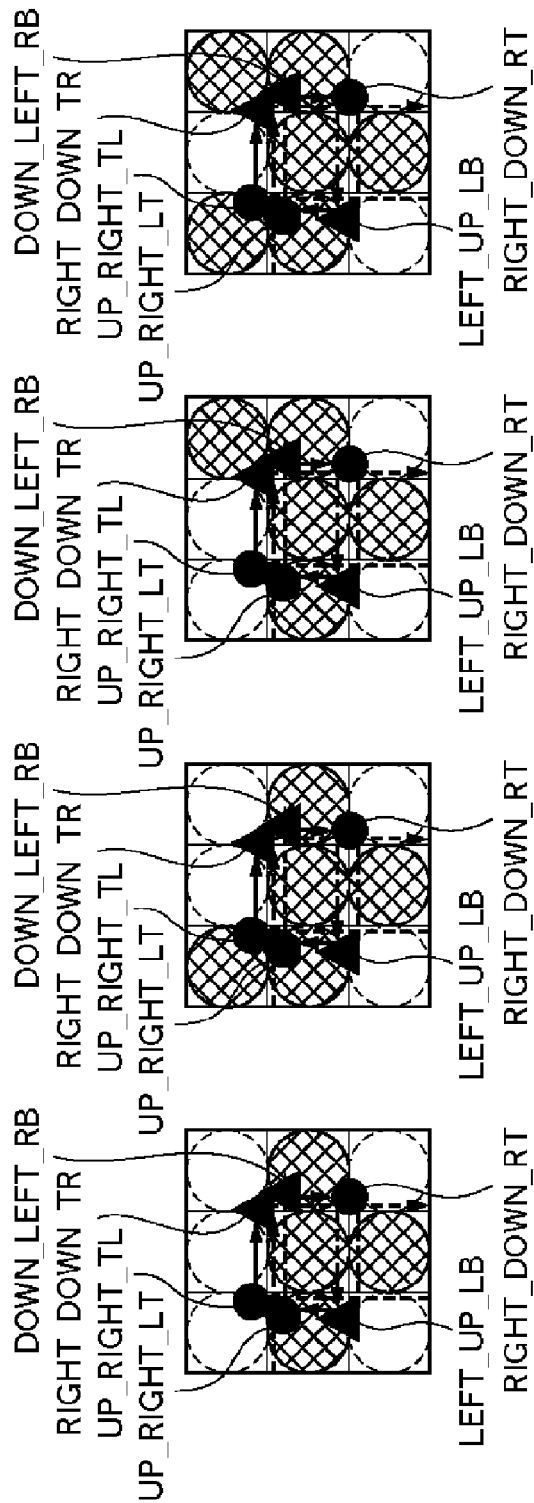
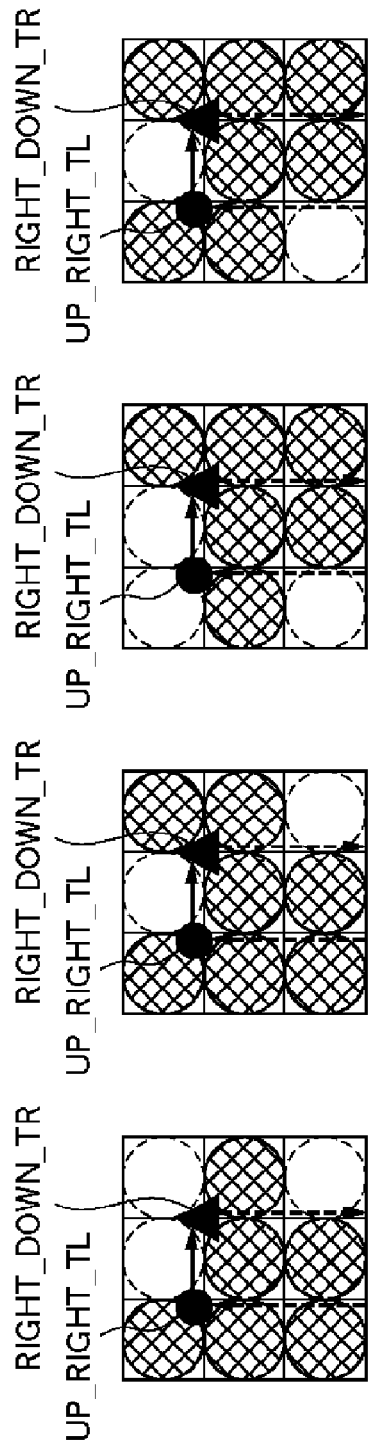
CASE 14

FIG.28

| NO. | CONTOUR POINT INFORMATION | EDGE POINT INFORMATION | VALUE | HORIZONTAL(0) VERTICAL(1) | UPWARD(0) DOWNWARD(1) | RIGHTWARD(0) LEFTWARD(1) | NON-SELECTED(0) SELECTED(1) | EDGE POINT(1) NON-EDGE POINT(0) |
|---|---|---|---|---|---|---|---|---|
| 01. | UP_RIGHT_TL | (Top Left) | 01H | 0 | 0 | 0 | 0 | 1 |
| 02. | UP_RIGHT | | 02H | 0 | 0 | 0 | 1 | 0 |
| 03. | UP_RIGHT_LT | (Left Top) | 03H | 0 | 0 | 0 | 1 | 1 |
| 04. | UP_LEFT | | 06H | 0 | 0 | 1 | 1 | 0 |
| 05. | DOWN_RIGHT | | 0aH | 0 | 1 | 0 | 1 | 0 |
| 06. | DOWN_LEFT_BR | (Bottom Right) | 0dH | 0 | 1 | 1 | 0 | 1 |
| 07. | DOWN_LEFT | | 0eH | 0 | 1 | 1 | 1 | 0 |
| 08. | DOWN_LEFT_RB | (Right Bottom) | 0fH | 0 | 1 | 1 | 1 | 1 |
| 09. | RIGHT_UP | | 12H | 1 | 0 | 0 | 1 | 0 |
| 10. | LEFT_UP_LB | (Left Bottom) | 15H | 1 | 0 | 1 | 0 | 1 |
| 11. | LEFT_UP | | 16H | 1 | 0 | 1 | 1 | 0 |
| 12. | LEFT_UP_BL | (Bottom Left) | 17H | 1 | 0 | 1 | 1 | 1 |
| 13. | RIGHT_DOWN_RT | (Right Top) | 19H | 1 | 1 | 0 | 0 | 1 |
| 14. | RIGHT_DOWN | | 1aH | 1 | 1 | 0 | 1 | 0 |
| 15. | RIGHT_DOWN_TR | (Top Right) | 1bH | 1 | 1 | 0 | 1 | 1 |
| 16. | RIGHT_DOWN | | 1eH | 1 | 1 | 1 | 1 | 0 |

UP_RIGHT_TL    RIGHT_DOWN_TR

UP_RIGHT_LT

LEFT_UP_LB

RIGHT_DOWN_RT

DOWN_LEFT_RB

LEFT_UP_BL    RIGHT_LEFT_BR

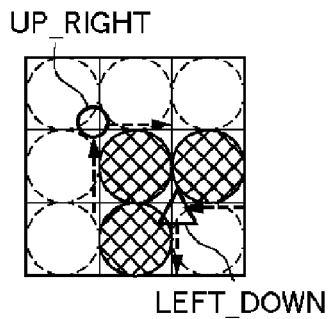
FIG.30A
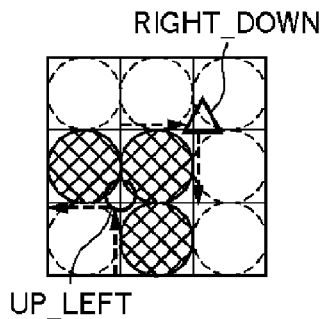
FIG.30B
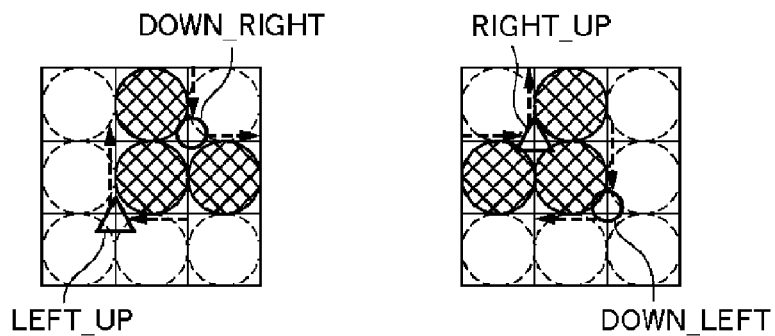
FIG.30C  FIG.30D
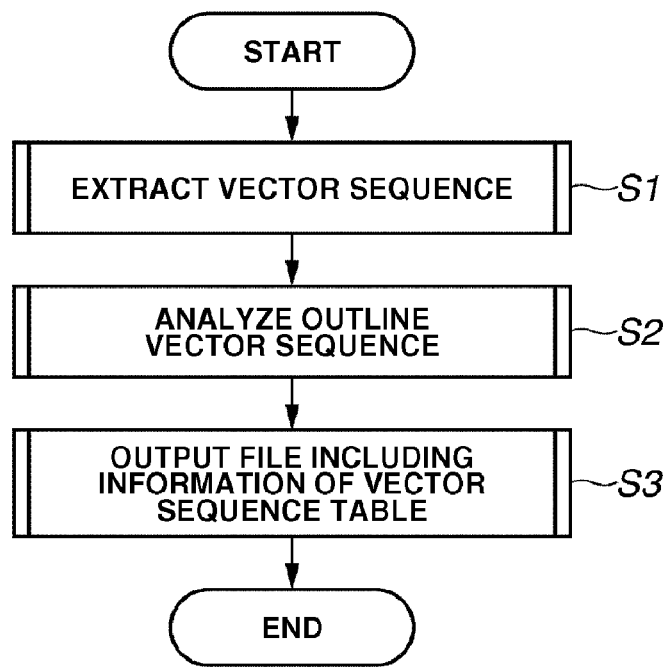
FIG.31A

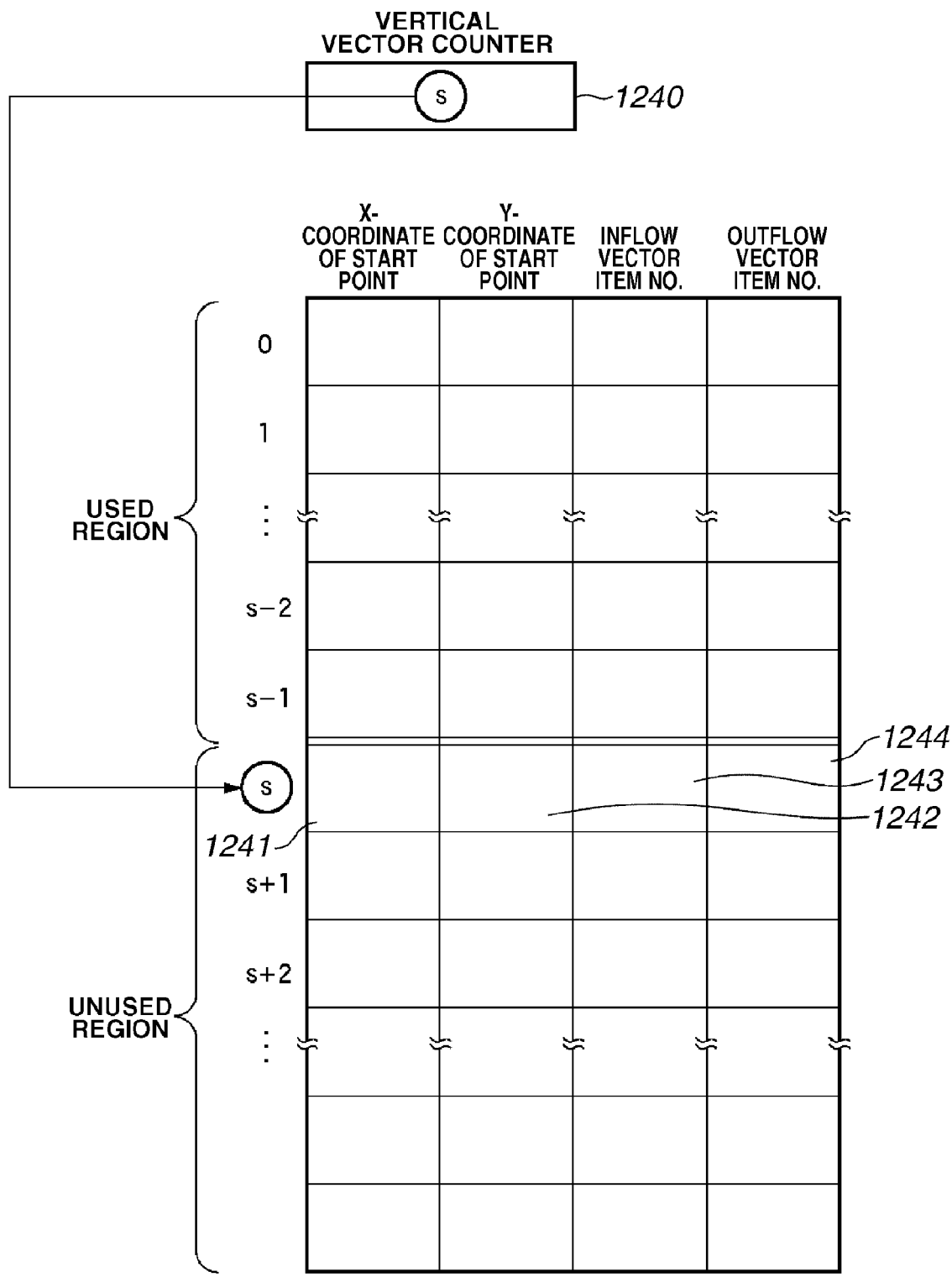

| TOTAL NUMBER a OF CONTOUR LINES IN IMAGE |
|---|

1ST CONTOUR:

| TOTAL NUMBER b OF POINTS ON 1ST CONTOUR LINE |
|---|
| X-COORDINATE AND Y-COORDINATE OF 1ST POINT — 1ST POINT |
| CONTOUR POINT INFORMATION (ALLOCATION INFORMATION) OF 1ST POINT |
| X-COORDINATE AND Y-COORDINATE OF 2ND POINT — 2ND POINT |
| CONTOUR POINT INFORMATION (ALLOCATION INFORMATION) OF 2ND POINT |
| ⋮ |
| X-COORDINATE AND Y-COORDINATE OF b-TH POINT — b-TH POINT |
| CONTOUR POINT INFORMATION (ALLOCATION INFORMATION) OF b-TH POINT |

2ND CONTOUR:

| TOTAL NUMBER c OF POINTS ON 2ND CONTOUR LINE |
|---|
| X-COORDINATE AND Y-COORDINATE OF 1ST POINT — 1ST POINT |
| CONTOUR POINT INFORMATION (ALLOCATION INFORMATION) OF 1ST POINT |
| ⋮ |
| X-COORDINATE AND Y-COORDINATE OF c-TH POINT — c-TH POINT |
| CONTOUR POINT INFORMATION (ALLOCATION INFORMATION) OF c-TH POINT |

⋮ a-TH CONTOUR:

| TOTAL NUMBER d OF POINTS ON a-TH CONTOUR LINE |
|---|
| X-COORDINATE AND Y-COORDINATE OF 1ST POINT — 1ST POINT |
| CONTOUR POINT INFORMATION (ALLOCATION INFORMATION) OF 1ST POINT |
| ⋮ |
| X-COORDINATE AND Y-COORDINATE OF d-TH POINT — d-TH POINT |
| CONTOUR POINT INFORMATION (ALLOCATION INFORMATION) OF d-TH POINT |

FIG.39A

| s-TH VECTOR SEQUENCE | | |
|---|---|---|
| TOTAL NUMBER v ON s-TH CONTOUR LINE | | |
| CLOSED LOOP MARKER 1 (-1, -1) | } START/END EDGE POINT INFORMATION | |
| CLOSED LOOP MARKER 2 (-1, -1) | | |
| X-COORDINATE AND Y-COORDINATE OF 1ST POINT | } 1ST POINT | } LINE ELEMENT VECTOR PORTION (POINT SEQUENCE CONSTITUTING CLOSED LOOP) |
| X-COORDINATE AND Y-COORDINATE OF 2ND POINT | } 2ND POINT | |
| ⋮ | ⋮ | |
| X-COORDINATE AND Y-COORDINATE OF v-TH POINT | } v-TH POINT | |

FIG.39B

| u-TH VECTOR SEQUENCE | | |
|---|---|---|
| TOTAL NUMBER (t+r) IN u-TH VECTOR SEQUENCE | | |
| X-COORDINATE AND Y-COORDINATE OF START EDGE POINT P0 | } START/END EDGE POINT INFORMATION | |
| X-COORDINATE AND Y-COORDINATE OF END EDGE POINT Pn | | |
| X-COORDINATE AND Y-COORDINATE OF 1ST POINT | } 1ST POINT | } LINE ELEMENT VECTOR PORTION (START EDGE POINT TO END EDGE POINT) |
| X-COORDINATE AND Y-COORDINATE OF 2ND POINT | } 2ND POINT | |
| ⋮ | ⋮ | |
| X-COORDINATE AND Y-COORDINATE OF t-TH POINT | } t-TH POINT | |
| X-COORDINATE AND Y-COORDINATE OF (t+1)-TH POINT | } (t+1)-TH POINT | } AUXILIARY VECTOR PORTION (START EDGE POINT TO END EDGE POINT) |
| ⋮ | ⋮ | |
| X-COORDINATE AND Y-COORDINATE OF (t+r)-TH POINT | } (t+r)-TH POINT | |

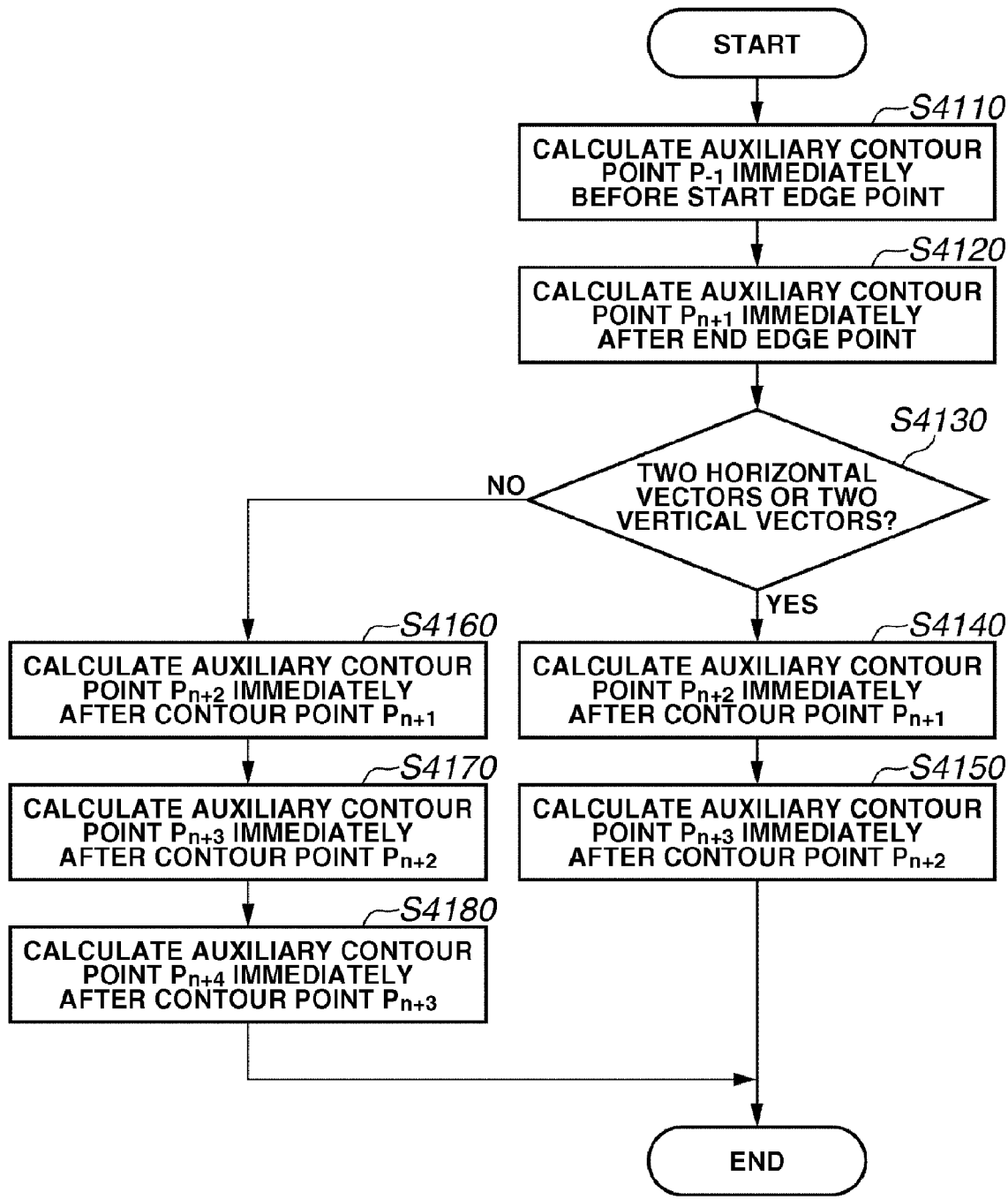

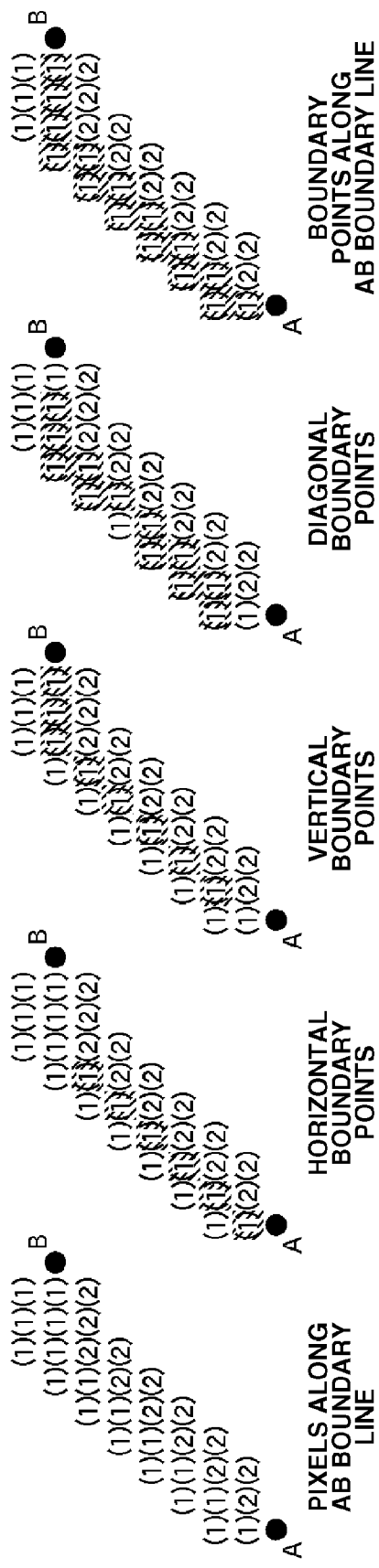

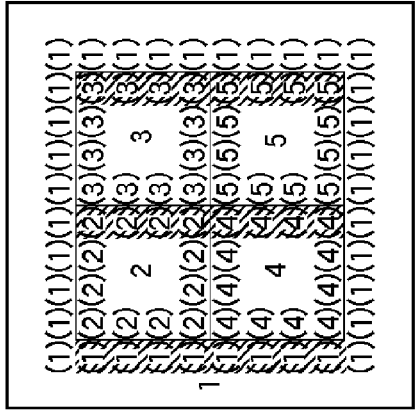
FIG.51C HORIZONTAL BOUNDARY POINTS
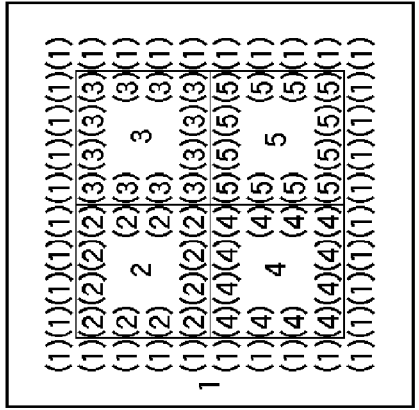
FIG.51B PIXELS ALONG BOUNDARY LINES
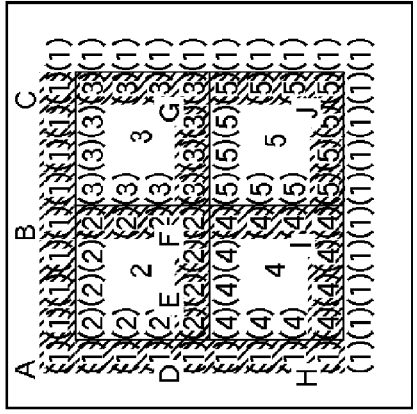
FIG.51F ALL BOUNDARY POINTS
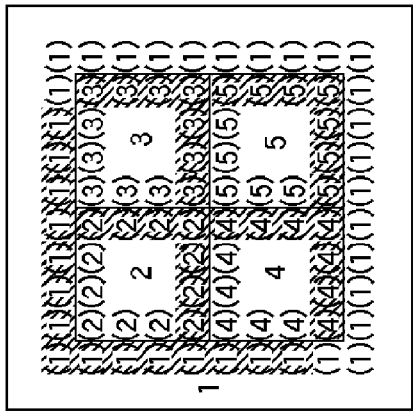
FIG.51E DIAGONAL BOUNDARY POINTS
FIG.51A RESULT OF REGION DIVISION
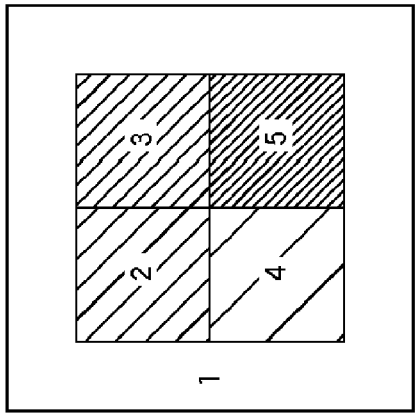
FIG.51D VERTICAL BOUNDARY POINTS

FIG.53A

HORIZONTAL BOUNDARY POINT TABLE

| COORDINATES | NEIGHBORING REGION NUMBER |
|---|---|
| ... | ... |
| D : (Xd, Yd) | 1 | 2 |
| F : (Xf, Yf) | 2 | 3 |
| G : (Xg, Yg) | 3 | 1 |
| H : (Xh, Yh) | | 4 |
| I : (Xi, Yi) | 4 | 5 |
| J : (Xj, Yj) | 5 | 1 |
| ... | ... |

VERTICAL BOUNDARY POINT TABLE

| COORDINATES | NEIGHBORING REGION NUMBER |
|---|---|
| ... | ... |
| B : (Xb, Yb) | 1 | 2 |
| C : (Xc, Yc) | 1 | 3 |
| E : (Xe, Ye) | 2 | 4 |
| F : (Xf, Yf) | 2 | 4 |
| G : (Xg, Yg) | 3 | 5 |
| I : (Xi, Yi) | 4 | 1 |
| J : (Xj, Yj) | 5 | 1 |
| ... | ... |

DIAGONAL BOUNDARY POINT TABLE

| COORDINATES | NEIGHBORING REGION NUMBER |
|---|---|
| ... | ... |
| A : (Xa, Ya) | | 2 |
| B : (Xb, Yb) | 1 | 3 |
| D : (Xd, Yd) | 1 | 4 |
| E : (Xe, Ye) | 2 | 4 |
| F : (Xf, Yf) | 2 | 5 |
| G : (Xg, Yg) | 3 | 1 |
| I : (Xi, Yi) | 4 | 1 |
| J : (Xj, Yj) | 5 | 1 |
| ... | ... |

BOUNDARY POINT TABLE

FIG.53B

| INTERSECTION | NEIGHBORING REGION NUMBER |
|---|---|
| B : (Xb, Yb) | 1, 2, 3 |
| D : (Xd, Yd) | 1, 2, 4 |
| F : (Xf, Yf) | 2, 3, 4, 5 |
| G : (Xg, Yg) | 1, 3, 5 |
| I : (Xi, Yi) | 1, 4, 5 |

INTERSECTION TABLE

FIG.53C

INTERSECTION DIAGRAM

IMAGE PROCESSING APPARATUS, METHOD FOR CONTROLLING IMAGE PROCESSING APPARATUS, AND STORAGE MEDIUM STORING RELATED PROGRAM

BACKGROUND OF THE INVENTION

1. Field of the Invention

The present invention relates to an image processing apparatus configured to generate a vector sequence representing a color image, a method for controlling the image processing apparatus, and a storage medium storing a related control program.

2. Description of the Related Art

The vector processing technique is conventionally used to process an image, such as fonts for a word processor. The font processing technique includes inputting a sophisticated character design as an object of the vector processing. For example, a conventional technique can digitize an analog character design into a binary image of a relatively large size equivalent to 512×512 or 1024×1024 pixels and generate a vector sequence representing a contour of the character. In general, vector data can realize a smooth contour expression of a character in various sizes and can keep good shape of the character. Furthermore, various sizes of characters can be simply generated from the same vector data without requiring a large amount of data.

Therefore, as discussed in U.S. Pat. No. 5,878,161 (corresponding to Japanese Patent Application Laid-Open No. 5-174140), the vector processing can be applied not only to fonts but also other binary images.

The vector data is numerical data, such as coordinate values, which can be easily edited by a computer. For example, as discussed in U.S. Patent Publication No. 2007/0230809 A1, it is useful to apply vector processing to the line art (line image). As discussed in Japanese Patent Application Laid-Open No. 7-121699, vector processing can be applied to a full-color image. U.S. Pat. No. 6,404,921 (corresponding to Japanese Patent Application Laid-Open No. 4-157578) discusses vector processing applied to a binary image.

The method discussed in U.S. Pat. No. 6,404,921 includes a step of designating predetermined position as a point constituting a contour line based on the state of a target pixel and its neighboring pixels, and a step of determining a connecting direction of points constituting the contour line based on the state of neighboring pixels. Furthermore, the method includes steps of determining a connection state between one and other points constituting the contour line, updating the position of the target pixel on image data in a raster scanning order, and executing the above-described processing based on the state of neighboring pixels for each target pixel, to extract contour points.

The method further includes steps of extracting a target pixel in a raster scanning order while maintaining the state of the target pixel and its neighboring pixels on the image data, detecting inter-pixel vectors in the horizontal direction and the vertical direction based on the state of the target pixel and its neighboring pixels, determining a connection state of these inter-pixel vectors, and extracting a contour of image data based on the determined connection state of the inter-pixel vectors.

The method discussed in U.S. Pat. No. 6,404,921 can extract all contour lines involved in an image upon finishing a single complete operation of raster scanning. An image memory is not required to store all image data. Thus, a small image memory can be used. This method is characterized in that a contour line is extracted in the units of the periphery of a pixel, not the central position of a pixel, of an input image. Thus, the method is effective for a thin line having a one-pixel width.

As discussed in U.S. Patent Application Publication No. US 2005/0238244 A1 (corresponding to Japanese Patent Application Laid-Open No. 2005-346137), it is useful to express contour information of a binary image using the 2-order or 3-order Bezier curve approximation in addition to straight lines. A processing method and a processing apparatus using the function approximation of the contour information can reduce the amount of data expressing a high quality variable power image.

Furthermore, it is useful to extract outline vectors from a binary image according to the method discussed in U.S. Pat. No. 6,404,921 and applying function approximation discussed in U.S. Pat. No. 5,878,161 to the extracted outline vectors. The obtained smoothed outline vectors can form a high-quality digital binary image of a desired (arbitrary) magnification.

However, the conventional color image vector processing relies on the steps of determining a region of pixels having the same color attribute determined on the color space of an input image (i.e., a same color region composed of same color pixels) and generating a vector sequence constituting a contour shape of each determined same color region.

However, if the contour of each region is subjected to Bezier function approximation or smoothing processing, a clearance or an overlap may appear along the boundary of regions because the contours of neighboring regions on the input image may not be subjected to the same approximation or smoothing processing. FIG. 57 illustrates an example of contour shapes extracted for an input image, according to which serially joined pixels having the same color defined on the color space constitute the same region. There are three color regions adjacent to each other on the input image, if the background color is neglected.

FIG. 58 illustrates a clearance and an overlap between two regions which have been generated by the smoothing (function approximation) processing applied to the vectors constituting a contour shape of each region.

SUMMARY OF THE INVENTION

Exemplary embodiments of the present invention are directed to an image processing apparatus configured to generate a vector sequence representing each region from a color image composed of plural color regions. Furthermore, exemplary embodiments of the present invention provide a method for controlling the image processing apparatus and a storage medium storing a related control program.

According to an aspect of the present invention, an image processing apparatus is configured to execute processing for generating a vector sequence representing an image. The image processing apparatus includes a dividing unit configured to divide the image into a plurality of regions based on attribute information of the image, an extracting unit configured to extract region boundary information relating to a boundary line between regions divided by the dividing unit, an intersection information generating unit configured to identify intersections of different boundaries of the divided regions based on the region boundary information extracted by the extracting unit, an inter-edge point vector generating unit configured to generate inter-edge point vector data for each boundary connecting edge points corresponding to the intersections identified by the intersection information generating unit, and an individual region vector generating unit configured to generate vector data of each region divided by the dividing unit based on the inter-edge point vector data generated by the inter-edge point vector generating unit.

Exemplary embodiments of the present invention provide an image processing apparatus capable of appropriately generating a vector sequence representing each region from a color image composed of plural color regions. Furthermore, exemplary embodiments of the present invention provide a method for controlling the image processing apparatus and a storage medium storing a related control program.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 4 illustrates examples of boundary point tables according to the first exemplary embodiment of the present invention.

FIG. 5 illustrates identified intersections of boundary lines according to the first exemplary embodiment of the present invention.

FIG. 6 illustrates an example of an intersection table according to the first exemplary embodiment of the present invention.

FIGS. 12-27 illustrate examples of extraction patterns of a contour point and contour point information depending on the state of the target pixel and neighboring pixels in inter-edge point contour (surrounding) vector sequence extracting processing according to the first exemplary embodiment of the present invention.

FIG. 28 illustrates a table of contour point information according to the first exemplary embodiment of the present invention.

FIGS. 30A through 30D illustrate contour points extracted from non-edge point portions and contour point information allocated to these contour points according to the first exemplary embodiment of the present invention.

FIG. 31A is a flowchart illustrating inter-edge point contour (surrounding) vector extracting processing according to the first exemplary embodiment of the present invention.

FIG. 31C illustrates an example of vector sequence extracting processing according to the first exemplary embodiment of the present invention.

FIG. 32 illustrates an example of a data format for an inter-edge point surrounding vector sequence and contour point information according to the first exemplary embodiment of the present invention.

FIGS. 39A and 39B illustrate examples of a data format for an inter-edge point auxiliary vector inclusion (surrounding) vector sequence and an inter-edge point smoothed vector sequence according to the first exemplary embodiment of the present invention.

FIG. 40 is a flowchart illustrating details of the processing in step S4100 of FIG. 38 according to the first exemplary embodiment of the present invention.

FIGS. 50A through 50E illustrate examples of an extracted boundary line according to the first exemplary embodiment of the present invention.

FIGS. 51A through 51F illustrate generation of a boundary line image according to the first exemplary embodiment of the present invention.

FIGS. 53A through 53C illustrate examples of intersections extracted from the region division result according to the first exemplary embodiment of the present invention.

DETAILED DESCRIPTION OF THE EMBODIMENTS

Figure 1:
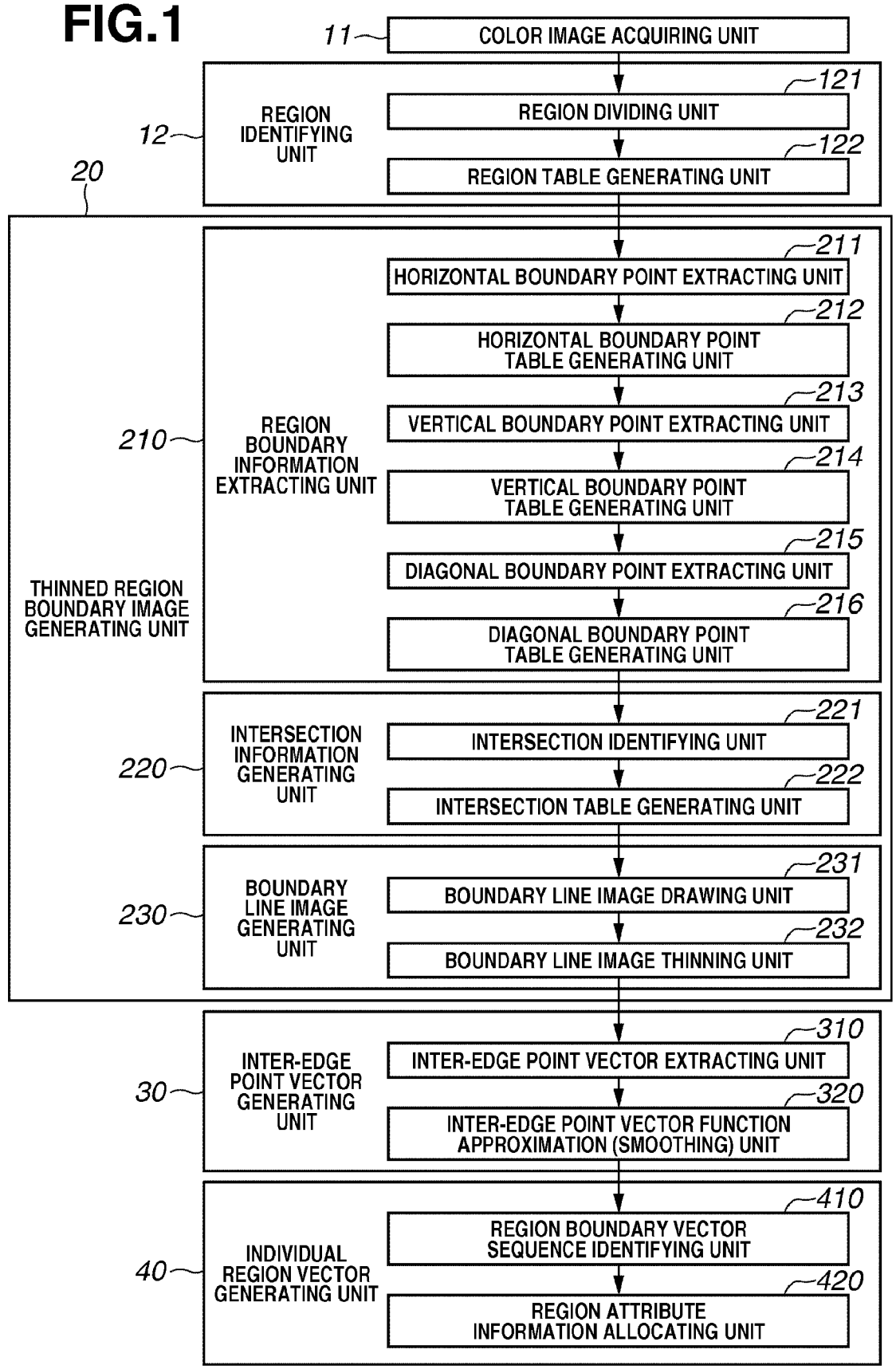
FIG. 1 is a block diagram illustrating a functional configuration of an image processing apparatus according to a first exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

Exemplary embodiments of the present invention are directed to a technique capable of adequately generating a vector sequence representing a contour of a region on an image without generating undesirable clearances or overlaps, even when the contours of the regions are subjected to the function approximation processing or smoothing processing. Exemplary embodiments of the present invention are directed to vector processing applied to an illustration image having a smaller number of colors compared to a color image, such as a natural image captured by a digital camera or the like.

The vector described in each exemplary embodiment represents vector data (i.e., data expressed using a numerical formula or a drawing command used in the generation of bitmap image data). Furthermore, the processing for converting vector image data into bitmap image data is referred to as "rasterization." The bitmap image data can be referred to as "raster data." The vector data may be simply referred to as "vector."

First Exemplary Embodiment

FIG. 1 is a block diagram illustrating a functional configuration of an image processing apparatus according to a first exemplary embodiment of the present invention. In FIG. 1, a color image acquiring unit 11 acquires a processing object image (i.e., an input). A region identifying unit 12 divides an image acquired by the color image acquiring unit 11 into partial regions. Each partial region is a same color region composed of pixels being geometrically connected each other. If two pixels have feature quantities (e.g., RGB values or other color information) within a predetermined range, it is determined that these pixels constitute the same color region.

Figures 2, 3:
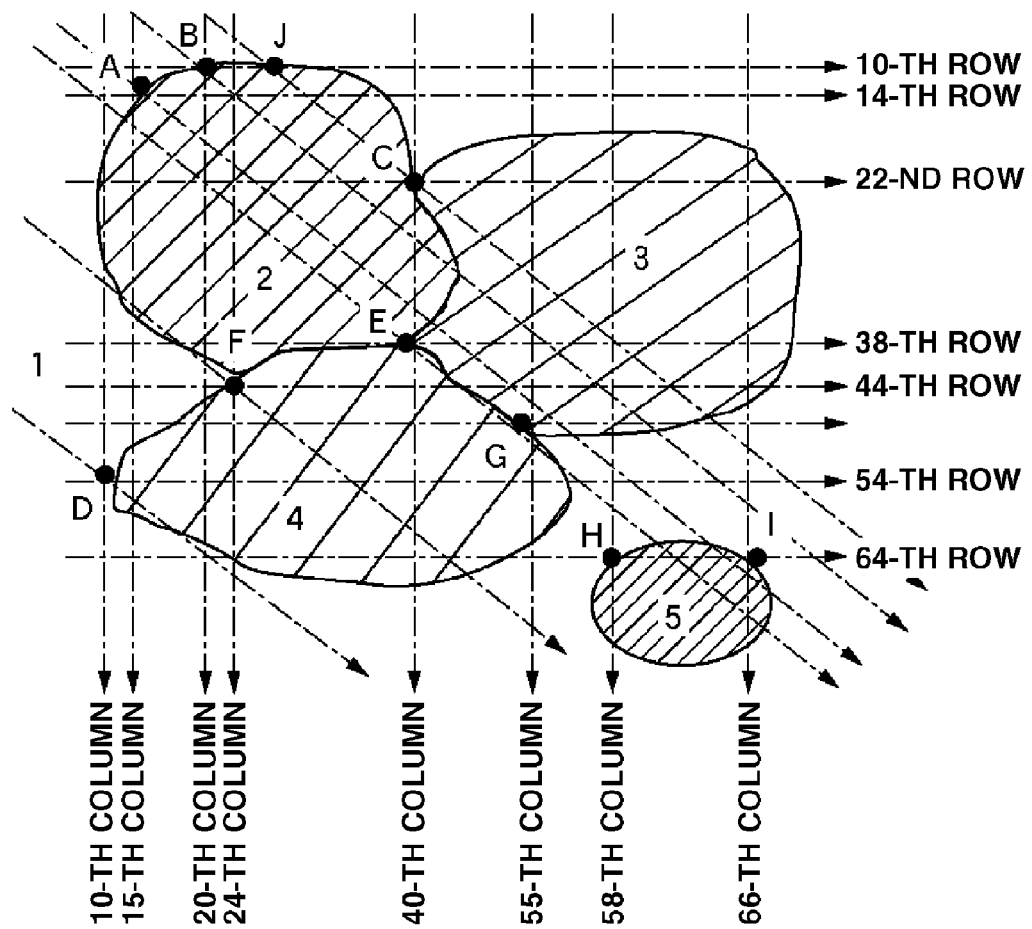
FIG. 2 illustrates an example of a region table indicating a relationship between a region number and color information (attribute information) according to the first exemplary embodiment of the present invention.
FIG. 3 illustrates boundary point extracting processing according to the first exemplary embodiment of the present invention.

The region identifying unit 12 includes a region dividing unit 121 and a region table generating unit 122. The region dividing unit 121 divides an image into a plurality of assemblies of pixels based on color information. Each geometrically connected assembly of pixels can be regarded as a same color region. The region table generating unit 122 generates information correlating each region obtained from the region dividing unit 121 and color information (attribute information (e.g., RGB values)) relating to this region. FIG. 2 illustrates an exemplary table format (a region table 201).

A thinned region boundary image generating unit 20 generates a thinned region boundary image with a thin line having a width of one pixel that represents a region boundary between neighboring regions identified by the region identifying unit 12. The thinned region boundary image generating unit 20 includes a region boundary information extracting unit 210, an intersection information generating unit 220, and a boundary line image generating unit 230.

The region boundary information extracting unit 210 extracts boundary pixels representing a region boundary between the regions identified by the region identifying unit 12 and region boundary information indicating the regions divided by the boundary pixels.

The intersection information generating unit 220 generates intersection information that indicates an intersection of region boundary lines corresponding to a branch point of a region boundary line constituted by four-serially joined region boundary pixels. In other words, the intersection information generating unit 220 generates intersection information indicating intersections of mutually different boundaries. The boundary line image generating unit 230 generates a thinned region boundary image based on the extracted region boundary information and the generated intersection information.

The region boundary information extracting unit 210 includes a horizontal boundary point extracting unit 211, a horizontal boundary point table generating unit 212, a vertical boundary point extracting unit 213, a vertical boundary point table generating unit 214, a diagonal boundary point extracting unit 215, and a diagonal boundary point table generating unit 216.

The horizontal boundary point extracting unit 211 extracts a pixel representing a boundary between neighboring regions on each scanning line when the horizontal scanning operation is applied to a region identification result image including partial regions identified by the region identifying unit 12 each of which is composed of serially joined pixels and can be regarded as a same color region, for example, as illustrated in FIG. 3. Namely, the horizontal boundary point extracting unit 211 extracts a pixel where a partial region is switched to another partial region in the horizontal direction.

The horizontal boundary point table generating unit 212 generates a horizontal boundary point table 401 illustrated in FIG. 4 that includes information relating to each point (pixel) of horizontal boundary points extracted by the horizontal boundary point extracting unit 211.

The vertical boundary point extracting unit 213 extracts a pixel representing a boundary between neighboring regions on each scanning line when the vertical scanning operation is applied to a region identification result image including partial regions identified by the region identifying unit 12 each of which is composed of serially joined pixels and can be regarded as a same color region, for example, as illustrated in FIG. 3. Namely, the vertical boundary point extracting unit 213 extracts a pixel where a partial region is switched to another partial region in the vertical direction.

The vertical boundary point table generating unit 214 generates a vertical boundary point table 402 illustrated in FIG. 4 that includes information relating to each point (pixel) of vertical boundary points extracted by the vertical boundary point extracting unit 213.

The diagonal boundary point extracting unit 215 extracts a pixel representing a boundary between neighboring regions on each scanning line when the diagonal scanning operation is applied to a region identification result image including partial regions identified by the region identifying unit 12 each of which is composed of serially joined pixels and can be regarded as a same color region, for example, as illustrated in FIG. 3. Namely, the diagonal boundary point extracting unit 215 extracts a pixel where a partial region is switched to another partial region in the diagonal direction.

The diagonal boundary point table generating unit 216 generates a diagonal boundary point table 403 illustrated in FIG. 4 that includes information relating to each point (pixel) of diagonal boundary points extracted by the diagonal boundary point extracting unit 215.

The intersection information generating unit 220 includes an intersection identifying unit 221 and an intersection table generating unit 222.

The intersection identifying unit 221 generates intersection information with reference to the horizontal boundary point table 401, the vertical boundary point table 402, and the diagonal boundary point table 403 illustrated in FIG. 4.

More specifically, as illustrated in FIG. 5, the intersection identifying unit 221 detects any boundary point having a combination of neighboring region numbers in one table which does not completely agree with a combination of neighboring region numbers in another table, among boundary points listed on at least two of the tables 401 to 403. The intersection identifying unit 221 identifies the detected boundary point as an intersection (intersection information). According to the example illustrated in FIG. 5, the intersection identifying unit 221 identifies two boundary points C and E as intersections.

The intersection table generating unit 222 picks up all of the region numbers corresponding to the intersections identified by the intersection identifying unit 221 from the neighboring region numbers listed on the tables to which the detected intersections belong. Then, the intersection table generating unit 222 generates an intersection table 601 illustrated in FIG. 6 that stores each intersection associated with region numbers of all neighboring regions.

The boundary line image generating unit 230 includes a boundary line image drawing unit 231 and a boundary line image thinning unit 232.

The boundary line image drawing unit 231 generates a boundary line image composed of four-jointed region boundary pixels based on the generated region boundary information and the generated intersection information. The boundary line image thinning unit 232 performs thinning processing on the obtained boundary line image while maintaining the four-serially joined state and generates a four-serially joined thinned region boundary image.

For example, the boundary line image thinning unit 232 performs binary image thinning processing on a four-serially joined boundary line image (binary image) constituted by region boundary pixels generated by the boundary line image drawing unit 231 and outputs a four-serially joined thinned region boundary image as a four-serially joined thinned binary image.

As a method for thinning a binary image, the boundary line image thinning unit 232 can use the Hilditch technique which is, for example, discussed in Koich Sakai: "fundamentals and applications of digital image processing," 2nd edition, ISBN4-7898-3707-6, CQ publishing, PP51-54, Feb. 1, 2004).

Figure 7A:
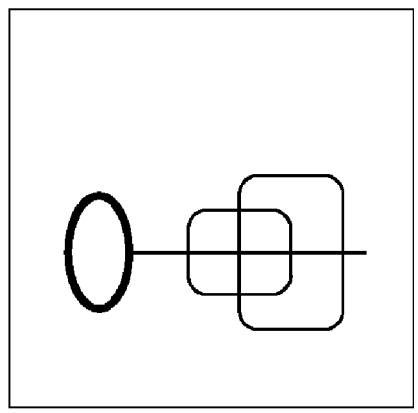
FIGS. 7A through 7F illustrate vector sequence generation processing for forming a line image according to the first exemplary embodiment of the present invention.
Figure 7B:
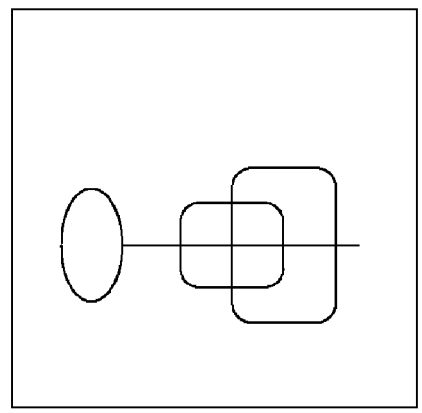

As an example, if the boundary line image thinning unit 232 inputs a binary image illustrated in FIG. 7A, the boundary line image thinning unit 232 outputs a thinned image illustrated in FIG. 7B.

Referring back to FIG. 1, an inter-edge point vector generating unit 30 inputs the four-serially joined thinned region boundary image from the thinned region boundary image generating unit 20 and generates an assembly of inter-edge point vectors connecting intersections (edge points) for each four-serially joined thin line connecting one intersection and another intersection.

The inter-edge point vector generating unit 30 includes an inter-edge point vector extracting unit 310 and an inter-edge point vector function approximation (smoothing) unit 320.

The inter-edge point vector extracting unit 310 inputs the four-serially joined thinned region boundary image and extracts, as an inter-edge point vector connecting intersections (edge points), a line core vector passing a central position of each pixel representing each thin line connecting the edge points for each four-serially joined thin line connecting one intersection and another intersection.

The inter-edge point vector function approximation (smoothing) unit 320 applies function approximation processing to the extracted inter-edge point vector so that an edge point portion can be reserved as an edge point. More specifically, the inter-edge point vector function approximation (smoothing) unit 320 performs the Bezier function approximation that can reserve an edge point portion as an anchor point of a Bezier curve, and generates a function approximated (smoothed) inter-edge point vector.

Figure 8:
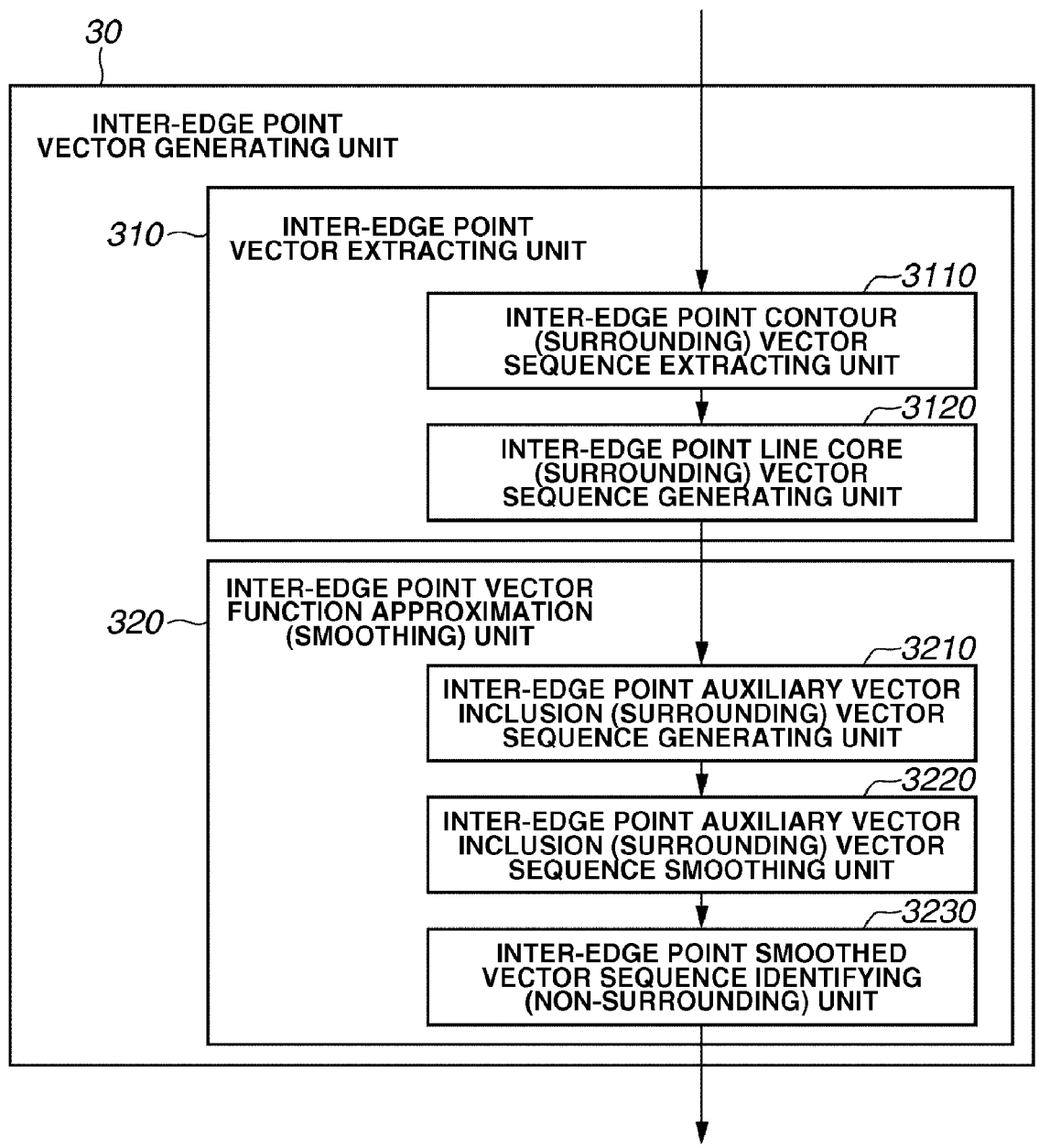
FIG. 8 is a block diagram illustrating a detailed functional configuration of an inter-edge point vector generating unit according to the first exemplary embodiment of the present invention.

The inter-edge point vector extracting unit 310 includes an inter-edge point contour (surrounding) vector sequence extracting unit 3110 and an inter-edge point line core (surrounding) vector sequence generating unit 3120, as illustrated in FIG. 8.

The inter-edge point contour (surrounding) vector sequence extracting unit 3110 inputs a thinned region boundary image that maintains a four-serially joined state. Next, by performing the raster scanning only one time, the inter-edge point contour (surrounding) vector sequence extracting unit 3110 extracts an assembly of sequential vectors corresponding to independent lines and closed curves connecting edge points and intersections (hereinafter, referred to as "inter-edge point line element coarse contour vector sequence") from a line graphic involved in the thinned binary image of a processing object. Then, the inter-edge point contour (surrounding) vector sequence extracting unit 3110 generates the result of processing.

The processing result generated from the inter-edge point contour (surrounding) vector sequence extracting unit 3110 includes "allocation information" that indicates whether each vector constituting a vector sequence has been extracted from a portion corresponding to an edge point (intersection) position of the line graphic of the processing object.

Furthermore, the inter-edge point line core (surrounding) vector sequence generating unit 3120 inputs the allocation information and the inter-edge point line element coarse contour vector sequence (hereinafter, collectively referred to as "inter-edge point contour (surrounding) vector sequence") from the inter-edge point contour (surrounding) vector sequence extracting unit 3110. Then, the inter-edge point line core (surrounding) vector sequence generating unit 3120 finely adjusts the position of each vector constituting the contour (surrounding) vector having a one-pixel width by the width equivalent to a half of a pixel in a suitable direction, with reference to the allocation information, according to the predetermined rule. Thus, the inter-edge point line core (surrounding) vector sequence generating unit 3120 can generate an inter-edge point line core (surrounding) vector sequence having a line width of 0.

Figure 7C:
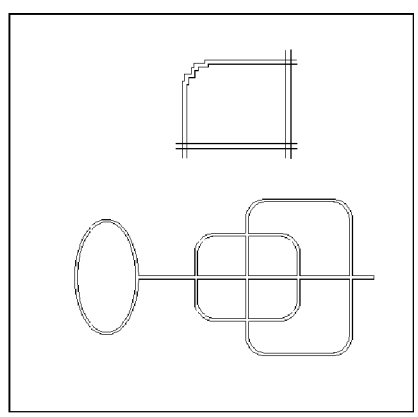
Figure 7D:
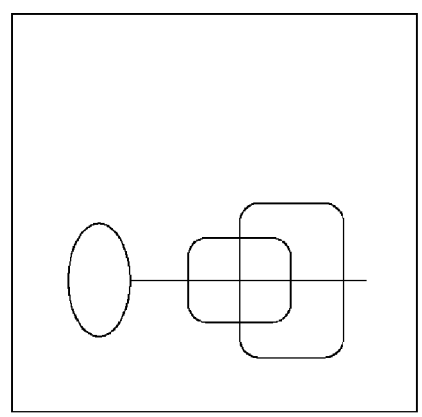

FIG. 7C illustrates a contour image visualized from the inter-edge point contour (surrounding) vector sequence generated by the inter-edge point contour (surrounding) vector sequence extracting unit 3110 that has input the binary image of FIG. 7B. FIG. 7D illustrates a line image visualized from the inter-edge point line core (surrounding) vector sequence generated by the inter-edge point line core (surrounding) vector sequence generating unit 3120 that has input the image of FIG. 7C.

The inter-edge point vector function approximation (smoothing) unit 320 includes an inter-edge point auxiliary vector inclusion (surrounding) vector sequence generating unit 3210, an inter-edge point auxiliary vector inclusion (surrounding) vector sequence smoothing unit 3220, and an inter-edge point smoothed vector sequence identifying (non-surrounding) unit 3230, as illustrated in FIG. 8.

The inter-edge point auxiliary vector inclusion (surrounding) vector sequence generating unit 3210 inputs an inter-edge point line core (surrounding) vector sequence from the inter-edge point line core (surrounding) vector sequence generating unit 3120, and inserts auxiliary vectors to prevent a vector corresponding to the edge point portion from being integrated with another vector. In other words, this processing can prevent the position of any edge point from becoming unclear when the inter-edge point auxiliary vector inclusion (surrounding) vector sequence smoothing unit 3220 performs smoothing (function approximation) processing. Namely, the inter-edge point auxiliary vector inclusion (surrounding) vector sequence generating unit 3210 inserts auxiliary vectors so that an edge point portion can be reserved as an edge point (i.e., anchor point of a Bezier curve), and generates an inter-edge point auxiliary vector inclusion (surrounding) vector sequence.

In addition, the inter-edge point auxiliary vector inclusion (surrounding) vector sequence generating unit 3210 generates start/end edge point information that indicates a vector corresponding to an edge point portion, for each inter-edge point auxiliary vector inclusion (surrounding) vector sequence that includes auxiliary vectors.

Figure 7E:
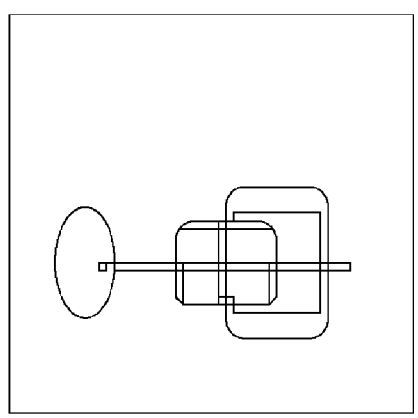

FIG. 7E illustrates a line image visualized from the inter-edge point auxiliary vector inclusion (surrounding) vector sequence generated from the inter-edge point auxiliary vector inclusion (surrounding) vector sequence generating unit 3210 that has input the image of FIG. 7D.

The inter-edge point auxiliary vector inclusion (surrounding) vector sequence smoothing unit 3220 inputs the inter-edge point auxiliary vector inclusion (surrounding) vector sequence from the inter-edge point auxiliary vector inclusion (surrounding) vector sequence generating unit 3210. Then, the inter-edge point auxiliary vector inclusion (surrounding) vector sequence smoothing unit 3220 applies smoothing (function approximation) processing to each (surrounding) vector and generates a smoothed inter-edge point auxiliary vector inclusion (surrounding) vector sequence. Furthermore, the inter-edge point auxiliary vector inclusion (surrounding) vector sequence smoothing unit 3220 outputs the generated smoothed inter-edge point auxiliary vector inclusion (surrounding) vector sequence to the inter-edge point smoothed vector sequence identifying (non-surrounding) unit 3230.

The inter-edge point smoothed vector sequence identifying (non-surrounding) unit 3230 inputs the smoothed (function approximated) inter-edge point auxiliary vector inclusion (surrounding) vector sequence from the inter-edge point auxiliary vector inclusion (surrounding) vector sequence smoothing unit 3220. Furthermore, the inter-edge point smoothed vector sequence identifying (non-surrounding) unit 3230 inputs start/end edge point information from the inter-edge point auxiliary vector inclusion (surrounding) vector sequence generating unit 3210.

Then, the inter-edge point smoothed vector sequence identifying (non-surrounding) unit 3230 identifies a vector serving as a start edge point and a vector serving as an end edge point for each smoothed (surrounding) vector, and generates a non-surrounding vector sequence connecting the start edge point to the end edge point.

Figure 7F:
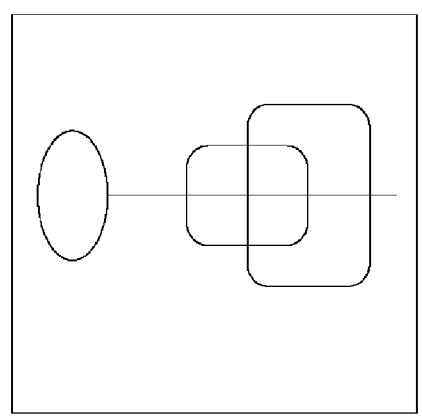

FIG. 7F illustrates a line image visualized from the smoothed vector generated from the inter-edge point smoothed vector sequence identifying (non-surrounding) unit 3230 that has input the image of FIG. 7E.

Referring back to FIG. 1, an individual region vector generating unit 40 converts each region into a region vector including a surrounding smoothed (function approximated) inter-edge point vector sequence and its interior color. The individual region vector generating unit 40 executes this processing based on the smoothed (function approximated) inter-edge point vector obtained from the inter-edge point vector generating unit 30, region number information indicating neighboring regions defined by intersections obtained from the thinned region boundary image generating unit 20, and information correlating each region and its color information (attribute information) obtained from the region identifying unit 12.

The individual region vector generating unit 40 includes a region boundary vector sequence identifying unit 410 and a region attribute information allocating unit 420.

The region boundary vector sequence identifying unit 410 identifies an inter-edge point vector sequence surrounding each region that has been subjected to the function approximation (smoothing) processing. The region boundary vector sequence identifying unit 410 executes this processing based on the function approximated (smoothed) inter-edge point vector generated from the inter-edge point vector generating unit 30 and information correlating each region and its color information (attribute information) obtained from the region identifying unit 12.

The region attribute information allocating unit 420 allocates interior color information to a smoothed (function approximated) inter-edge point vector sequence surrounding each region, and generates a region vector including a surrounding smoothed (function approximated) inter-edge point vector sequence and its color information for each region. The region attribute information allocating unit 420 executes this processing based on the smoothed (function approximated) inter-edge point vector sequence of each region identified by the region boundary vector sequence identifying unit 410 and information correlating each region and its color information (attribute information) obtained from the region identifying unit 12.

A hardware configuration of the image processing apparatus illustrated in FIG. 1 is described below with reference to FIG. 9.

Figure 9:
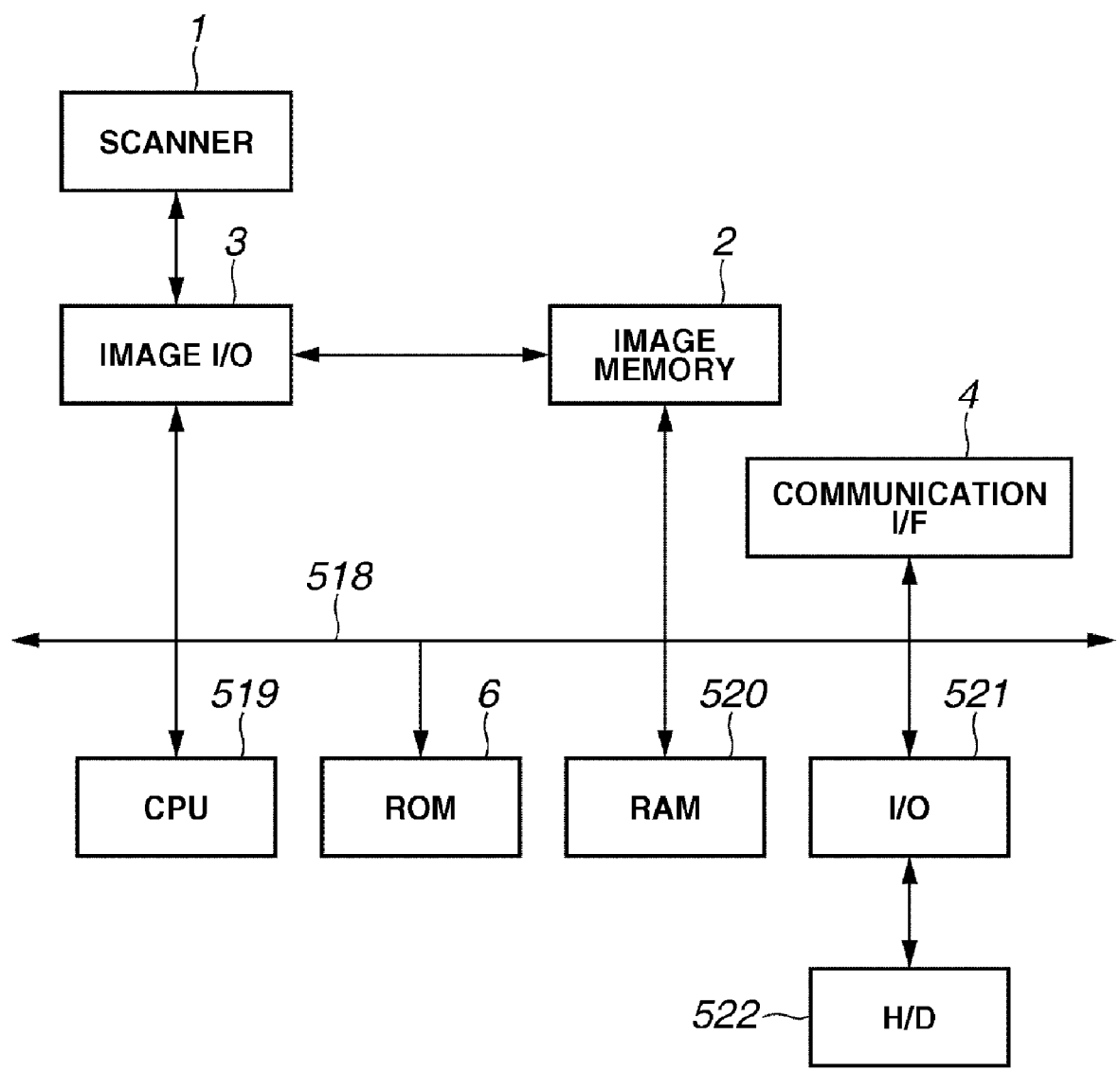
FIG. 9 illustrates a hardware configuration of the image processing apparatus according to the first exemplary embodiment of the present invention.

FIG. 9 illustrates a hardware configuration of an image processing apparatus according to the first exemplary embodiment of the present invention.

The image processing apparatus includes a scanner 1, an image memory 2, an image input/output (I/O) 3, and a bus 518 that connects various constituent components illustrated in FIG. 9. The image memory 2 stores a color image input from the scanner 1 via the image I/O 3. The scanner 1, the image I/O 3, and the image memory 2 can realize the color image acquiring unit 11 illustrated in FIG. 1.

The image memory 2 stores a region identification result image including partial regions identified by the region identifying unit 12 each of which is composed of serially joined pixels and can be regarded as a same color region. The image memory 2 stores a boundary line image generated by the boundary line image generating unit 230 of the thinned region boundary image generating unit 20 and a four-serially joined thinned region boundary image generated through the thinning processing applied to the obtained boundary line image while maintaining the four-serially joined state.

In this manner, the image memory 2 functions as part of the region identifying unit 12, the thinned region boundary image generating unit 20, and the inter-edge point vector generating unit 30.

A communication I/F 4 can communicate with an external device via a network. A central processing unit (CPU) 519 is associated with a random access memory (RAM) 520 and a read-only memory (ROM) 6. The RAM 520 functions as a working memory. The ROM 6 stores programs and predetermined parameters and/or data. The CPU 519 can execute the programs stored in the ROM 6 according to a predetermined procedure.

The image memory 2, the CPU 519, the RAM 520, and the ROM 6 configure the region identifying unit 12, the thinned region boundary image generating unit 20, and the inter-edge point vector generating unit 30 illustrated in FIG. 1. Furthermore, the image memory 2 realizes the individual region vector generating unit 40.

A disk I/O (e.g., input/output circuit) 521 is provided for a hard disk apparatus 522.

An operation of the image processing apparatus will be described below with reference to FIG. 10.

Figure 10:
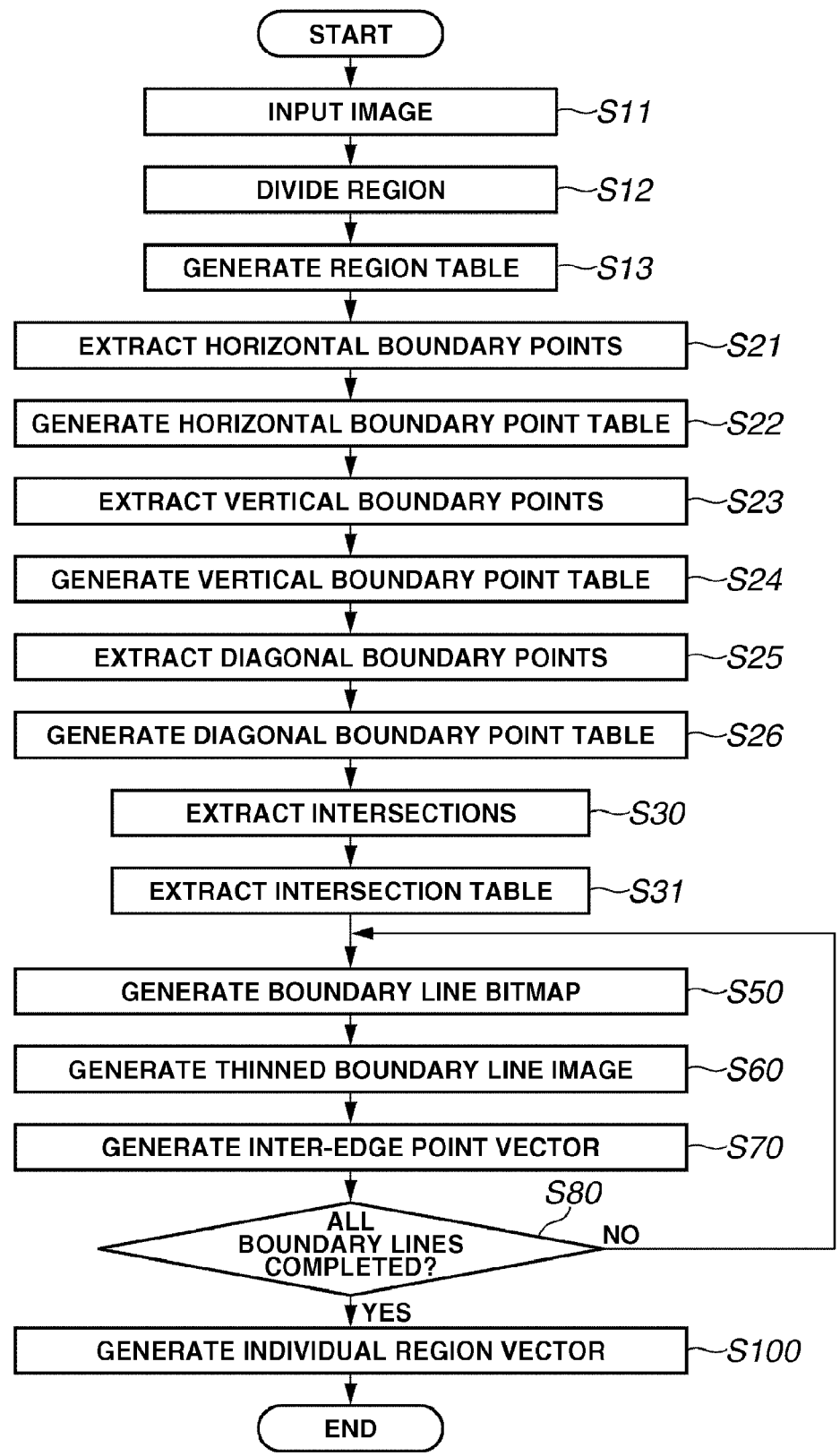
FIG. 10 is a flowchart illustrating an operation of the image processing apparatus according to the first exemplary embodiment of the present invention.

FIG. 10 is a flowchart illustrating an operation of the image processing apparatus according to the first exemplary embodiment of the present invention.

The CPU 519 executes the program stored in the ROM 6 to cause the image processing apparatus illustrated in FIG. 1 to realize the processing of FIG. 10.

In step S11, the color image acquiring unit 11 inputs a color image as a processing object. Next, the region identifying unit 12 executes the processing of steps S12 and S13. The region identifying unit 12 performs region dividing processing (i.e., divides the image input in step S11 into plural regions) and stores the result of the region dividing processing in the RAM 520.

More specifically, in step S12, the region dividing unit 121 divides the image into plural assemblies of pixels based on color information. Each assembly of pixels is a region composed of same color pixels being geometrically connected. In step S13, the region table generating unit 122 obtains color information (attribute information) of each divided region based on an average of colors of the pixels involved in this region. The region table generating unit 122 generates the region table 201 illustrated in FIG. 2 and stores the region table 201 in the RAM 520. Details of the region dividing processing in step S12 will be described later.

The region boundary information extracting unit 210 executes the processing of steps S21 through S26. The region boundary information extracting unit 210 extracts boundary pixels representing a region boundary between the regions identified in step S12 and region boundary information indicating the regions divided by the boundary pixels.

In step S21, the horizontal boundary point extracting unit 211 extracts a pixel representing a boundary between neighboring regions on each scanning line when the horizontal scanning operation is applied to a region identification result image including partial regions each of which is composed of serially joined pixels and can be regarded as a same color region. Namely, the horizontal boundary point extracting unit 211 extracts a pixel where a partial region is switched to another partial region in the horizontal direction. In step S22, the horizontal boundary point table generating unit 212 generates the horizontal boundary point table 401 (FIG. 4), with reference to coordinate values of each extracted pixel representing the horizontal boundary point and neighboring region numbers.

In step S23, the vertical boundary point extracting unit 213 extracts a pixel representing a boundary between neighboring regions on each scanning line when the vertical scanning operation is applied to a region identification result image including partial regions each of which is composed of serially joined pixels and can be regarded as a same color region. Namely, the vertical boundary point extracting unit 213 extracts a pixel where a partial region is switched to another partial region in the vertical direction. In step S24, the vertical boundary point table generating unit 214 generates the vertical boundary point table 402 (FIG. 4), with reference to coordinate values of each extracted pixel representing the vertical boundary point and neighboring region numbers.

In step S25, the diagonal boundary point extracting unit 215 extracts a pixel representing a boundary between neighboring regions on each scanning line when the diagonal scanning operation is applied to a region identification result image including partial regions each of which is composed of serially joined pixels and can be regarded as a same color region. Namely, the diagonal boundary point extracting unit 215 extracts a pixel where a partial region is switched to another partial region in the diagonal direction. In step S26, the diagonal boundary point table generating unit 216 generates the diagonal boundary point table 403 (FIG. 4), with reference to coordinate values of each extracted pixel representing the diagonal boundary point and neighboring region numbers.

Details of the boundary point extracting processing in steps S21, S23, and step S25 will be described later.

The intersection information generating unit 220 executes the processing of steps S30 and S31. The intersection information generating unit 220 generates information of an intersection of region boundary lines corresponding to a branch point of a region boundary line constituted by four-serially joined region boundary pixels.

In step S30, the intersection identifying unit 221 extracts intersections with reference to the horizontal boundary point table 401, the vertical boundary point table 402, and the diagonal boundary point table 403.

More specifically, the intersection identifying unit 221 detects any boundary point having three or more region numbers with reference to the tables 401 to 403, among boundary points listed on at least two of the tables 401 to 403. The intersection identifying unit 221 identifies the detected boundary point as an intersection (intersection information).

The boundary point existing in two or more of the three tables can be any one of a boundary point listed on both the horizontal boundary point table 401 and the vertical boundary point table 402, a boundary point listed on both the horizontal boundary point table 401 and the diagonal boundary point table 403, a boundary point listed on both the vertical boundary point table 402 and the diagonal boundary point table 403, or a boundary point listed on all of the horizontal boundary point table 401, the vertical boundary point table 402, and the diagonal boundary point table 403.

In step S31, the intersection table generating unit 222 generates the intersection table 601 based on the intersections identified in step S30.

More specifically, the intersection table generating unit 222 picks up all of neighboring region numbers listed on the horizontal boundary point table 401, the vertical boundary point table 402, and the diagonal boundary point table 403. Then, the intersection table generating unit 222 generates the intersection table 601 illustrated in FIG. 6 that indicates all region numbers of the neighboring regions neighboring corresponding to the intersection.

Details of the intersection extracting processing of step S30 will be described later.

The boundary line image generating unit 230 and the inter-edge point vector generating unit 30 execute the processing of steps S50 through S80, which includes generating a thinned region boundary image based on the region boundary information generated in step S12 and the intersection information in step S30 and generating each inter-edge point vector.

First, in step S50, the boundary line image drawing unit 231 generates a boundary line bitmap image (i.e., a boundary line image) composed of four-serially joined region boundary pixels based on the region boundary information. In step S60, the boundary line image thinning unit 232 generates a thinned region boundary image from the four-serially joined boundary line image. In step S70, the inter-edge point vector generating unit 30 successively generates, from the thinned region boundary image, an inter-edge point vector for each boundary line image connecting an intersection and another intersection.

In step S80, it is determined whether the inter-edge point vector generation processing has been completed for all boundary lines. In this processing, if the inter-edge point vector generation processing has not been completed for all images of boundary lines connecting an intersection and another intersection listed on the intersection table 601 generated in step S31 (NO in step S80), it is determined that there is a boundary line to be processed. In this case, the processing flow returns to step S50 to repeat the above-described processing. On the other hand, if the inter-edge point vector generation processing for all images of boundary lines connecting an intersection and another intersection has been completed (YES in step S80), it is determined that there is no boundary line to be processed. The processing flow proceeds to step S100.

The boundary line bitmap generation processing of step S50 includes successively retrieving boundary points having the same neighboring region numbers for each desired region boundary from the horizontal boundary points, the vertical boundary points, and the diagonal boundary points listed on the boundary point tables 401 to 403 illustrated in FIG. 4, and generating a bitmap image based on the detected boundary points.

Namely, the processing includes retrieving any boundary point whose processing check flag is not yet checked, for example, from the horizontal boundary point table 401, the vertical boundary point table 402, and the diagonal boundary point table 403. The processing includes drawing a first boundary point whose processing check flag is not yet checked. The processing includes successively retrieving boundary points having the same combination of neighboring region numbers as that of the first boundary point from the horizontal boundary point table 401, the vertical boundary point table 402, and the diagonal boundary point table 403. The processing includes drawing all boundary points satisfying the conditions as a boundary line between two regions identified by the combination of region numbers.

The processing includes checking (setting a flag) in a processing check flag field (not illustrated) corresponding to each boundary point having been drawn as a boundary line (i.e., boundary point having been subjected to the boundary line bitmap generation processing) on respective boundary point tables 401 to 403. If there is no boundary point whose processing check flag is not checked, it is determined that a bitmap image including all boundary points is generated.

The bitmap image of boundary points drawn in this processing is, for example, a four-serially joined region connecting two intersections as indicated by pixels (1) with a hatching pattern as illustrated in FIG. 50E. However, the line image width is not limited to the one-pixel width. The line image may have a 2-pixel width partly.

The boundary line image thinning processing of step S60 includes applying appropriate binary image thinning processing to the boundary line bitmap image (binary image) obtained in step S50 and outputting a four-serially joined thinned binary image.

Next, the inter-edge point vector generation processing of step S70 is described below.

As described above, the inter-edge point vector generating unit 30 executes the processing of step S70. Namely, the inter-edge point vector generating unit 30 successively generates, from a thinned region boundary image, an inter-edge point vector for each boundary line image connecting an intersection and another intersection.

The inter-edge point vector generating unit 30 includes the inter-edge point vector extracting unit 310 and the inter-edge point vector function approximation (smoothing) unit 320, as illustrated in FIG. 8. The inter-edge point vector extracting unit 310 includes the inter-edge point contour (surrounding) vector sequence extracting unit 3110 and the inter-edge point line core (surrounding) vector sequence generating unit 3120. The inter-edge point vector function approximation (smoothing) unit 320 includes the inter-edge point auxiliary vector inclusion (surrounding) vector sequence generating unit 3210, the inter-edge point auxiliary vector inclusion (surrounding) vector sequence smoothing unit 3220, and the inter-edge point smoothed vector sequence identifying (non-surrounding) unit 3230.

Hereinafter, detailed processing by the inter-edge point contour (surrounding) vector sequence extracting unit 3110 is described with reference to FIGS. 11 through 27.

Figure 11:
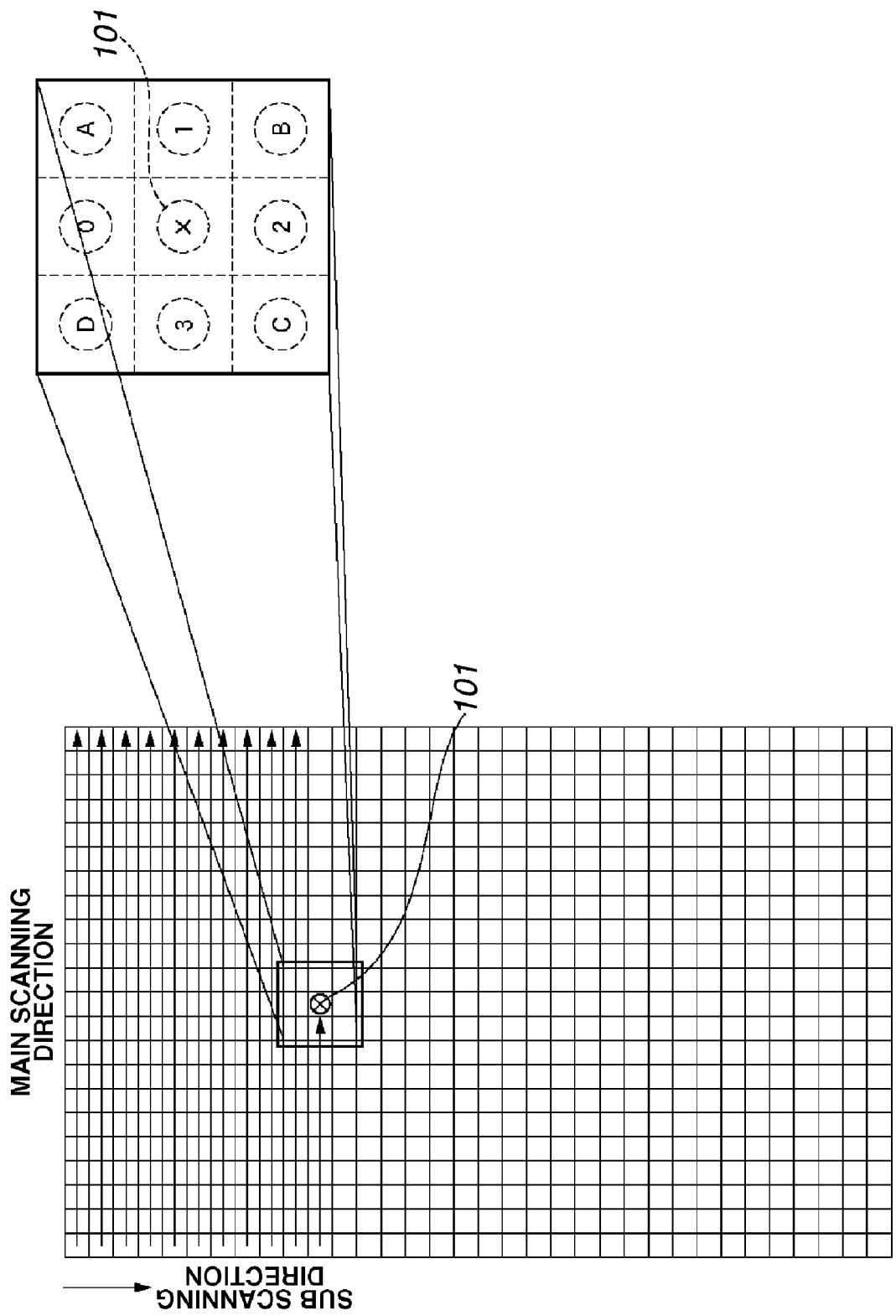
FIG. 11 illustrates a target pixel and neighboring pixels according to the first exemplary embodiment of the present invention.

As illustrated in FIG. 11, a binary image includes a target pixel 101 and eight neighboring pixels. The first exemplary embodiment performs the raster scanning in the entire image by successively shifting the target pixel by one pixel.

In FIG. 11, "x" represents the target pixel 101. Two pixels "0" and "2" and the target pixel 101 are located on the same position in the main scanning direction. The pixel "0" is located one raster above the target pixel 101 in the sub scanning direction. The pixel "2" is located one raster below the target pixel 101 in the sub scanning direction. Two pixels "1" and "3" and the target pixel 101 are located on the same raster position. The pixel "3" is located one pixel before the target pixel 101 on the same raster line. The pixel "1" is located one pixel behind the target pixel 101 on the same raster line.

Furthermore, two pixels "A" and "B" are positioned one pixel behind the target pixel 101 in the main scanning direction. The pixel "A" is positioned one raster above the target pixel 101. The pixel "B" is positioned one raster below the target pixel 101. Two pixels "C" and "D" are positioned one pixel before the target pixel 101 in the main scanning direction. The pixel "D" is positioned one raster above the target pixel 101. The pixel "C" is positioned one raster below the target pixel 101.

Exemplary processing performed based on the state of the target pixel 101 and eight neighboring pixels is described below.

If the target pixel 101 is a white pixel, the inter-edge point contour (surrounding) vector sequence extracting unit 3110 terminates the processing and starts the raster scanning for the next line (updates the target pixel position by one pixel).

If the target pixel 101 is a black pixel, the inter-edge point contour (surrounding) vector sequence extracting unit 3110 performs the following processing depending on the state of neighboring pixels. FIGS. 12 through 27 illustrate exemplary processing contents in various states. In FIGS. 12 through 27, a mark "○" with a diagonal checker pattern represents a black pixel, and a dotted mark "○" represents a white pixel. A pixel in a pixel position indicated by "d" (i.e., "do not care") represents either a white pixel or a black pixel.

In each pixel matrix of FIGS. 12 through 27, a mark "●" represents a start point of a lateral vector and a mark "○" represents an end point of a vertical vector. A mark "▲" represents a start point of a vertical vector, and a mark "Δ" mark represents an end point of a lateral vector. A solid-line arrow connecting start and end points of a vector represents a contour vector whose start and end points are both fixed. A dotted-line arrow represents a contour vector having only one of a start point and an end point being fixed. In the present embodiment, start and end points of these contour vectors are referred to as "contour points." Pixel matrix patterns in FIGS. 12, 17, and 22 do not include contour vectors.

A mark "●" and a mark "▲" represent a start point and an end point of a vector extracted from an edge point portion. The mark "●" represents a start point of a lateral vector and an end point of a vertical vector extracted from an edge point portion. The mark "▲" represents a start point of a vertical vector and an end point of a lateral vector extracted from an edge point portion.

FIG. 28 illustrates a table of contour point information to be allocated to each contour point extracted from the pixel matrix illustrated in any one of FIGS. 12 through 27. The contour point information serves as allocation information.

The table of FIG. 28 includes a total of sixteen contour point information expressed in the form of "xxx_yyy_zzz" or "xxx_yyy." The portion "xxx" indicates the direction of a vector having an end point defined by the contour point. The portion "yyy" indicates the direction of a vector having a start point defined by the contour point. UP indicates an upward direction, DOWN indicates a downward direction, RIGHT indicates a rightward direction, and LEFT indicates a leftward direction. For example, the contour points No. 01 through No. 03 have a start point of an upward vector and a start point of a rightward vector.

The portion "_zzz" indicates that a contour point having this allocation information is extracted from an edge point portion, and is described in the field of edge point information in FIG. 28. For example, _TR indicates that the contour point is an edge point extracted from the right side of an upper end portion (Top Right) of a line element (refer to FIG. 29A), and _LT indicates that the contour point is an edge point extracted from the upper side of a left end portion (Left Top) of a line element (refer to FIG. 29B).

Figure 29A:
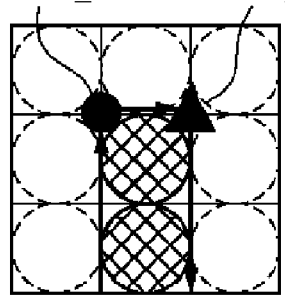
FIGS. 29A through 29D illustrate contour points detected from edge point portions and contour point information allocated to these contour points according to the first exemplary embodiment of the present invention.
Figure 29B:
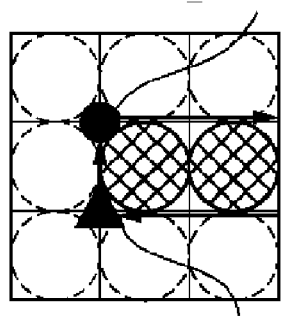
Figure 29C:
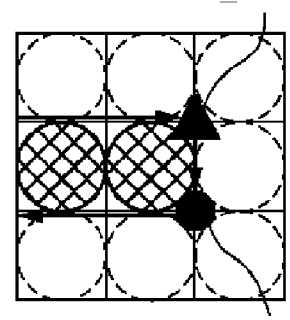
Figure 29D:
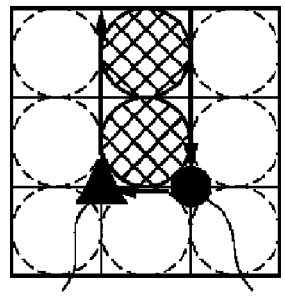

Furthermore, _RB indicates that the contour point is an edge point extracted from the lower side of a right end portion (Right Bottom) of a line element (refer to FIG. 29C), and _BR indicates that the contour point is an edge point extracted from the right side of a lower end portion (Bottom Right) of a line element (refer to FIG. 29D).

Furthermore, _LB indicates that the contour point is an edge point extracted from the lower side of a left end portion (Left Bottom) of a line element (refer to FIG. 29B), and _BL indicates that the contour point is an edge point extracted from the left side of a lower end portion (Bottom Left) of a line element (refer to FIG. 29D).

Furthermore, _RT indicates that the contour point is an edge point extracted from the right side of an upper end portion (Right Top) of a line element (refer to FIG. 29C), and _TL indicates that the contour point is an edge point extracted from the upper side of a left end portion (Top Left) of a line element (refer to FIG. 29A).

FIGS. 30A to 30D illustrate examples of the contour point extracted from a non-edge point portion (i.e., a non-edge point of a line element) whose contour information does not include the "_zzz" portion.

If the target pixel is a black pixel, the actual processing for extracting contour points and allocation information from respective states illustrated in FIGS. 12 through 27 depending on the state of neighboring pixels can be performed with reference to a numerical value listed at a corresponding position in the "value" field of the contour point information illustrated in FIG. 28.

In FIGS. 30A through 30D, a mark "○" with a diagonal checker pattern indicates a black pixel and a dotted line mark "○" indicates a white pixel.

The start/end point position of the contour vector is located at an intermediate position between two pixels in both the main scanning direction and the sub scanning direction. Two-dimensional coordinates of positive integers express a pixel position in both the main scanning direction and the sub scanning direction.

The present embodiment uses even numbers expressing pixel positions and odd numbers expressing the positions of start and end points. In the present embodiment, an image composed of m pixels×n pixels can be expressed using the coordinate expression of 2m×2n positive even numbers (integers). The present embodiment uses a two-dimensional coordinate system having an x-coordinate corresponding to the main scanning direction and a y-coordinate corresponding to the sub scanning direction. The present embodiment expresses a binary image as a matrix of m (pixel)×n (raster), where m and n are positive integers. Furthermore, $(2i, 2j)$ expresses the pixel position of the i-th pixel of the j-th raster, where i and j are positive integers satisfying a relationship of "i≦m" and "j≦n". The X-coordinate value increases from left to right along the main scanning direction, and the y-coordinate value increases from top to bottom along the sub scanning direction.

An operation of the inter-edge point contour (surrounding) vector sequence extracting unit 3110 is described with reference to FIGS. 31A through 33.

Unlike U.S. Pat. No. 6,404,921, the first exemplary embodiment detects edge points and/or intersections of a four-serially joined thinned binary image and extracts a group of independent vectors corresponding to respective line components as an assembly of mutually independent line elements or closed curves connecting edge points and/or intersections. In addition, the first exemplary embodiment extracts contour point information allocated to each contour point. Furthermore, as is apparent from FIGS. 11 through 27, the first exemplary embodiment uses a processing object of a 3×3 pixel matrix pattern. However, similar to U.S. Pat. No. 6,404,921, the first exemplary embodiment performs raster scanning processing on an image using a 3×3 scanning window composed of nine pixels and successively extracts a contour point based on the state of the target pixel and eight neighboring pixels included in the 3×3 pixel matrix pattern. The first exemplary embodiment is different from U.S. Pat. No. 6,404,921 in extracting both contour points and contour point information from each 3×3 pixel matrix pattern.

FIG. 31A is a flowchart illustrating inter-edge point contour (surrounding) vector extracting processing according to the first exemplary embodiment of the present invention, which can be executed by the CPU 519 of the image processing apparatus. The inter-edge point contour (surrounding) vector extracting processing according to the present embodiment is similar to the processing realized by the flowchart of FIG. 22 discussed in U.S. Pat. No. 6,404,921. However, U.S. Pat. No. 6,404,921 does not use contour point information. The first exemplary embodiment regards the contour point information as attribute information allocated to each extracted contour point. Furthermore, the first exemplary embodiment regards contour point connection information of respective contour points extracted from U.S. Pat. No. 6,404,921 as part of the information of each contour point.

This processing can be easily realized if the data format of each contour point data has a data structure including not only the coordinate values of the contour point but also the contour point data.

First, in step S1, the CPU 519 executes vector sequence extracting processing. The CPU 519 extracts a vector sequence from a binary image data together with contour point information associated with each contour point. Then, the CPU 519 outputs tables of FIGS. 31B and 31C indicating coordinate values of a start point of each vector, any vector that flows into this vector (i.e., a vector having an endpoint identical to the start point of this vector), and any vector that flows out of this vector (i.e., a vector having a start point identical to the end point of this vector).

Figure 31B:
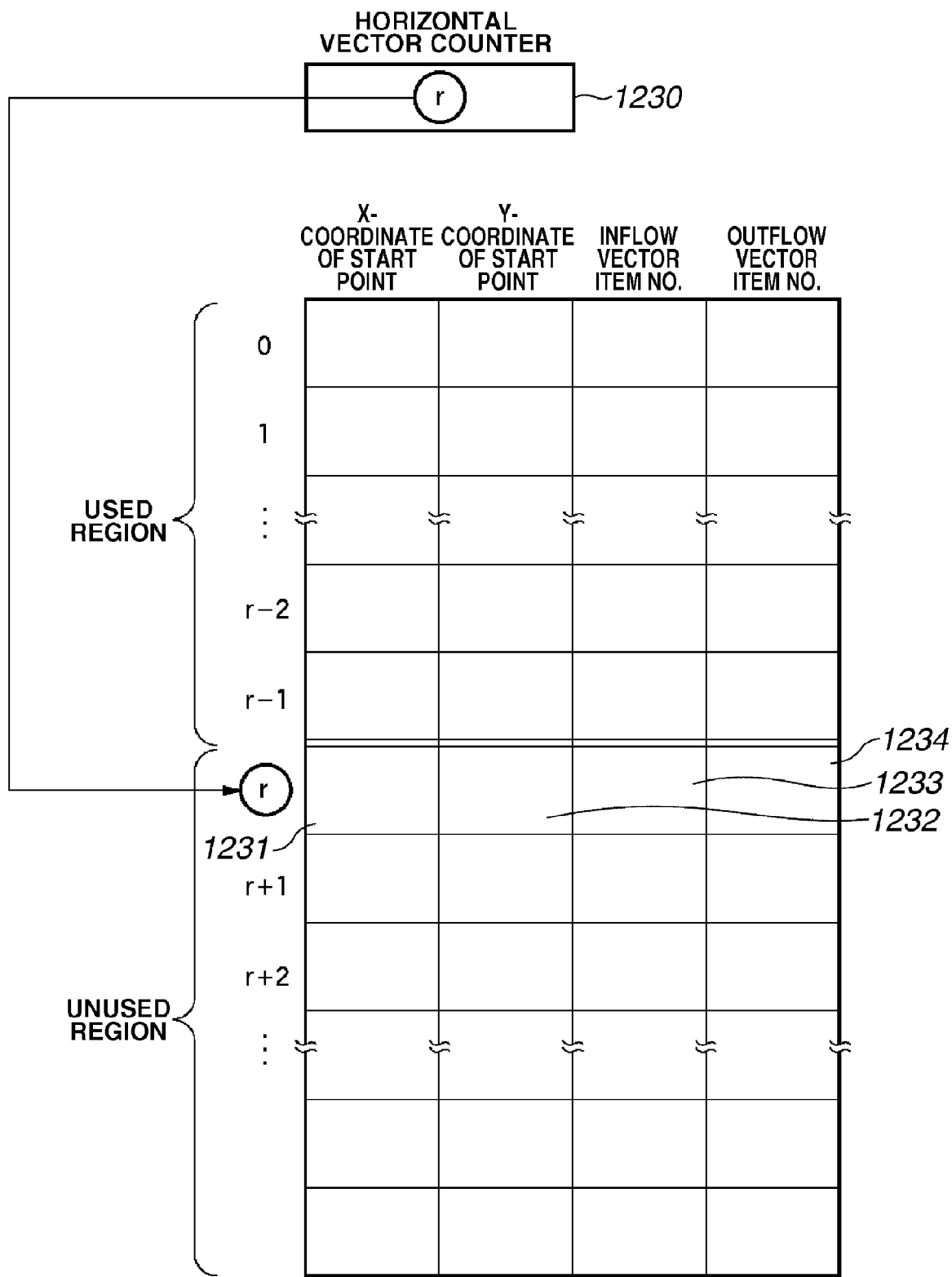
FIG. 31B illustrates an example of vector sequence extracting processing according to the first exemplary embodiment of the present invention.

In step S2, the CPU 519 follows the item numbers of inflow and outflow vectors in the tables illustrated in FIGS. 31B and 31C. The CPU 519 generates a vector sequence table 3201 illustrated in FIG. 32 that indicates a combination of the total number of contour lines involved in an image, the total number of points on each contour line, x-coordinate/y-coordinates of each point on the contour line, and contour point information of each point.

In step S3, the CPU 519 stores a file including the information of the vector sequence table 3201 to the hard disk apparatus 522 via the disk I/O 521, and terminates the sequential operation. This file constitutes vector data of an individual region involved in an image.

Figure 33:
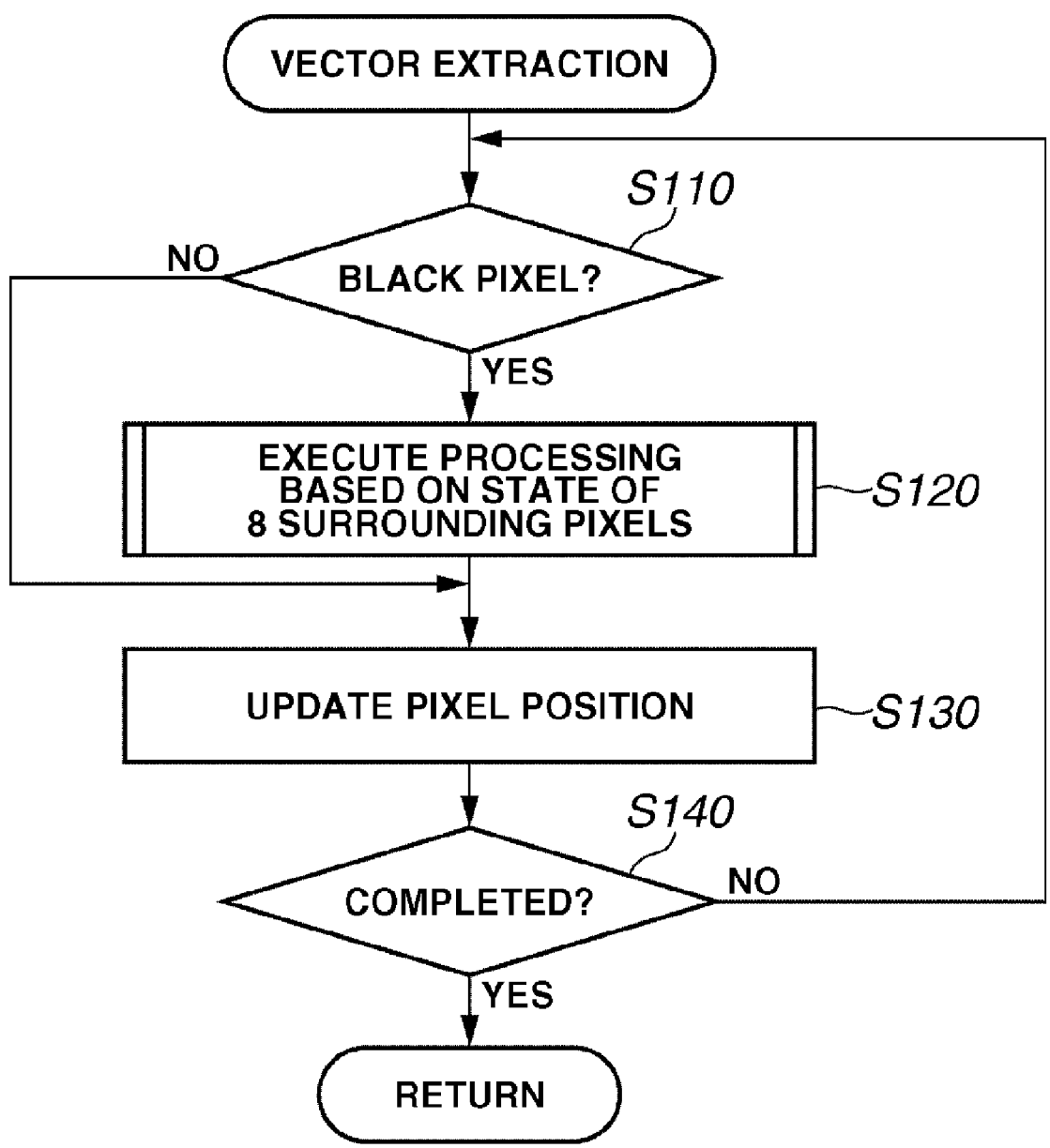
FIG. 33 is a flowchart illustrating details of vector sequence extracting processing in step S1 of FIG. 31A according to the first exemplary embodiment of the present invention.

FIG. 33 is a flowchart illustrating details of the vector sequence extracting processing in step S1 of FIG. 31A according to the first exemplary embodiment of the present invention.

First, in step S110, the CPU 519 determines whether the target pixel is a white pixel or a black pixel. If the target pixel is a white pixel (NO in step S110), the processing flow proceeds to step S130. If the target pixel is a black pixel (YES in step S110), the processing flow proceeds to step S120.

In step S120, the CPU 519 executes processing based on the state of eight pixels surrounding the target pixel. Details of processing of the state of eight pixels surrounding the target pixel (step S120) are explained in further detail below with reference to FIG. 34.

In step S130, the CPU 519 updates the pixel position. Then, in step S140, the CPU 519 determines whether the processing for the final pixel has been completed. If the processing for the final pixel is not completed (NO in step S140), the processing flow returns to step S110 to perform the above-described processing for the next target pixel. If the processing for the final pixel has been completed (YES in step S140), the processing flow proceeds to step S2 of FIG. 31A.

An example of the vector sequence extracting processing in step S1 is described below based on the state (case 0) illustrated in FIG. 12. The target pixel (i.e., the central pixel in FIG. 12) has the coordinates of (2$i$, 2$j$).

First, the CPU 519 registers (2$i$−1, 2$j$−1) as a start point of a horizontal vector. More specifically, the CPU 519 stores (2$i$−1) into a table field 1231 indicating an x-coordinate value of the start point of the horizontal vector indicated by a horizontal vector counter 1230 in FIG. 31B. Similarly, the CPU 519 stores (2$j$−1) into a table field 1232 indicating a y-coordinate value of the start point of the horizontal vector. The source vertical vector flowing into this horizontal vector is a vector stored, in a start point coordinate table, next to a vertical vector currently indicated by a vertical vector counter 1240 in FIG. 31C. The destination vertical vector flowing out of this horizontal vector is present at the start point coordinate table position of the vertical vector currently indicated by the vertical vector counter 1240.

Namely, the CPU 519 stores a sum of 1 and the value in the vertical vector counter 1240 into a position 1233 of the inflow vector item number field of the horizontal vector illustrated in FIG. 31B. Furthermore, the CPU 519 stores the value in the vertical vector counter 1240 into a position 1234 of the outflow vector item number field of the horizontal vector.

Next, the CPU 519 registers (2$i$+1, 2$j$−1) as a start point of a vertical vector. The CPU 519 registers the source horizontal vector flowing into this vertical vector as a first horizontal vector having been registered. The CPU 519 registers the destination horizontal vector flowing out of this vertical vector as a horizontal vector stored next to the first horizontal vector having been registered in the start point coordinate table of the horizontal vector.

Namely, according to the example illustrated in FIG. 31C, the CPU 519 stores (2$i$+1) in a field 1241, (2$i$−1) in a field 1242, a current value in the horizontal vector counter 1230 in a field 1243, and an addition of 1 and the current value in the horizontal vector counter 1230 in a field 1244.

Next, the CPU 519 increments (i.e., adds 1 to) the content of the horizontal vector counter 1230. Next, the CPU 519 registers (2$i$+1, 2$j$+1) as start point coordinates of the horizontal vector. The CPU 519 registers the source vertical vector flowing into this horizontal vector as a second vector having been registered. The CPU 519 registers the destination vertical vector flowing out of this horizontal vector as a vertical vector stored in the next position in the start point coordinate table of the second vertical vector having been registered.

Next, the CPU 519 increments (i.e., adds 1 to) the content of the vertical vector counter 1240. Next, the CPU 519 registers (2*i*−1, 2*j*+1) as start point coordinate values of the vertical vector. The CPU 519 registers the source horizontal vector flowing into this vertical vector as a third horizontal vector having been registered. The CPU 519 registers the destination horizontal vector flowing out of this vertical vector as a fourth horizontal vector having been registered. In this manner, the CPU 519 increments (i.e., adds 1 to) the contents of the horizontal vector counter 1230 and the vertical vector counter 1240 and terminates the processing.

Figure 34:
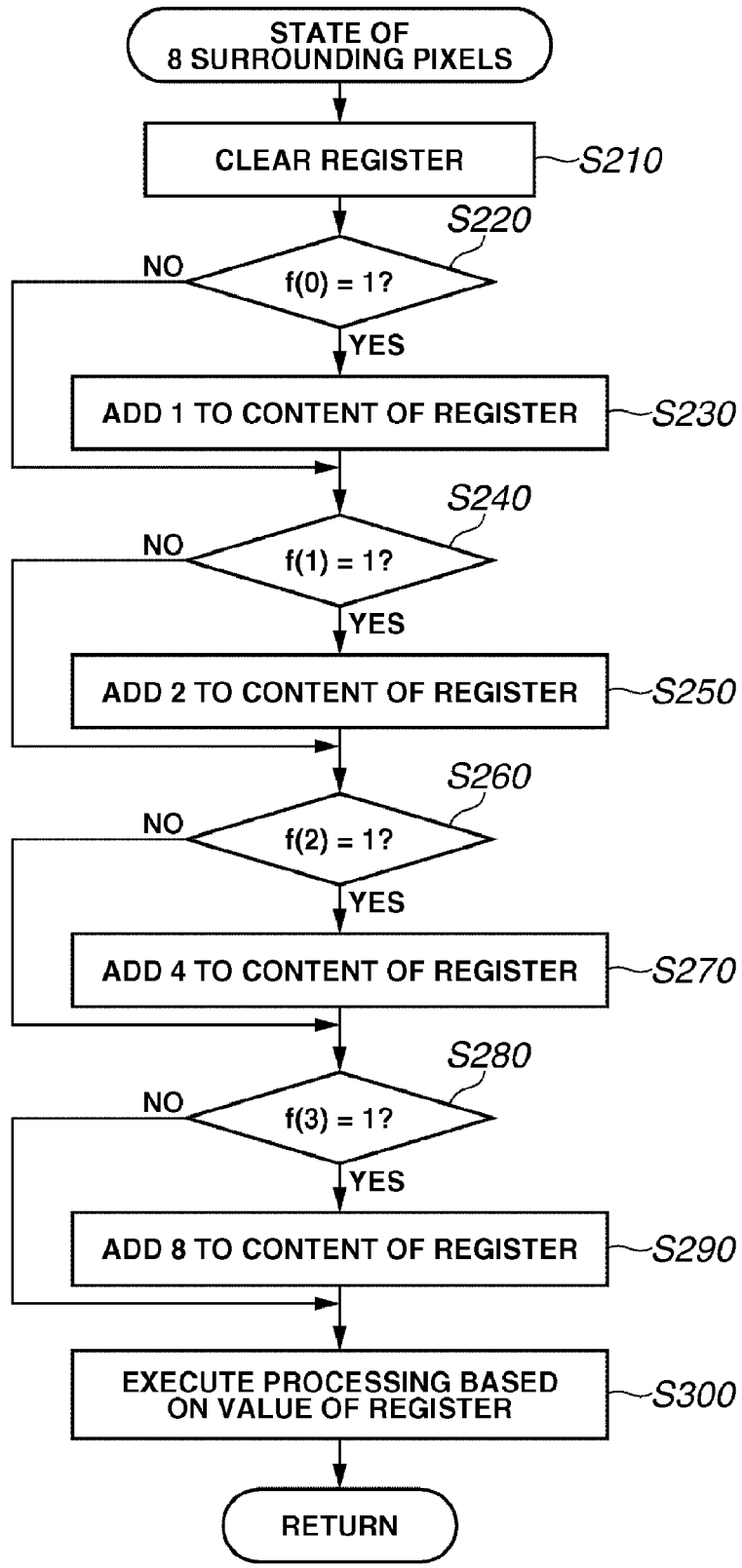
FIG. 34 is a flowchart illustrating details of the processing in step S120 of FIG. 33 according to the first exemplary embodiment of the present invention.

FIG. 34 is a flowchart illustrating details of the processing in step S120 of FIG. 33 according to the first exemplary embodiment of the present invention.

In step S210, CPU 519 clears the register to "0." Next, in step S220, the CPU 519 determines whether the state of pixel "0" (referred to as f(0)) in FIG. 11 is a black pixel (expressed by "1"). Namely, the CPU 519 determines whether f(0) is equal to 1. If f(0) is equal to 1 (YES in step S220), the processing flow proceeds to step S230, in which the CPU 519 adds 1 to the content of the register. If f(0) is equal to 0, i.e., if the state of pixel "0" is a white pixel (NO in step S220), the processing flow proceeds to step S240.

In step S240, the CPU 519 determines whether the state of pixel "1" in FIG. 11 is a black pixel. Namely, the CPU 519 determines whether f(1) is equal to 1. If f(1) is equal to 1 (YES in step S240), the processing flow proceeds to step S250, in which the CPU 519 adds 2 to the content of the register. If f(1) is equal to 0 (NO in step S240), the processing flow proceeds to step S260.

In step S260, the CPU 519 determines whether the state of pixel "2" in FIG. 11 is a black pixel. Namely, the CPU 519 determines whether f(2) is equal to 1. If f(2) is equal to 1 (YES in step S260), the processing flow proceeds to step S270, in which the CPU 519 adds 4 to the content of the register. If f(2) is equal to 0 (NO in step S260), the processing flow proceeds to step S280.

In step S280, the CPU 519 determines whether the state of pixel "3" in FIG. 11 is a black pixel. Namely, the CPU 519 determines whether f(3) is equal to 1. If f(3) is equal to 1 (YES in step S280), the processing flow proceeds to step S290, in which the CPU 519 adds 8 to the content of the register. If f(3) is equal to 0 (NO in step S280), the processing flow proceeds to step S300.

In step S300, the CPU 519 executes processing based on the value (processing number) held in the register.

Figure 12:
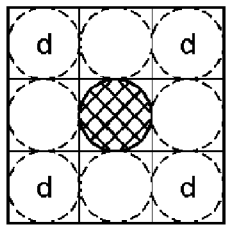
Figure 13:
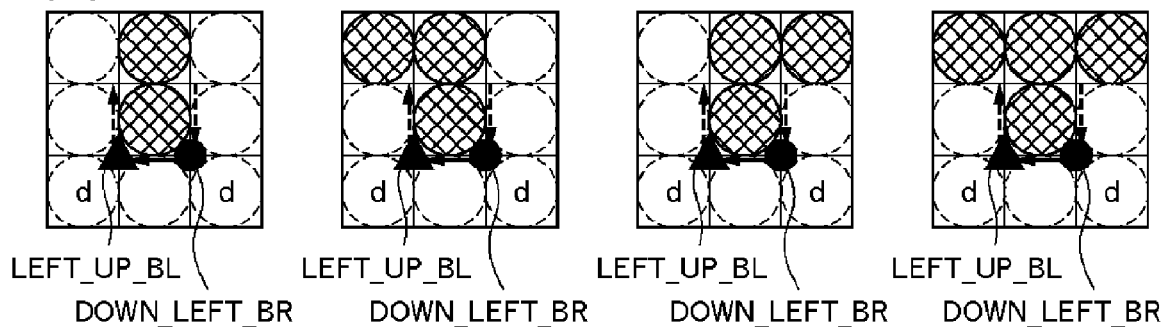
Figure 14:
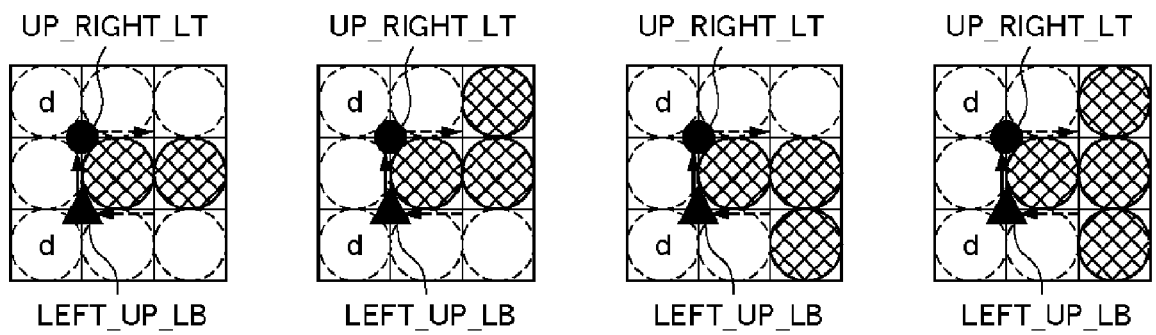
Figure 15:
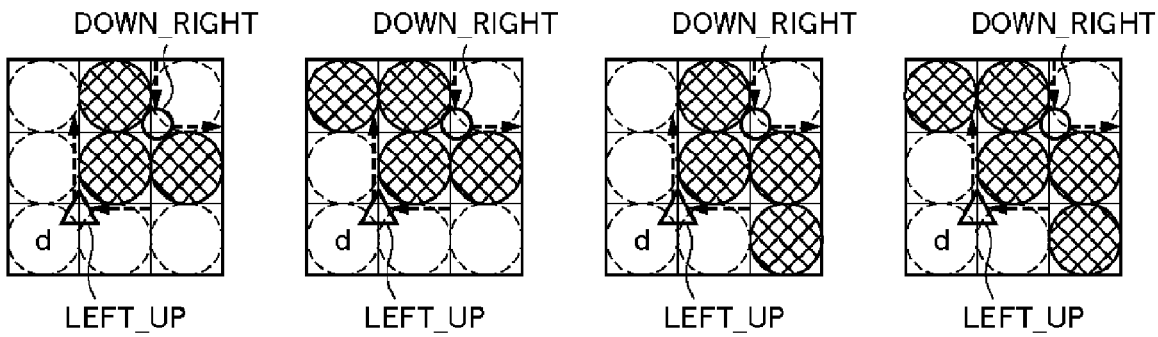
Figure 16:
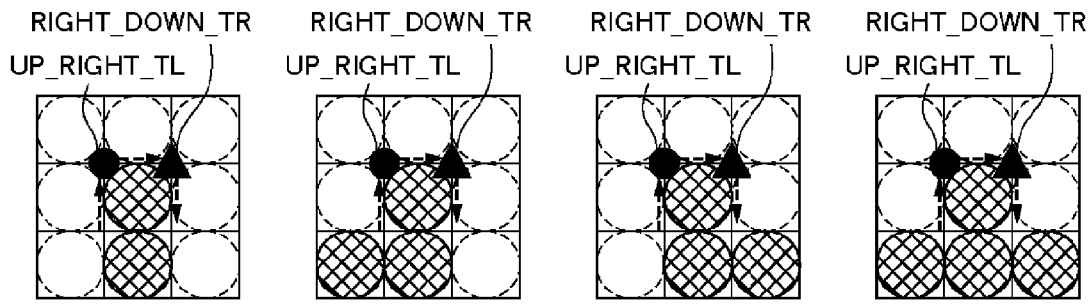
Figure 17:
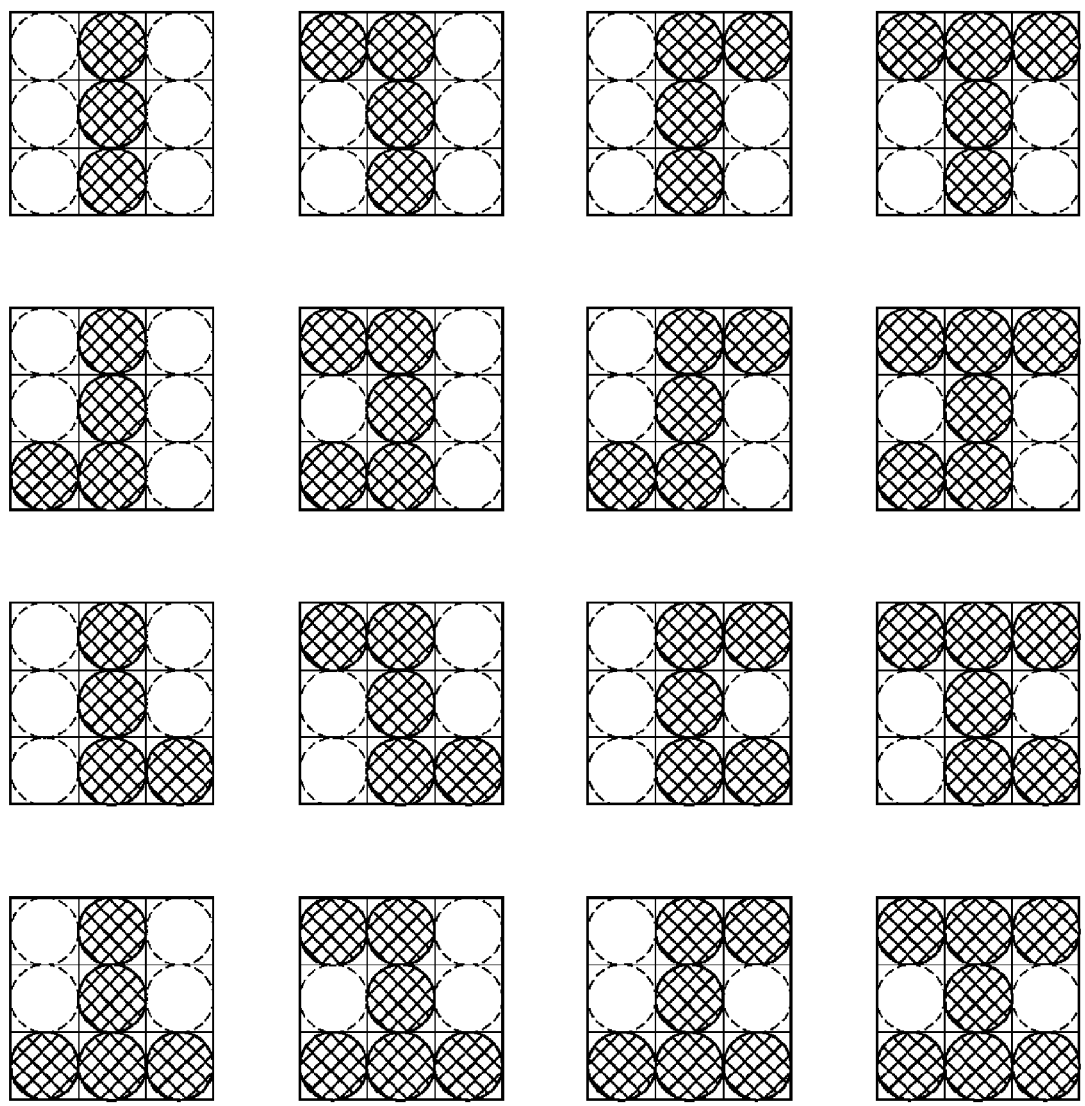
Figure 20:
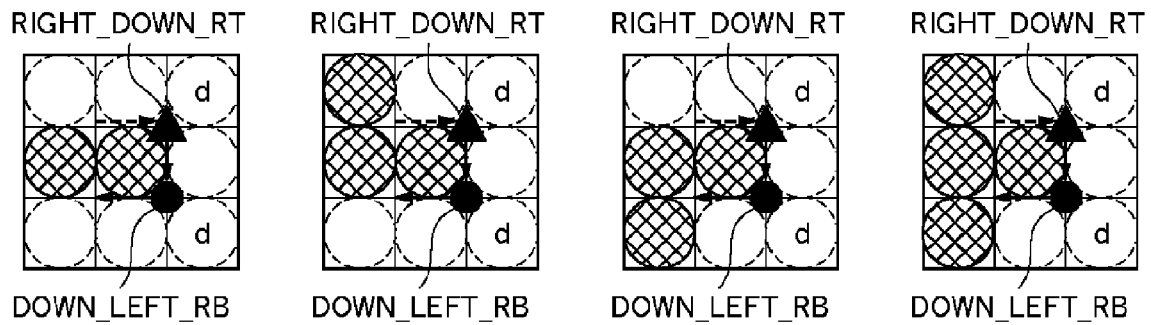
Figure 21:
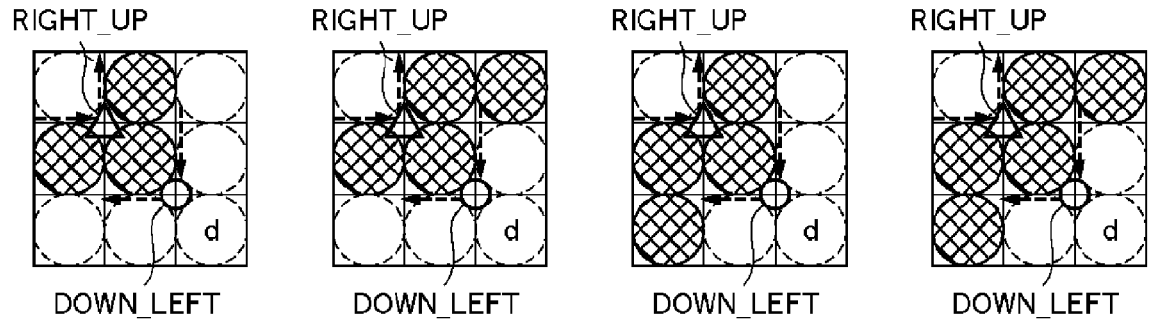
Figure 23:
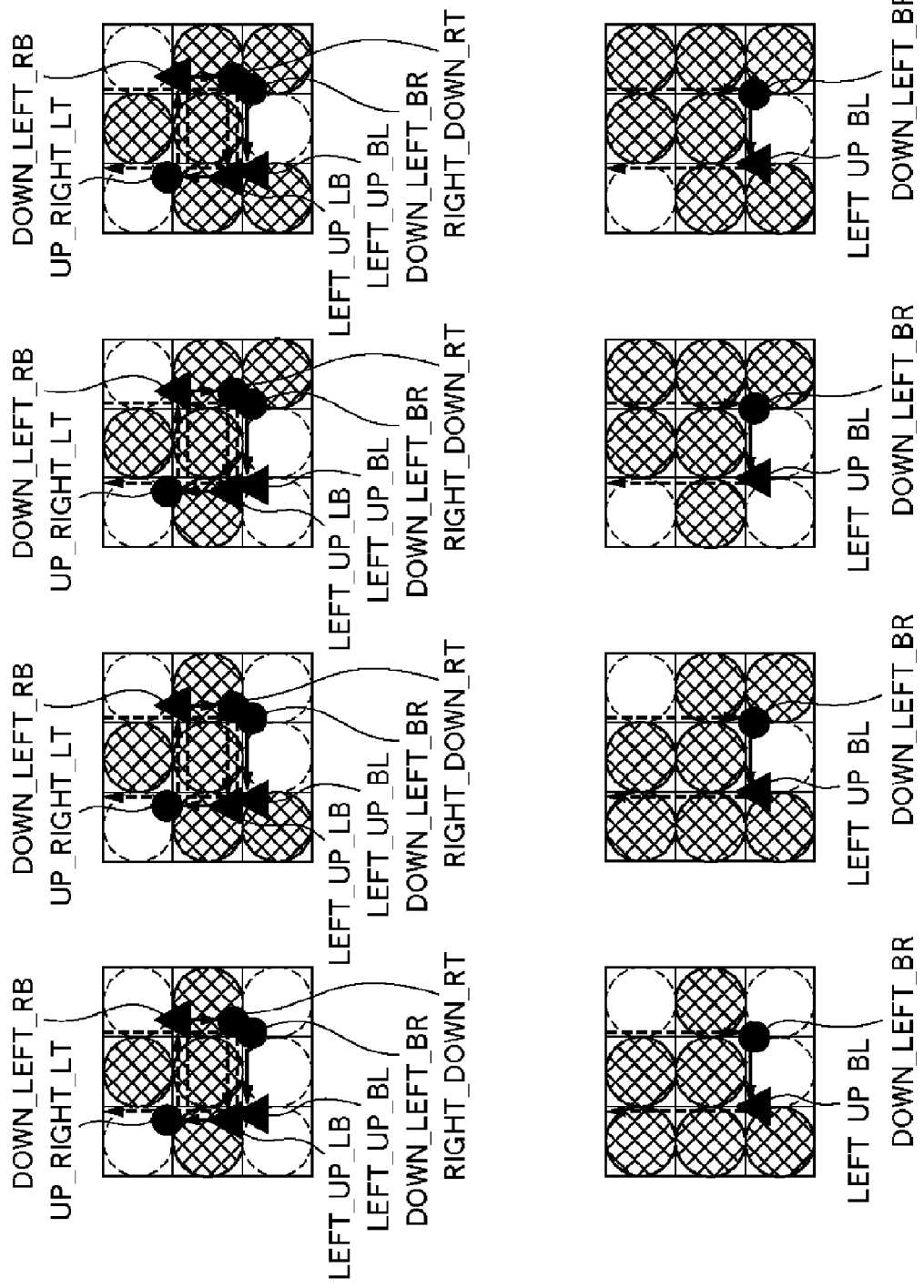
Figure 24:
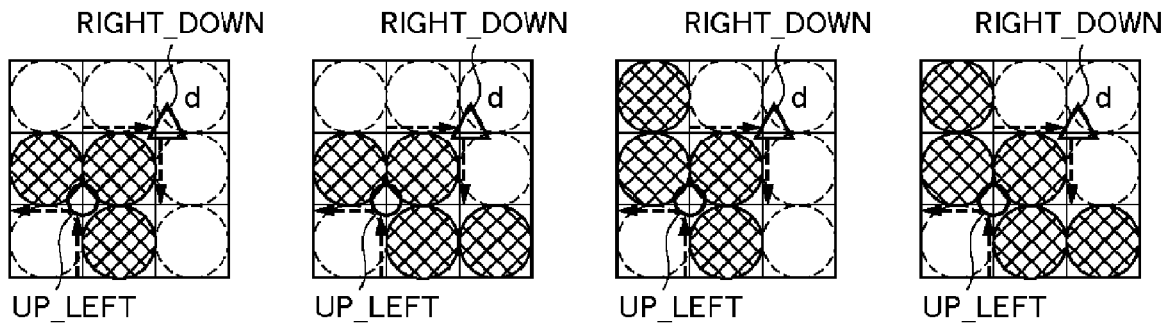
Figure 25:
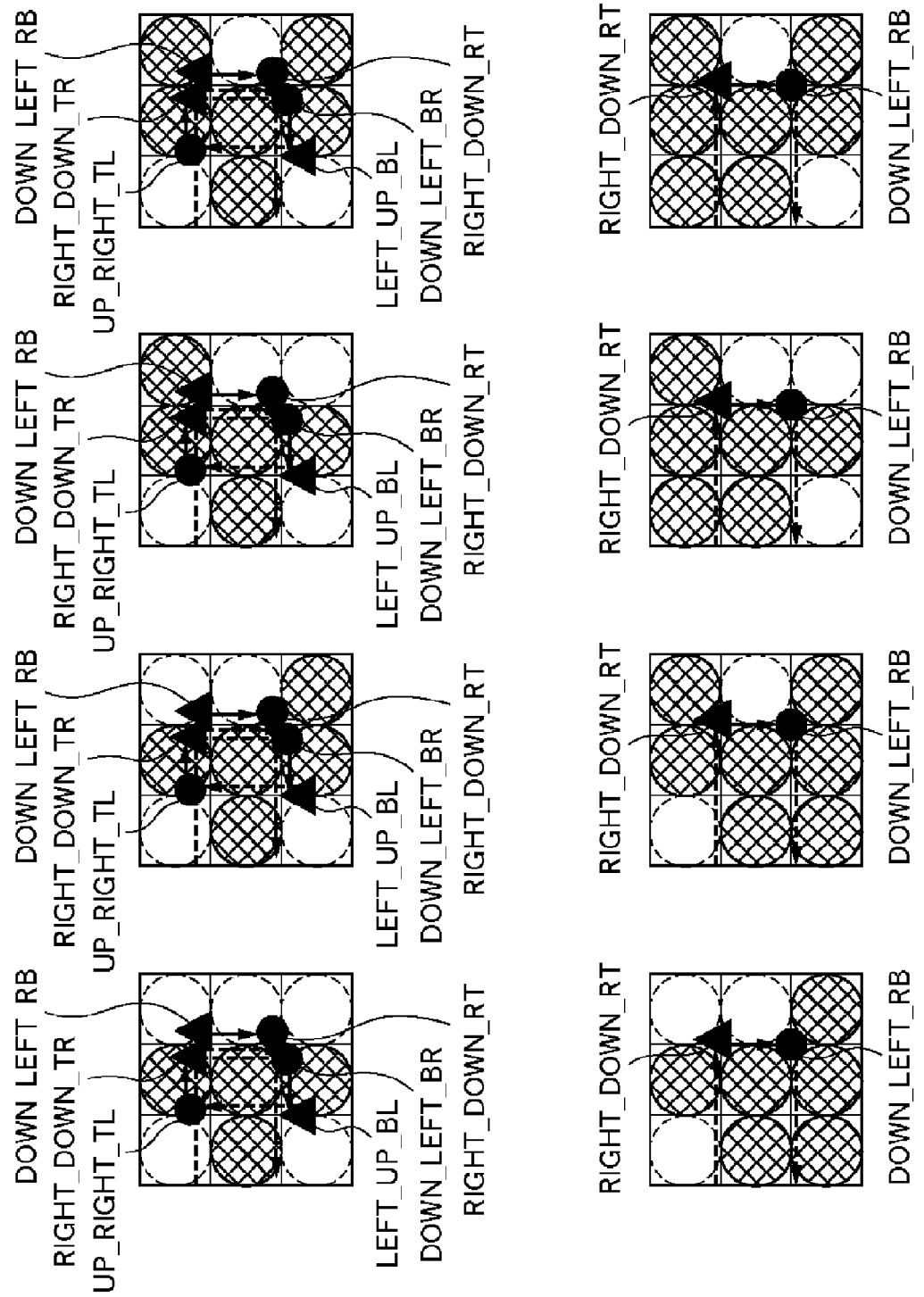
Figure 27:
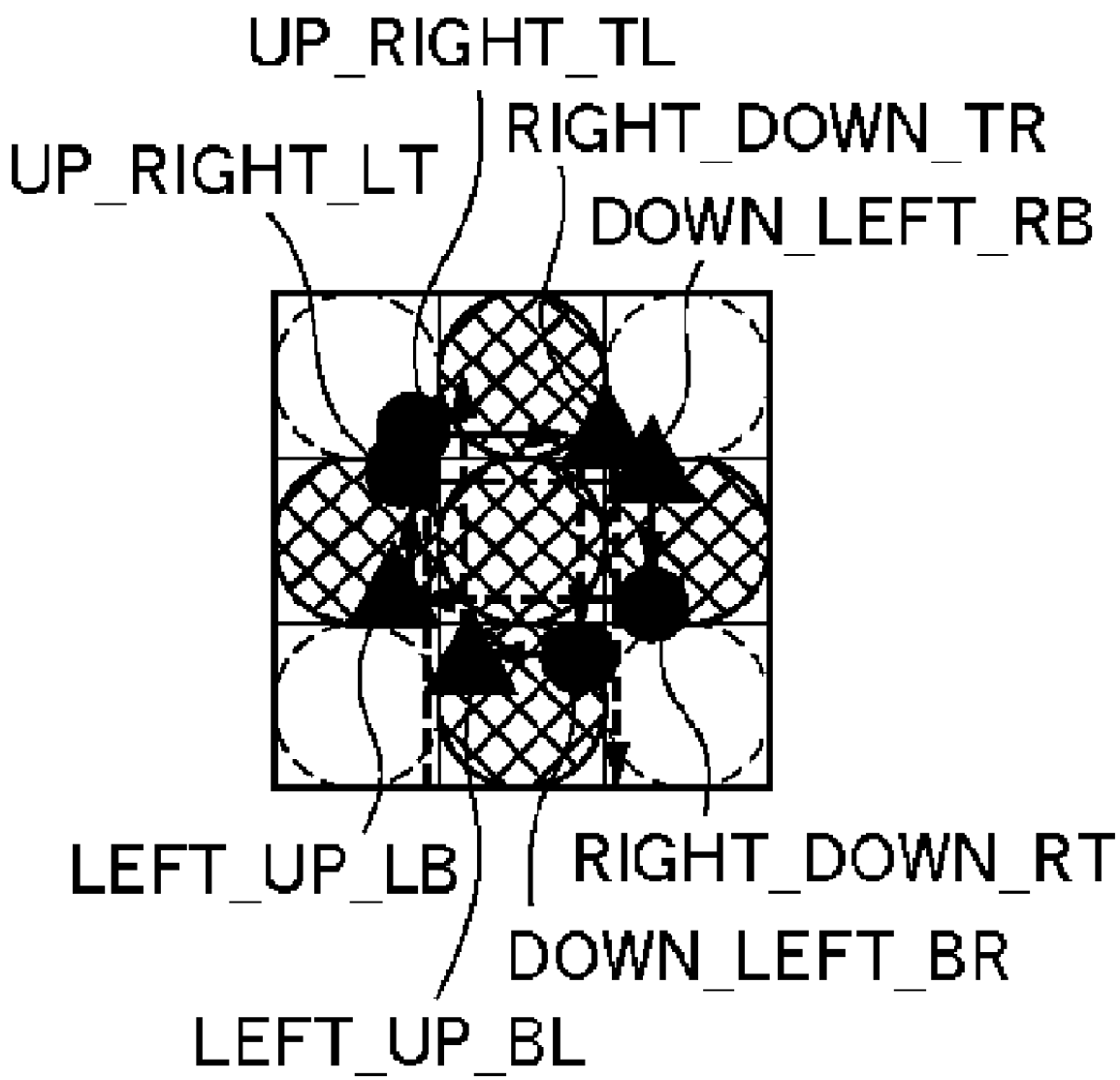

The content of the register takes any one of 0 through 15 depending on the state of each of the pixels "0", "1", "2", and "3" in FIG. 11, as illustrated in FIG. 12 (case 0) through FIG. 27 (case 15).

Namely, in step S300, the CPU 519 extracts contour points defined in FIGS. 12 through 27 and associated contour point information.

In this manner, the inter-edge point contour (surrounding) vector sequence extracting unit 3110 performs one complete raster scanning operation. Thus, the inter-edge point contour (surrounding) vector sequence extracting unit 3110 extracts an assembly of vector sequences ("inter-edge point line element coarse contour vector sequence") corresponding to independent lines or closed curves that connect edge points or intersections involved in an input four-serially joined thinned binary image (line graphic) and associated contour point information, and outputs the processing result.

FIG. 32 illustrates an exemplary processing result which includes the assembly of vector sequences extracted from respective line elements for the first contour, the second contour, and the a-th contour, together with contour point information associated with each contour point.

Figure 35:
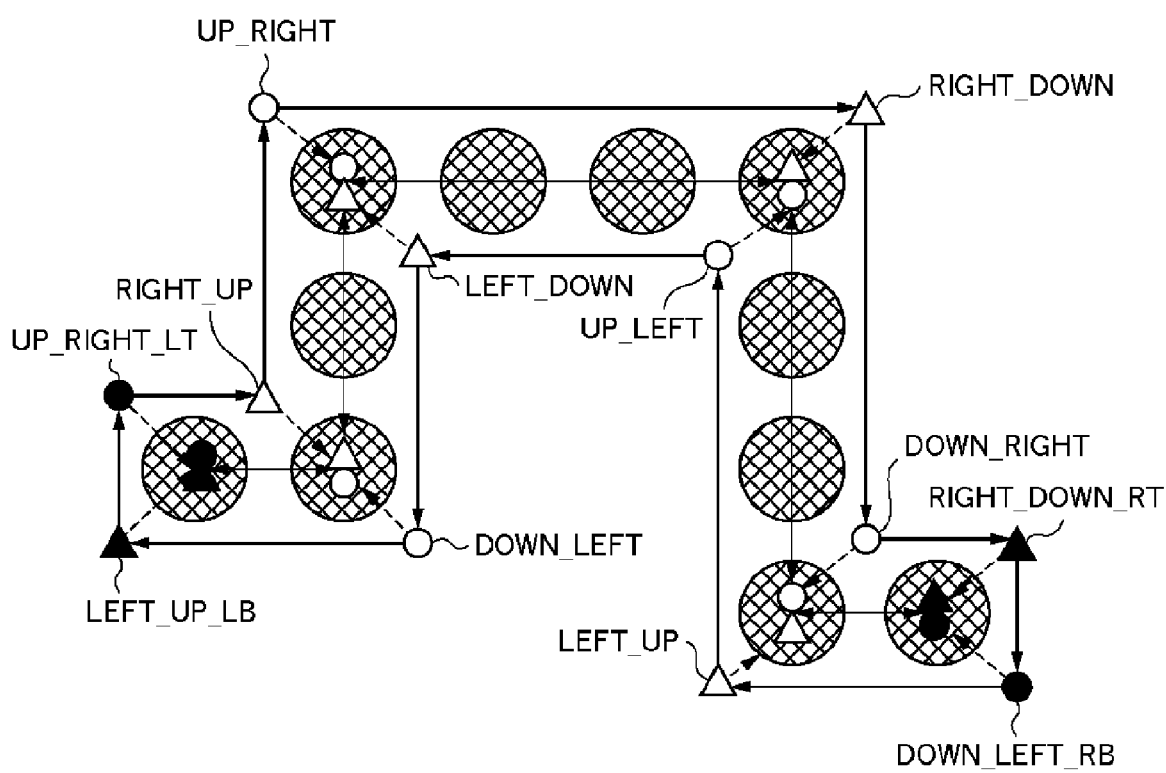
FIG. 35 illustrates line elements, an inter-edge point surrounding vector sequence, contour point information, and an inter-edge point line core (surrounding) vector sequence according to the first exemplary embodiment of the present invention.

FIG. 35 illustrates an exemplary entry of a line graphic, together with inter-edge point contour (surrounding) vector sequences extracted from the line graphic, i.e., an inter-edge point line element coarse contour vector sequence (vector sequences expressed by bold lines), and contour point information.

Figure 36:
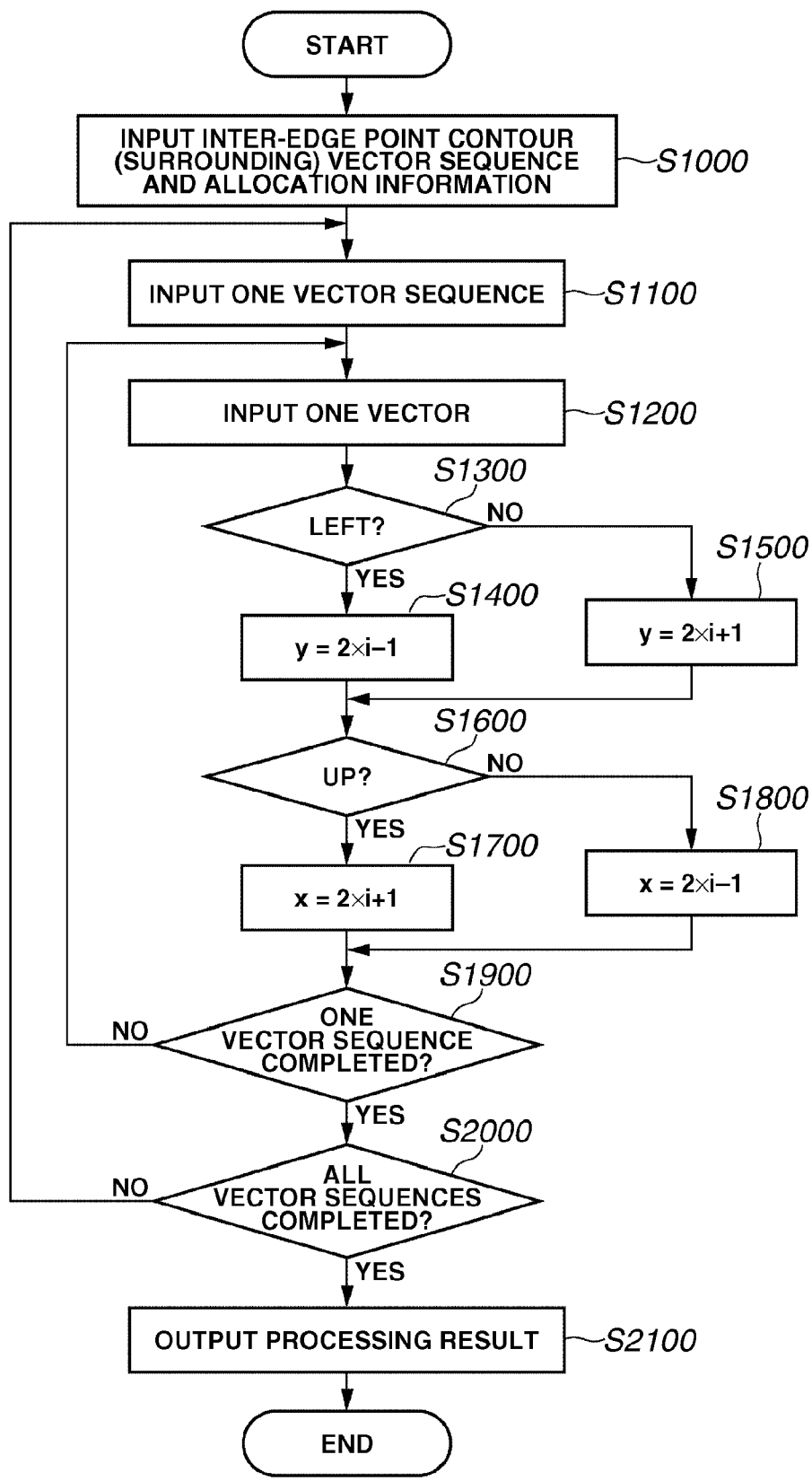
FIG. 36 is a flowchart illustrating an operation of an inter-edge point line core (surrounding) vector sequence generating unit according to the first exemplary embodiment of the present invention.

FIG. 36 is a flowchart illustrating an exemplary operation of the inter-edge point line core (surrounding) vector sequence generating unit 3120 according to the first exemplary embodiment of the present invention. The CPU 519 of the image processing apparatus realizes this processing.

In step S1000, the inter-edge point line core (surrounding) vector sequence generating unit 3120 inputs an inter-edge point contour (surrounding) vector sequence from the inter-edge point contour (surrounding) vector sequence extracting unit 3110. The inter-edge point contour (surrounding) vector sequence is an assembly of vector sequences corresponding to independent lines or closed curves connecting edge points and/or intersections, including information (allocation information) that indicates whether the vector has been extracted from a portion corresponding to an edge point (intersection) position of the line graphic. The assembly of vector sequences is the "inter-edge point line element coarse contour vector sequence."

In step S1100, the inter-edge point line core (surrounding) vector sequence generating unit 3120 inputs one vector sequence (i.e., the k-th contour (1≦k≦a) in FIG. 32) as a current processing object, from the inter-edge point contour (surrounding) vector sequence input in step S1000 which has the data format illustrated in FIG. 32. The inter-edge point line core (surrounding) vector sequence generating unit 3120 repeats step S1100 to input vector sequences one by one in ascending order.

In step S1200, the inter-edge point line core (surrounding) vector sequence generating unit 3120 inputs one vector, as a current processing object, i.e., a contour point (the q-th point (1≦q≦p)) of one vector in the vector sequence (total number of points; p) determined in step S1100. The inter-edge point line core (surrounding) vector sequence generating unit 3120 repeats step S1200 to input vectors one by one in ascending order.

In step S1300, the inter-edge point line core (surrounding) vector sequence generating unit 3120 determines whether a vector having an end point identical to the contour point or a vector having a start point identical to the contour point is directed leftward with reference to the contour point information of the contour point determined in step S1200. If the direction of the vector is LEFT (YES in step S1300), the processing flow proceeds to step S1400. If the direction of the vector is not LEFT (NO in step S1300), the processing flow proceeds to step S1500.

In step S1400, the inter-edge point line core (surrounding) vector sequence generating unit 3120 subtracts 1 from the y-coordinate value of the contour point. When the coordinate value (x, y) is (2*i, 2*j), the inter-edge point line core (surrounding) vector sequence generating unit 3120 calculates y=2*j−1. Namely, the inter-edge point line core (surrounding) vector sequence generating unit 3120 shifts the y-coordinate value of the contour point by a half-pixel width toward the origin in the sub scanning direction. Then, the processing flow proceeds to step S1600.

In step S1500, the inter-edge point line core (surrounding) vector sequence generating unit 3120 adds 1 to the y-coordinate value of the contour point. Namely, the inter-edge point line core (surrounding) vector sequence generating unit 3120 calculates y=2*j+1 to shift the y-coordinate value of the contour point by a half-pixel width toward a direction opposed to the origin in the sub scanning direction. Then, the processing flow proceeds to step S1600.

In step S1600, the inter-edge point line core (surrounding) vector sequence generating unit 3120 determines whether a vector having an end point identical to the contour point or a vector having a start point identical to the contour point is directed upward with reference to the contour point information of the contour point determined in step S1200. If the direction of the vector is UP (YES in step S1600), the processing flow proceeds to step S1700. If the direction of the vector is not UP (NO in step S1600), the processing flow proceeds to step S1800.

In step S1700, the inter-edge point line core (surrounding) vector sequence generating unit 3120 adds 1 to the x-coordinate value of the contour point. Namely, the inter-edge point line core (surrounding) vector sequence generating unit 3120 calculates x=2*i+1 to shift the x-coordinate value of the contour point by a half-pixel width toward a direction opposed to the origin in the main scanning direction. Then, the processing flow proceeds to step S1900.

In step S1800, the inter-edge point line core (surrounding) vector sequence generating unit 3120 subtracts 1 from the x-coordinate value of the contour point. Namely, the inter-edge point line core (surrounding) vector sequence generating unit 3120 calculates x=2*i−1 to shift the x-coordinate value of the contour point by a half-pixel width toward the origin in the main scanning direction. Then, the processing flow proceeds to step S1900.

In step S1900, the inter-edge point line core (surrounding) vector sequence generating unit 3120 determines whether the processing of steps S1200 through S1800 has been completed for all contour points in the vector sequence determined in step S1100. If the processing for all contour points has been completed (YES in step S1900), the processing flow proceeds to step S2000. If the processing for all contour points has not been completed (NO in step S1900), the processing flow returns to step S1200 for the processing of the next contour point in the vector sequence.

In step S2000, the inter-edge point line core (surrounding) vector sequence generating unit 3120 determines whether the above-described processing has been completed for all vector sequences in the inter-edge point line element coarse contour vector sequence input in step S1000. If the processing for all vector sequences has been completed (YES in step S2000), the processing flow proceeds to step S2100. If the processing for all vector sequences has not been completed (NO in step S2000), the processing flow returns to step S1100 to execute the processing of steps S1200 through S2000 for the next vector sequence.

In step S2100, the inter-edge point line core (surrounding) vector sequence generating unit 3120 outputs a processing result of the inter-edge point line element coarse contour vector sequence input in step S1000.

The determination in step S1300 or step S1600 is performed based on a numerical value in the "value" field of the above-described contour point information illustrated in FIG. 28. Therefore, if bit0 represents a least significant bit (LSB) and bit7 represents a most significant bit (MSB) of the numerical value being expressed as a binary value, the inter-edge point line core (surrounding) vector sequence generating unit 3120 checks bit2 (i.e., "rightward (0) leftward (1)" field in FIG. 28) in step 1300 and can determine that the direction of the vector is LEFT if bit2 is 1. In step S1600, the inter-edge point line core (surrounding) vector sequence generating unit 3120 checks bit3 ("upward (0) downward (1)" field in FIG. 28) and can determine that the direction of the vector is UP if bit3 is 0.

In this manner, the inter-edge point line core (surrounding) vector sequence generating unit 3120 inputs an inter-edge point contour (surrounding) vector sequence from the inter-edge point contour (surrounding) vector sequence extracting unit 3110. Then, the inter-edge point line core (surrounding) vector sequence generating unit 3120 finely adjusts the position of each vector constituting the contour (surrounding) vector having a one-pixel width by the width equivalent to a half of a pixel in a suitable direction, with reference to the allocation information, according to the predetermined rule. Thus, the inter-edge point line core (surrounding) vector sequence generating unit 3120 can generate an inter-edge point line core (surrounding) vector sequence having a line width of 0. For example, the generated inter-edge point line core (surrounding) vector sequence can be expressed using the data format illustrated in FIG. 32. The inter-edge point line core (surrounding) vector sequence generating unit 3120 can output the inter-edge point line core (surrounding) vector sequence having the data format illustrated in FIG. 32.

FIG. 35 illustrates an inter-edge point line element coarse contour vector sequence (i.e., a vector sequence expressed using a bold line) and an inter-edge point line core (surrounding) vector sequence (i.e., a vector sequence using a thin line connecting pixel positions of an input binary image) having a line width of 0.

Next, an exemplary operation of the inter-edge point auxiliary vector inclusion (surrounding) vector sequence generating unit 3210 is described below.

The inter-edge point auxiliary vector inclusion (surrounding) vector sequence generating unit 3210 inserts auxiliary vectors before the inter-edge point auxiliary vector inclusion (surrounding) vector sequence smoothing unit 3220 performs smoothing (function approximation) processing. More specifically, the inter-edge point auxiliary vector inclusion (surrounding) vector sequence generating unit 3210 inserts auxiliary vectors so that an edge point portion can be reserved as an edge point (i.e., anchor point of a Bezier curve). This processing prevents a vector corresponding to an edge point portion from being integrated with another vector and can prevent the position of any edge point from becoming unclear when the inter-edge point auxiliary vector inclusion (surrounding) vector sequence smoothing unit 3220 performs the smoothing (function approximation) processing.

In addition, the inter-edge point smoothed vector sequence identifying (non-surrounding) unit 3230 generates start/end edge point information based on the smoothed (function approximated) inter-edge point auxiliary vector inclusion (surrounding) vector sequence input from the inter-edge point auxiliary vector inclusion (surrounding) vector sequence smoothing unit 3220. More specifically, the inter-edge point smoothed vector sequence identifying (non-surrounding) unit 3230 identifies a vector serving as a start edge point and a vector serving as an end edge point from each smoothed (surrounding) vector, and generates the start/end edge point information for each smoothed (surrounding) vector that can be used in generation of a non-surrounding vector sequence connecting only the start edge point to the end edge point.

In the first exemplary embodiment, the inter-edge point auxiliary vector inclusion (surrounding) vector sequence smoothing unit 3220 has a configuration similar to that discussed in U.S. Patent Application Publication No. US 2005/0238244 A1. This configuration enables smoothing a vector of a complete thinned line image using a smoothing unit for a contour (outline) vector of a binary image which may not be thinned yet.

According to U.S. Patent Application Publication No. US 2005/0238244 A1, the vector smoothing (function approximation) processing includes steps of inputting contour data (rough contour data) composed of alternate horizontal and vertical vectors extracted from binary raster image data, extracting tangential line segments from the line segments of a coarse contour, extracting anchor points from the extracted tangential line segments, and replacing a group of line segments connecting extracted anchor points with a combination of 2nd-order or 3rd-order Bezier curve(s) and straight line(s), or 3rd-order or 2nd-order Bezier curve(s) having been subjected to the Bezier curve approximation.

A method for applying function approximation to a group of contour points residing between two anchor points based on the determined as anchor points is a fundamental function approximation method. The position (coordinate values) of each anchor point does not change even when the contour points residing between two anchor points are function approximated to a 2-order or 3-order Bezier curve or a straight line.

Hence, the inter-edge point auxiliary vector inclusion (surrounding) vector sequence generating unit 3210 designates one edge point of an inter-edge point line core (surrounding) vector sequence as a start edge point and the other as an end edge point, and inserts auxiliary vectors (auxiliary contour points) between the start edge point and the end edge point so that both the start edge point and the end edge point become anchor points.

According to U.S. Patent Application Publication No. US 2005/0238244 A1, the extraction conditions of a vector representing a tangential line segment are as follows:
(1) two vectors positioned immediately before and after a target vector have opposite directions;
(2) a vector adjacent to an extracted main tangential line segment has a length L1 satisfying a relationship "L1$\geq \theta_4$;" and
(3) a vector length L2 satisfying a relationship "L2$\geq \theta_5$."

Furthermore, the extraction of anchor points includes extracting new points from an extracted tangential line segment and designating each extracted point as an anchor point. Two anchor points can be extracted from two edges of a tangential line segment. If two extracted anchor points are identical to each other, only one anchor point can be extracted.

If two anchor points are extracted, a portion between two anchor points is automatically designated as a straight line on the object. As a method for extracting an anchor point from one edge point of a tangential line segment, if a neighboring vector of a target vector (a target tangential line segment) is a tangential line segment, an edge point of the neighboring vector is an anchor point.

Hence, the inter-edge point auxiliary vector inclusion (surrounding) vector sequence generating unit 3210 designates one edge point of an inter-edge point line core (surrounding) vector sequence as a start edge point and the other as an end edge point, and inserts auxiliary points so that both the start edge point and the end edge point become anchor points.

Figure 37A:
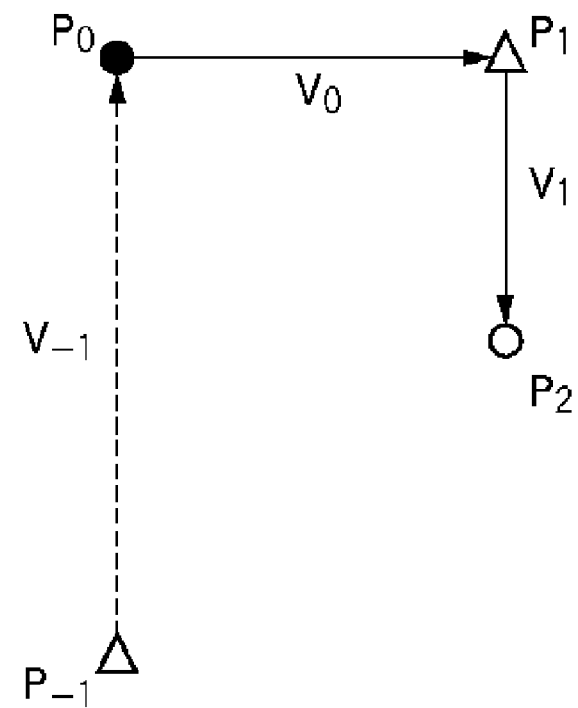
FIGS. 37A and 37B illustrate auxiliary contour points inserted immediately before a start edge point and after an end edge point according to the first exemplary embodiment of the present invention.

FIG. 37A illustrates an exemplary method for inserting an auxiliary contour point $P_{-1}$ immediately before an edge point $P_0$ which is to be a start edge point.

An auxiliary vector $V_{-1}$ includes the auxiliary contour point $P_{-1}$ as a start point. A vector $V_1$ includes a contour point $P_1$ immediately after the edge point $P_0$ as a start point. Thus, two vectors $V_{-1}$ and $V_1$ have opposite directions. In other words, three vectors $V_{-1}$, $V_0$, and $V_1$ illustrated in FIG. 37A can satisfy the above-described tangential line segment extraction condition (1) of U.S. Patent Application Publication No. US 2005/0238244 A1. Thus, the vector $V_0$ becomes a tangential line segment.

Furthermore, if the auxiliary vector $V_{-1}$ starting from the auxiliary contour point $P_{-1}$ has a sufficient length satisfying the above-described tangential line segment extraction condition (3) of U.S. Patent Application Publication No. US 2005/0238244 A1, the auxiliary vector $V_{-1}$ also becomes a tangential line segment. Namely, both the auxiliary vector $V_{-1}$ and the vector V become tangential line segments. As a result, the edge point P (i.e., a point to be a start edge point) becomes an anchor point according to the conditions in the above-described anchor point extracting method (i.e., if a neighboring vector of a target vector (i.e., a target tangential line segment) is a tangential line segment, an edge point of the neighboring vector becomes an anchor point).

Figure 37B:
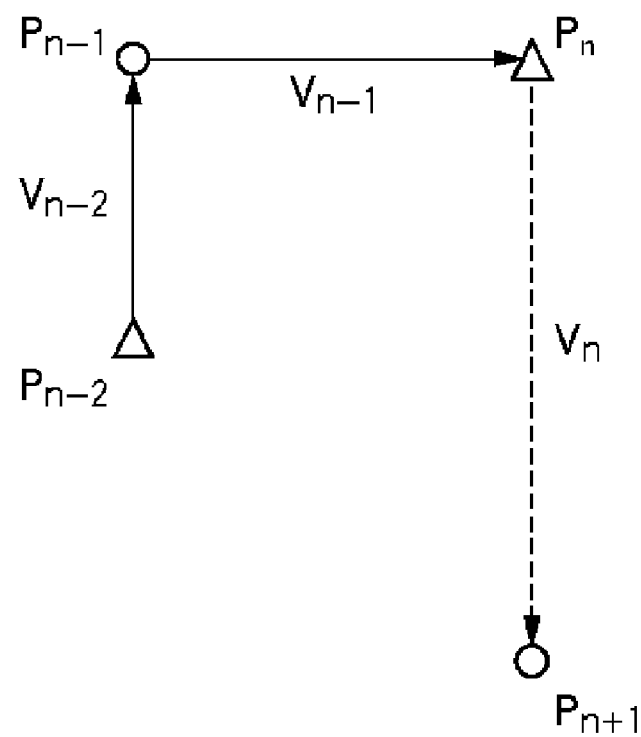

FIG. 37B illustrates an exemplary method for inserting an auxiliary contour point $P_{n+1}$ immediately after an edge point $P_n$ which is to be an end edge point.

An auxiliary vector $V_n$ includes an auxiliary contour point $P_{n+1}$ as an endpoint. A vector $V_{n-2}$ includes a contour point $P_{n-1}$ as an end point. Thus, two vectors $V_n$ and $V_{n-2}$ have opposite directions. In other words, three vectors $V_{n-2}$, $V_{n-1}$, and $V_n$ illustrated in FIG. 37B can satisfy the above-described tangential line segment extraction condition (1) of U.S. Patent Application Publication No. US 2005/0238244 A1. Thus, the vector $V_{n-1}$ becomes a tangential line segment. Furthermore, if the auxiliary vector $V_n$ ending at the auxiliary contour point $P_{n+1}$ has a sufficient length satisfying the above-described tangential line segment extraction condition (3) of U.S. Patent Application Publication No. US 2005/0238244 A1, the auxiliary vector $V_n$ also becomes a tangential line segment.

Namely, both the auxiliary vector $V_n$ and the vector $V_{n-1}$ become tangential line segments. As a result, the edge point $P_n$ (i.e., a point to be an end edge point) becomes an anchor point according to the conditions in the above-described anchor point extracting method (i.e., if a neighboring vector of a target vector (i.e., a target tangential line segment) is a tangential line segment, an edge point of the neighboring vector is an anchor point).

In this manner, the inter-edge point auxiliary vector inclusion (surrounding) vector sequence generating unit 3210 determines a point to be inserted immediately before the start edge point and a point to be inserted immediately after the end edge point so that the start edge point and the end edge point become anchor points. Then, the inter-edge point auxiliary vector inclusion (surrounding) vector sequence generating unit 3210 generates a contour point sequence composed of serially joined horizontal and vertical vectors connecting the inserted points, which includes the inherent contour point sequence extending from the start edge point to the end edge point and a newly added portion extending from the end edge point to the start edge point via the inserted points. Furthermore, the inter-edge point auxiliary vector inclusion (surrounding) vector sequence generating unit 3210 generates start/end edge point information that identifies the start edge point and the end edge point in the contour point sequence.

In the first exemplary embodiment, the start/end edge point information includes coordinate values of the start edge point and coordinate values of the end edge point.

Figure 38:
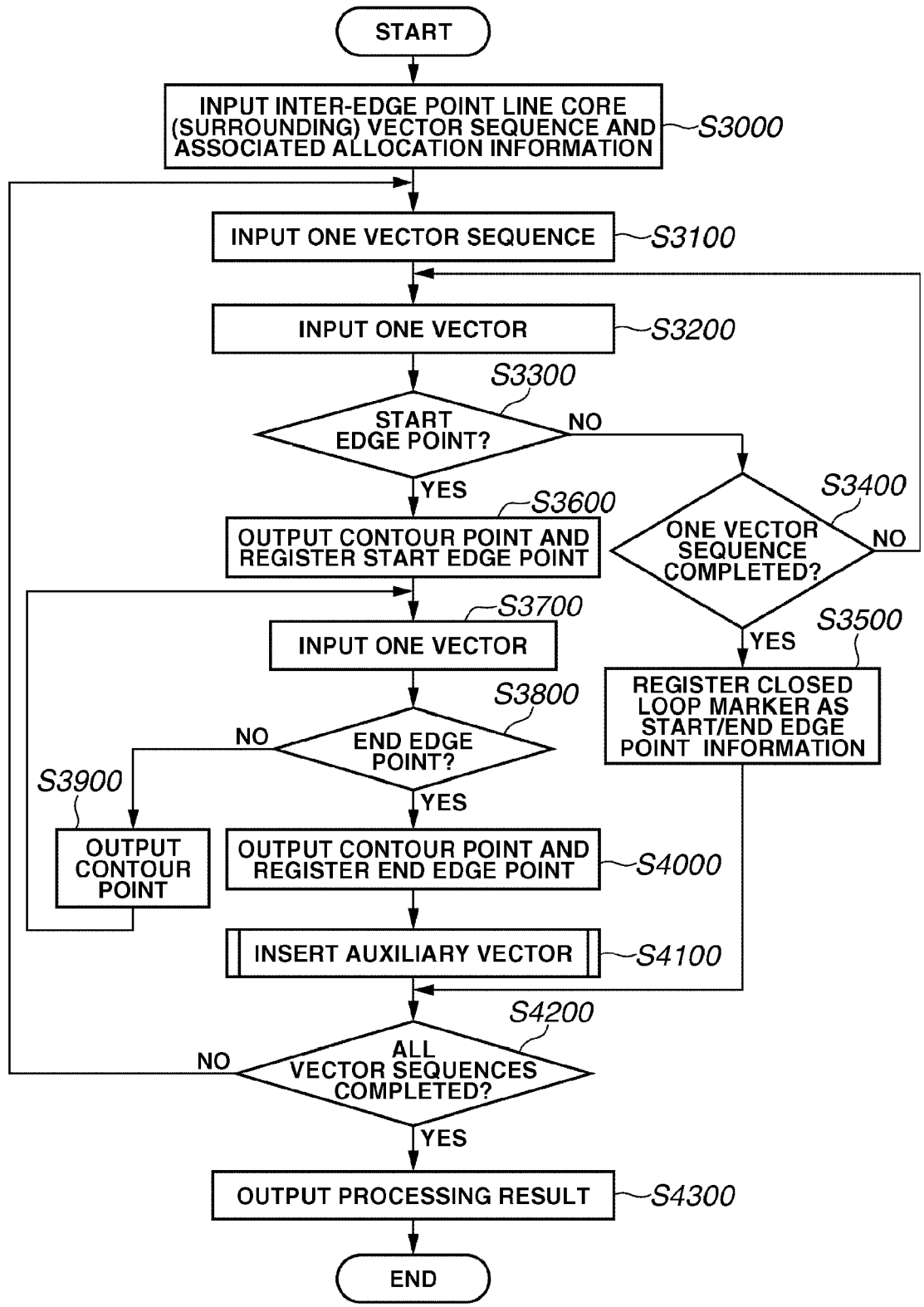
FIG. 38 is a flowchart illustrating an operation of an inter-edge point auxiliary vector inclusion (surrounding) vector sequence generating unit according to the first exemplary embodiment of the present invention.

FIG. 38 is a flowchart illustrating an exemplary operation of the inter-edge point auxiliary vector inclusion (surrounding) vector sequence generating unit 3210 according to the first exemplary embodiment of the present invention. The CPU 519 of the image processing apparatus realizes this processing.

First, in step S3000, the inter-edge point auxiliary vector inclusion (surrounding) vector sequence generating unit 3210 inputs an inter-edge point line core (surrounding) vector sequence having a line width of 0 from the inter-edge point line core (surrounding) vector sequence generating unit 3120.

In step S3100, the inter-edge point auxiliary vector inclusion (surrounding) vector sequence generating unit 3210 successively determines one vector sequence (the k-th contour ($1 \leq k \leq a$) in FIG. 32) as a current processing object, from the inter-edge point line core (surrounding) vector sequence input in step S3000 which has the data format illustrated in FIG. 32.

In step S3200, the inter-edge point auxiliary vector inclusion (surrounding) vector sequence generating unit 3210 inputs one vector, as a processing object, i.e., a contour point (the q-th point ($1 \leq q \leq p$)) of one vector in the vector sequence (the total number of points: p) determined in step S3100. The processing of step S3200 includes successively selecting a processing object in ascending order from the first point to the p-th point, every time the processing of step S3200 is executed, until a start edge point is detected in step S3300.

In step S3300, the inter-edge point auxiliary vector inclusion (surrounding) vector sequence generating unit 3210 determines whether the contour point is a vector to be a start edge point with reference to the contour point information of the contour point determined in step S3200. If the contour point is a vector to be a start edge point (YES in step S3300), the processing flow proceeds to step S3600. If the contour point is not a vector to be a start edge point (NO in step S3300), the processing flow proceeds to step S3400.

The determination of step S3300 can be performed with reference to the contour point information of the contour point. More specifically, the inter-edge point auxiliary vector inclusion (surrounding) vector sequence generating unit 3210 determines whether the contour point is any one of UP_RIGHT_LT(03H), DOWN_LEFT_RB(0FH), LEFT_UP_BL(17H), and RIGHT_DOWN_TR(1BH) in FIG. 28. This processing can be realized by checking whether numerical values of bit1 and bit0 in the "value" filed of FIG. 28 are both 1.

In step S3400, the inter-edge point auxiliary vector inclusion (surrounding) vector sequence generating unit 3210 determines whether the processing for all vectors of one vector sequence in the inter-edge point line core (surrounding) vector sequence input in step S3100 has been completed. If the processing for all vectors of one vector sequence has not been completed yet (NO in step S3400), the processing flow returns to step S3200 to execute the determination in step S3300 for the next vector in the vector sequence. If the processing for all vectors of one vector sequence has been completed (YES in step S3400), it is determined that the vector sequence input in step S3100 includes no start edge point candidate. The processing flow proceeds to step S3500.

In step S3500, the inter-edge point auxiliary vector inclusion (surrounding) vector sequence generating unit 3210 allocates a closed loop marker to the vector sequence. The closed loop marker indicates that the vector sequence is a closed loop including no edge point. The inter-edge point auxiliary vector inclusion (surrounding) vector sequence generating unit 3210 directly outputs sequential vectors of the vector sequence.

FIG. 39A illustrates a data format of the vector sequence, according to which the s-th vector sequence is a processing object including a total of v vectors. Two closed loop markers have edge point coordinates of (−1, −1) which are allocated as start/end edge point information, although these coordinate values do not exist. When the processing of step S3500 has been completed, the processing flow proceeds to step S4200.

In step S3600, the inter-edge point auxiliary vector inclusion (surrounding) vector sequence generating unit 3210 registers the contour point as a start edge point and outputs the contour point as one vector extending from the start edge point to the end edge point. Then, the processing flow proceeds to step S3700.

In step S3700, similar to step S3200, the inter-edge point auxiliary vector inclusion (surrounding) vector sequence generating unit 3210 inputs one vector, as a processing object, i.e., a contour point (the q-th point ($1 \leq q \leq p$)) of one vector in the vector sequence (the total number of points: p) determined in step S3100. The processing of step S3700 includes successively selecting a processing object in ascending order from the contour point determined in step S3200 toward the p-th point, every time the processing of step S3700 is executed, until an end edge point is detected in step S3800. Then, the processing flow proceeds to step S3800.

In step S3800, the inter-edge point auxiliary vector inclusion (surrounding) vector sequence generating unit 3210 determines whether the contour point is a vector to be an end edge point with reference to the contour point information of the contour point determined in step S3700. If the contour point is a vector to be an end edge point (YES in step S3800), the processing flow proceeds to step S4000. If the contour point is not a vector to be an end edge point (NO in step S3800), the processing flow proceeds to step S3900.

The determination of step S4000 can be performed with reference to the contour point information of the contour point. More specifically, the inter-edge point auxiliary vector inclusion (surrounding) vector sequence generating unit 3210 determines whether the contour point is any one of UP_RIGHT_TL(01H), DOWN_LEFT_BR(0DH), LEFT_UP_LB(15H), and RIGHT_DOWN_RT(19H) in FIG. 28. This processing can be realized by checking whether numerical values of bit1 and bit0 in the "value" filed of FIG. 28 are 0 and 1.

In step S3900, the inter-edge point auxiliary vector inclusion (surrounding) vector sequence generating unit 3210 outputs the contour point as one vector extending from the start edge point to the end edge point. Then, the processing flow returns to step S3700.

In step S4000, the inter-edge point auxiliary vector inclusion (surrounding) vector sequence generating unit 3210 registers the contour point as an end edge point and outputs the contour point as one vector extending from the start edge point to the end edge point. Then, the processing flow proceeds to step S4100.

In step S4100, the inter-edge point auxiliary vector inclusion (surrounding) vector sequence generating unit 3210 generates sequential auxiliary vectors to be inserted between the end edge point and the start edge point, because both the start edge point and the end edge point of the vector sequence are determined and sequential vectors connecting the start edge point and the end edge point are already output. Detailed processing in step S4100 will be described with reference to FIGS. 40 through 42. When the processing of step S4100 has been completed, the processing flow proceeds to step S4200.

In step S4200, the inter-edge point auxiliary vector inclusion (surrounding) vector sequence generating unit 3210 determines whether the processing for all vector sequences in the inter-edge point line core (surrounding) vector sequence input in step S3000 has been completed. If the processing for all vector sequences has been completed (YES in step S4200), the processing flow proceeds to step S4300. If the processing for all vector sequences has not been completed (NO in step S4200), the processing flow returns to step S3100 to execute the processing of steps S3200 through S4200 for the next vector sequence.

In step S4300, the inter-edge point auxiliary vector inclusion (surrounding) vector sequence generating unit 3210 outputs a processing result of the inter-edge point line core (surrounding) vector sequence input in step S3000.

FIG. 39B illustrates an output example of a vector sequence to be output when both a start edge point and an end edge point of a vector sequence (i.e., a processing object) are determined and sequential auxiliary vectors to be inserted between the end edge point and the start edge point are generated in addition to the sequential vectors connecting the start edge point and the end edge point.

In FIG. 39B, the u-th vector sequence is a processing object that includes a total of t sequential vectors constituting a vector sequence connecting a start edge point (i.e., the first point) to an end edge point (i.e., the t-th point) and a total of r sequential auxiliary vectors to be inserted between the end edge point and the start edge point.

FIG. 40 is a flowchart illustrating details of the processing in step S4100 of FIG. 38 according to the first exemplary embodiment of the present invention. More specifically, in a state where both a start edge point and an end edge point of the vector sequence are determined and sequential vectors connecting the start edge point to the end edge point are output, the inter-edge point auxiliary vector inclusion (surrounding) vector sequence generating unit 3210 generates sequential auxiliary vectors to be inserted between the end edge point and the start edge point.

In step S4110, as described with reference to FIG. 37A, the inter-edge point auxiliary vector inclusion (surrounding) vector sequence generating unit 3210 calculates coordinate values of the auxiliary contour point $P_{-1}$ to be inserted immediately before the edge point $P_0$ which is to be a start edge point. Namely, the inter-edge point auxiliary vector inclusion (surrounding) vector sequence generating unit 3210 determines the direction of the auxiliary vector $V_{-1}$ starting from the auxiliary contour point $P_{-1}$ so as to be opposed to the direction of the vector $V_1$ starting from the contour point $P_1$ to be inserted immediately after the edge point $P_0$. Furthermore, the inter-edge point auxiliary vector inclusion (surrounding) vector sequence generating unit 3210 determines the length of the auxiliary vector $V_{-1}$ so as to satisfy the above-described tangential line segment extraction condition (3) of U.S. Patent Application Publication No. US 2005/0238244 A1. For example, the length of the auxiliary vector $V_{-1}$ is set to be equal to or greater than the length of ten pixels.

In step S4120, as described with reference to FIG. 37B, the inter-edge point auxiliary vector inclusion (surrounding) vector sequence generating unit 3210 calculates coordinate values of the auxiliary contour point $P_{n+1}$ to be inserted immediately after the edge point $P_n$ which is to be an end edge point. Namely, the inter-edge point auxiliary vector inclusion (surrounding) vector sequence generating unit 3210 determines the direction of the auxiliary vector $V_n$ ending at the auxiliary contour point $P_{n+1}$ so as to be opposed to the direction of the vector $V_{n-2}$ ending at the contour point $P_{n-1}$. Furthermore, the inter-edge point auxiliary vector inclusion (surrounding) vector sequence generating unit 3210 determines the length of the auxiliary vector $V_n$ so as to satisfy the above-described tangential line segment extraction condition (3) of U.S. Patent Application Publication No. US 2005/0238244 A1. For example, the length of the auxiliary vector $V_n$ is set to be equal to or greater than the length of ten pixels.

In step S4130, the inter-edge point auxiliary vector inclusion (surrounding) vector sequence generating unit 3210 determines whether the auxiliary vector $V_{-1}$ starting from the auxiliary contour point $P_{-1}$ and the auxiliary vector $V_n$ ending at the auxiliary contour point $P_{n+1}$ are both horizontal vectors or vertical vectors. If the auxiliary vectors $V_{-1}$ and $V_n$ satisfy the conditions (YES in step S4130), the processing flow proceeds to step S4140. If the auxiliary vectors $V_{-1}$ and $V_n$ do not satisfy the conditions (NO in step S4130), the processing flow proceeds to step S4160.

Figure 41:
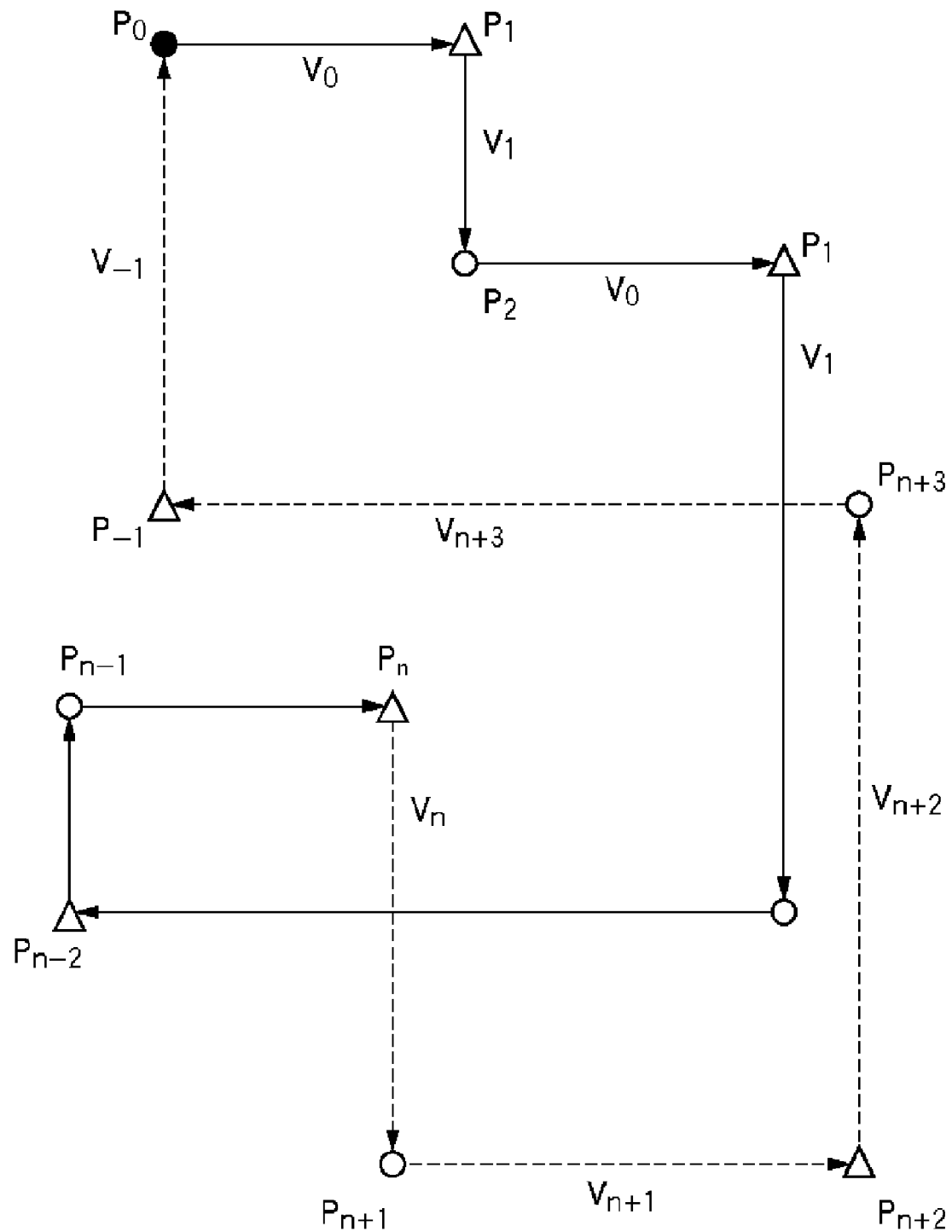
FIG. 41 illustrates auxiliary vectors inserted between an end edge point and a start edge point according to the first exemplary embodiment of the present invention.

FIG. 41 illustrates exemplary processing performed in step S4140 (i.e., when the compared auxiliary vectors $V_{-1}$ and $V_n$ are two horizontal vectors or two vertical vectors). In step S4140, the inter-edge point auxiliary vector inclusion (surrounding) vector sequence generating unit 3210 calculates a second auxiliary contour point $P_{n+2}$ succeeding the first auxiliary contour point $P_{n+1}$. More specifically, the inter-edge point auxiliary vector inclusion (surrounding) vector sequence generating unit 3210 determines a vector $V_{n+1}$ starting from the auxiliary contour point $P_{n+1}$ and ending at the auxiliary contour point $P_{n+2}$ so as to satisfy the above-described tangential line segment extraction condition (3) of U.S. Patent Application Publication No. US 2005/0238244 A1. The second auxiliary contour point $P_{n+2}$ is positioned far from the auxiliary contour point $P_{-1}$, compared to the first auxiliary contour point $P_{n+1}$. For example, the length of the auxiliary vector $V_{n+2}$ is set to be equal to or greater than the length of ten pixels.

In step S4150, the inter-edge point auxiliary vector inclusion (surrounding) vector sequence generating unit 3210 calculates a third auxiliary contour point $P_{n+3}$ succeeding the second auxiliary contour point $P_{n+2}$. More specifically, the inter-edge point auxiliary vector inclusion (surrounding) vector sequence generating unit 3210 determines the third auxiliary contour point $P_{n+3}$ so that two auxiliary contour points $P_{n+2}$ and $P_{-1}$ can be connected with alternate horizontal and vertical vectors. The third auxiliary contour point $P_{n+3}$ is positioned next to the edge point $P_0$ but one auxiliary contour point (i.e., $P_{-1}$). When the above-described sequential processing has been completed, the processing flow returns to step S4200 in the flowchart of FIG. 38.

Figure 42:
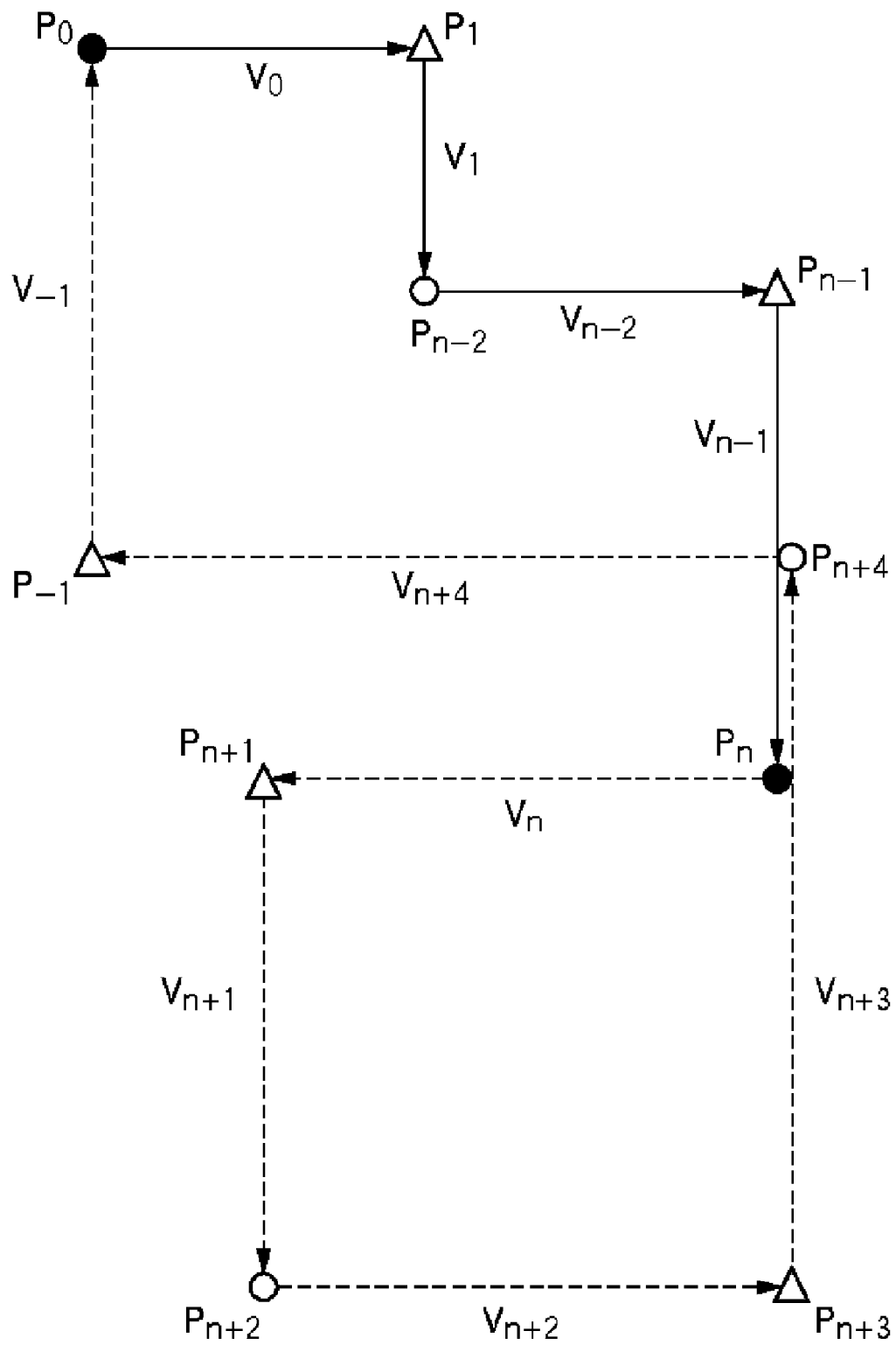
FIG. 42 illustrates auxiliary vectors inserted between an end edge point and a start edge point according to the first exemplary embodiment of the present invention.

FIG. 42 illustrates exemplary processing performed in step S4160 (i.e., when the compared auxiliary vectors $V_{-1}$ and $V_n$ are a combination of a horizontal vector and a vertical vector). In step S4160, the inter-edge point auxiliary vector inclusion (surrounding) vector sequence generating unit 3210 calculates a second auxiliary contour point $P_{n+2}$ succeeding the first auxiliary contour point $P_{n+1}$. More specifically, the inter-edge point auxiliary vector inclusion (surrounding) vector sequence generating unit 3210 determines a vector $V_{n+1}$ starting from the auxiliary contour point $P_{n+1}$ and ending at the auxiliary contour point $P_{n+2}$ so as to satisfy the above-described tangential line segment extraction condition (3) of U.S. Patent Application Publication No. US 2005/0238244 A1. The second auxiliary contour point $P_{n+2}$ is positioned far from the auxiliary contour point $P_{-1}$, compared to the first auxiliary contour point $P_{n+1}$. For example, the length of the auxiliary vector $V_{n+1}$ is set to be equal to or greater than the length of ten pixels.

In step S4170, the inter-edge point auxiliary vector inclusion (surrounding) vector sequence generating unit 3210 calculates a third auxiliary contour point $P_{n+3}$ succeeding the second auxiliary contour point $P_{n+2}$. More specifically, the inter-edge point auxiliary vector inclusion (surrounding) vector sequence generating unit 3210 determines a vector $V_{n+2}$ starting from the auxiliary contour point $P_{n+2}$ and ending at the auxiliary contour point $P_{n+3}$ so as to satisfy the above-described tangential line segment extraction condition (3) of U.S. Patent Application Publication No. US 2005/0238244 A1. The third auxiliary contour point $P_{n+2}$ is positioned far from the auxiliary contour point $P_{-1}$, compared to the second auxiliary contour point $P_{n+1}$. For example, the length of the auxiliary vector $V_{n+3}$ is set to be equal to or greater than the length of ten pixels.

In step S4180, the inter-edge point auxiliary vector inclusion (surrounding) vector sequence generating unit 3210 calculates a fourth auxiliary contour point $P_{n+4}$ succeeding the third auxiliary contour point $P_{n+3}$. More specifically, the inter-edge point auxiliary vector inclusion (surrounding) vector sequence generating unit 3210 determines the fourth auxiliary contour point $P_{n+4}$ so that two auxiliary contour points $P_{n+3}$ and $P_{-1}$ can be connected with alternate horizontal and vertical vectors. The fourth auxiliary contour point $P_{n+4}$ is positioned next to the edge point $P_0$ but one auxiliary contour point (i.e., $P_{-1}$). When the above-described sequential processing has been completed, the processing flow returns to step S4200 in the flowchart of FIG. 38.

As described above, the inter-edge point auxiliary vector inclusion (surrounding) vector sequence generating unit 3210 inputs an inter-edge point line core (surrounding) vector sequence from the inter-edge point line core (surrounding) vector sequence generating unit 3210. Then, the inter-edge point auxiliary vector inclusion (surrounding) vector sequence generating unit 3210 inserts auxiliary vectors to prevent a vector corresponding to the edge point portion from being integrated with another vector. In other words, this processing can prevent the position of any edge point from becoming unclear when the inter-edge point auxiliary vector inclusion (surrounding) vector sequence smoothing unit 3220 performs smoothing (function approximation) processing. Namely, the inter-edge point auxiliary vector inclusion (surrounding) vector sequence generating unit 3210 inserts auxiliary vectors so that an edge point portion can be reserved as an edge point (i.e., anchor point of a Bezier curve), and generates an inter-edge point auxiliary vector inclusion (surrounding) vector sequence.

In addition, the inter-edge point auxiliary vector inclusion (surrounding) vector sequence generating unit 3210 generates start/end edge point information that indicates a vector corresponding to an edge point portion, for each inter-edge point auxiliary vector inclusion (surrounding) vector sequence that includes auxiliary vectors. The present embodiment uses a data format similar to FIG. 32 to output the generated processing result. In this case, each contour data portion of FIG. 32 is replaced with vector sequence data illustrated in FIG. 39A or FIG. 39B.

As described above, the inter-edge point auxiliary vector inclusion (surrounding) vector sequence smoothing unit 3220 has a configuration similar to that discussed in U.S. Patent Application Publication No. US 2005/0238244 A1. The inter-edge point auxiliary vector inclusion (surrounding) vector sequence smoothing unit 3220 generates a smoothed (function approximated) inter-edge point auxiliary vector inclusion (surrounding) vector sequence that includes each (surrounding) vector being smoothed (function approximated) in a state where a portion corresponding to an edge point portion is reserved as an edge point.

The inter-edge point auxiliary vector inclusion (surrounding) vector sequence smoothing unit 3220 outputs the generated smoothed (function approximated) inter-edge point auxiliary vector inclusion (surrounding) vector sequence to the inter-edge point smoothed vector sequence identifying (non-surrounding) unit 3230. Furthermore, the inter-edge point auxiliary vector inclusion (surrounding) vector sequence smoothing unit 3220 outputs the start/end edge point information generated by the inter-edge point auxiliary vector inclusion (surrounding) vector sequence generating unit 3210 to the inter-edge point smoothed vector sequence identifying (non-surrounding) unit 3230.

The inter-edge point smoothed vector sequence identifying (non-surrounding) unit 3230 inputs the smoothed (function approximated) inter-edge point auxiliary vector inclusion (surrounding) vector sequence from the inter-edge point auxiliary vector inclusion (surrounding) vector sequence smoothing unit 3220. Furthermore, the inter-edge point smoothed vector sequence identifying (non-surrounding) unit 3230 inputs the start/end edge point information from the inter-edge point auxiliary vector inclusion (surrounding) vector sequence generating unit 3210.

Then, the inter-edge point smoothed vector sequence identifying (non-surrounding) unit 3230 identifies coordinate values of each vector in each smoothed (surrounding) vector sequence based on the compassion with the coordinate values of the contour points serving as the start edge point and the end edge point. The inter-edge point smoothed vector sequence identifying (non-surrounding) unit 3230 generates a non-surrounding vector sequence connecting the start edge point to the end edge point to form an inter-edge point smoothed (non-surrounding) vector sequence. The inter-edge point smoothed vector sequence identifying (non-surrounding) unit 3230 outputs the inter-edge point smoothed (non-surrounding) vector sequence to the individual region vector generating unit 40.

The generated processing result can be expressed using a data format similar to the data format illustrated in FIG. 32, although attribute information indicating whether each contour point is an anchor point is attached to each contour point. In this case, the identified start edge point is the first point. The end edge point is the final point of the same line element vector.

Namely, the first contour portion of FIG. 32 is a data portion of the first line element. The first point is a start edge point of the first line element. The b-th point is an end edge point of the first line element. The present embodiment uses this kind of data format to output the processing result.

In this manner, the processing loop of steps S50 through S80 in the flowchart of FIG. 10 can successively generate an inter-edge point vector for each boundary line image connecting an intersection to another intersection. When the processing for generating inter-edge point vectors for all boundary lines has been completed, the processing for generating an individual region vector is executed in step S100.

Figure 43:
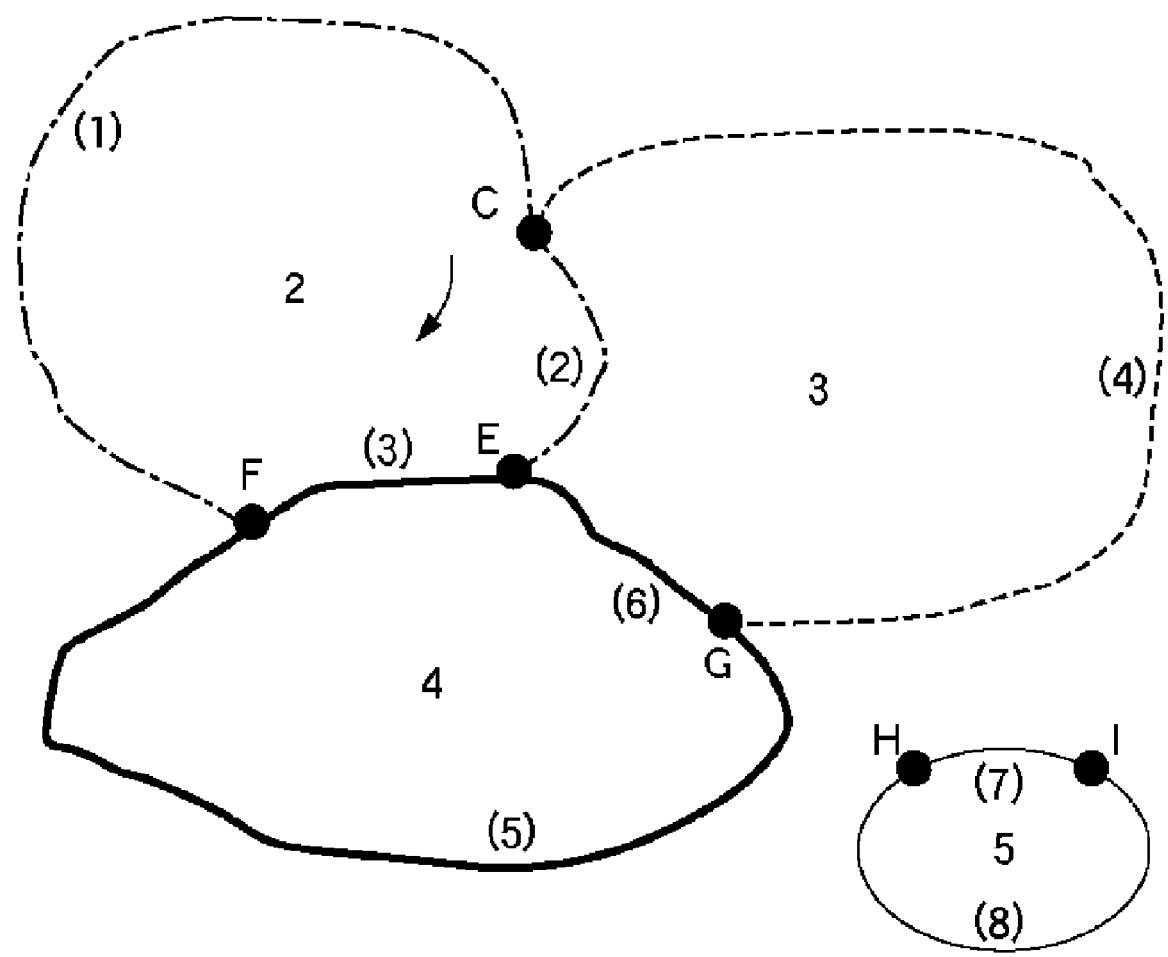
FIG. 43 illustrates examples of boundary lines each connecting an intersection and another intersection according to the first exemplary embodiment of the present invention.
Figure 44A:
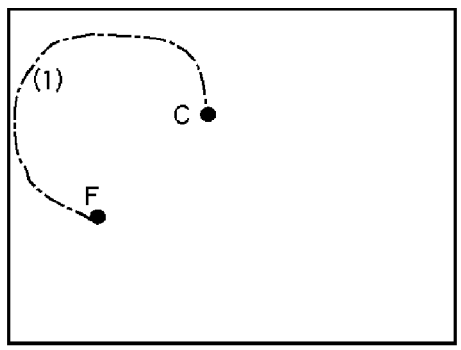
FIGS. 44A through 44H illustrate sequential processes for generating a boundary line image according to the first exemplary embodiment of the present invention.
Figure 44B:
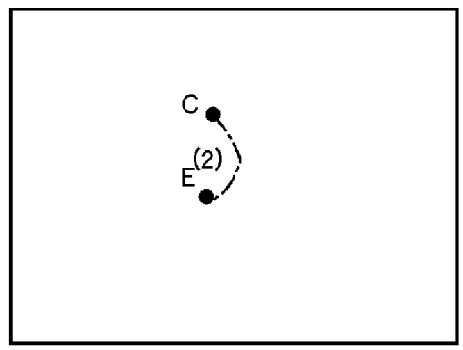
Figure 44C:
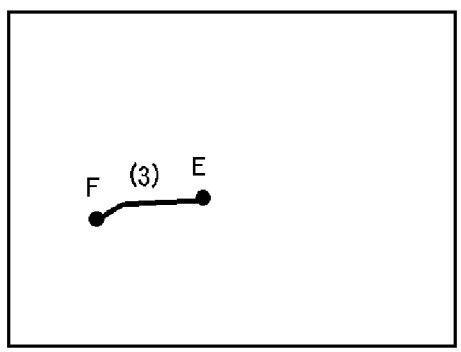
Figure 44D:
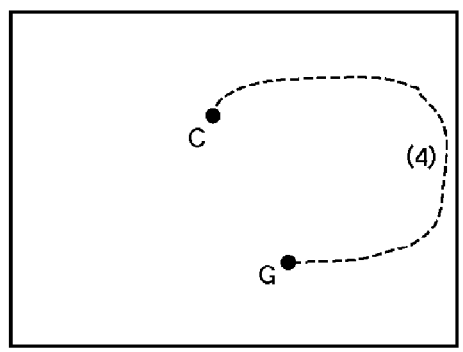
Figure 44E:
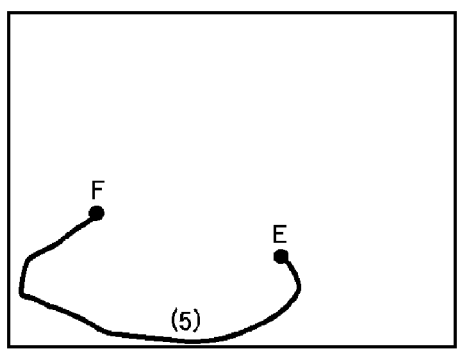
Figure 44F:
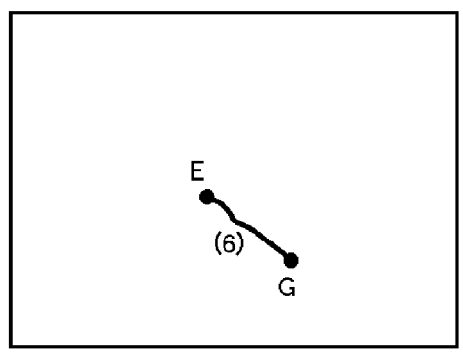
Figure 44G:
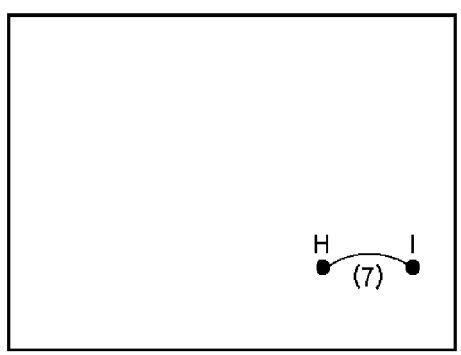
Figure 44H:
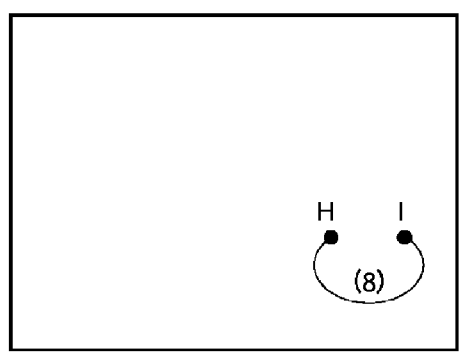

Namely, as illustrated in FIG. 43, if any boundary line connecting intersections is present, the present embodiment successively generates an inter-edge point vector connecting an intersection to another intersection as illustrated in FIGS. 44A through 44H.

Figure 45:
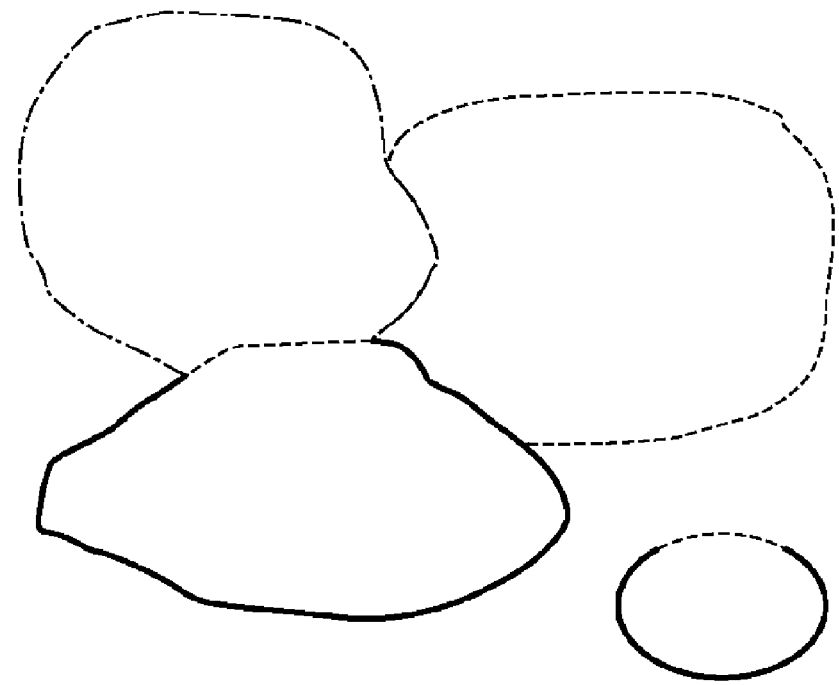
FIG. 45 illustrates an image including boundary lines represented by smoothed inter-edge point vectors according to the first exemplary embodiment of the present invention.
Figure 46:
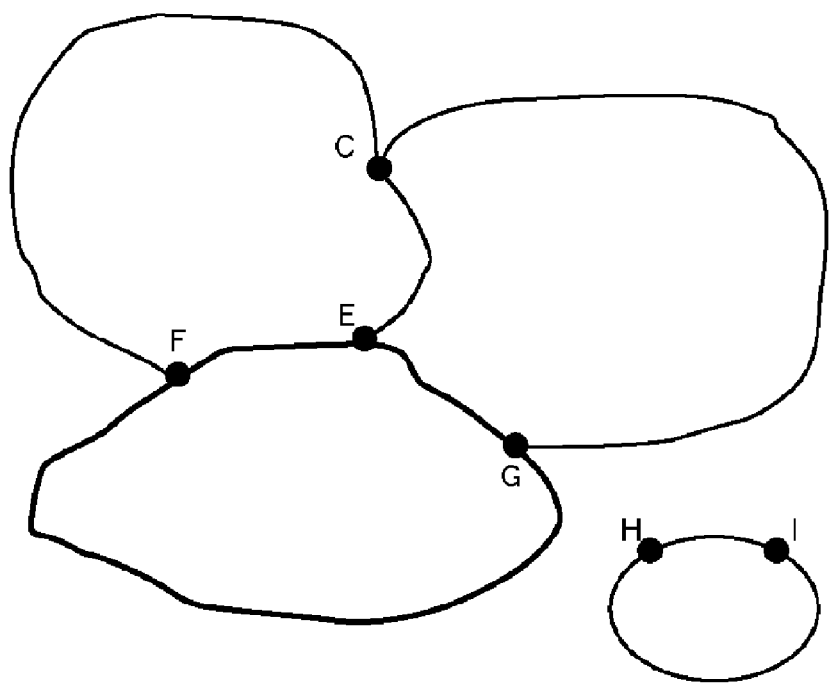
FIG. 46 illustrates an image including the boundary line image illustrated in FIG. 45 and corresponding intersections according to the first exemplary embodiment of the present invention.

FIG. 45 illustrates an image including all boundary lines having been subjected to the inter-edge point vector generation processing. FIG. 46 illustrates an image including the boundary line image illustrated in FIG. 45 and original edge point portions of the inter-edge point smoothed (non-surrounding) vector sequence.

The intersections extracted in step S30 and each intersection in a boundary line image connecting intersections generated in step S50 remain unchanged even after the processing of steps S50 through S80 has been completed. The position of each intersection and the positional relationship between intersections can be reserved as those of edge points of the inter-edge point smoothed (non-surrounding) vector sequence. In this respect, the intersections extracted in step S30 can be consistently processed as edge points in the processing of steps S50 through S80.

In step S100, the individual region vector generating unit 40 executes individual region vector generation processing. More specifically, the individual region vector generating unit 40 converts each region into a region vector including a surrounding function approximated (smoothed) inter-edge point vector sequence and its interior color, based on the inter-edge point vector information and color information of each region obtained by the region dividing processing.

As described above, the region boundary vector sequence identifying unit 410 and the region attribute allocating unit 420 configure the individual region vector generating unit 40.

Figure 47:
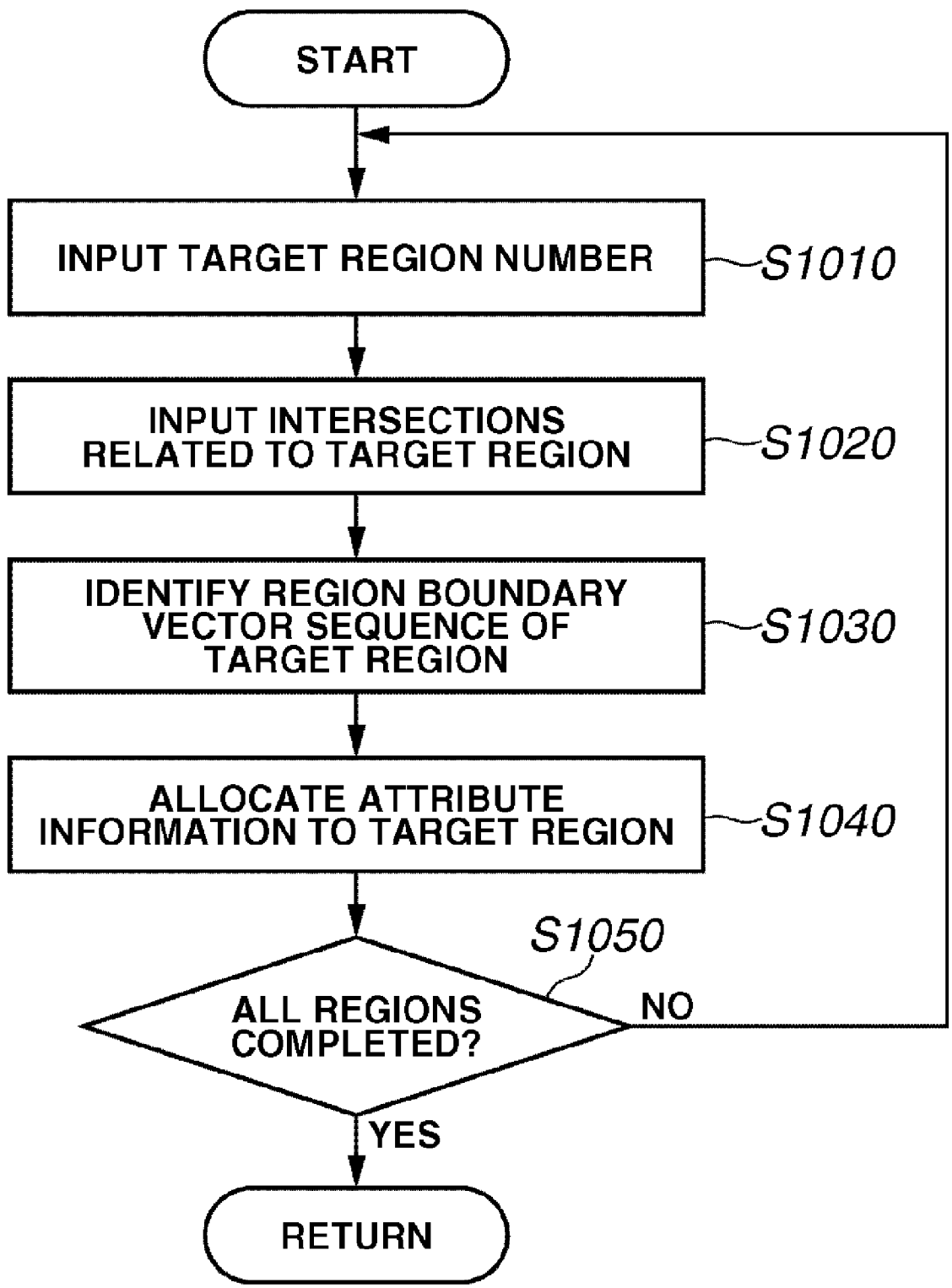
FIG. 47 is a flowchart illustrating details of individual region vector generation processing in step S100 of FIG. 10 according to the first exemplary embodiment of the present invention.

FIG. 47 is a flowchart illustrating details of the individual region vector generation processing in step S100 of FIG. 10 according to the first exemplary embodiment of the present invention.

In step S1010, the region boundary vector sequence identifying unit 410 inputs a target region number. Namely, the region boundary vector sequence identifying unit 410 inputs a region number of any one of the regions obtained in step S12. For example, the region boundary vector sequence identifying unit 410 can input a region number of each region with reference to the region table 201 illustrated in FIG. 2 that indicates the region number of each region and color information (attribute information) of each region. As described above, the RAM 520 stores the region table 201 generated on in step S13.

In step S1020, the region boundary vector sequence identifying unit 410 inputs intersections relating to the region number input in step S1010 (i.e., edge points: target region related intersections) with reference to the intersection table 601 of FIG. 6 generated in step S31. For example, if the region number input in step S1010 is 2, there are three intersections C:(22,40), E:(38,40), and F:(44,24) that include region number 2 in the neighboring region number field of the intersection table 601.

In step S1030, the region boundary vector sequence identifying unit 410 identifies a vector sequence (region boundary vector sequence) having edge points equal to the intersections input in step S1020, from the inter-edge point auxiliary vector inclusion (surrounding) vector sequence generated in step S70. If vector data has a data format similar to the data format illustrated in FIG. 32, the processing in step S1030 can be realized by checking whether a combination of the first point representing a start edge point and the final point representing the end edge point agrees with the coordinate values of the intersections extracted in step S1020.

The data in the intersection table 601 of FIG. 6 identifies three function approximated (smoothed) inter-edge point vectors as the target region and the region boundary vector sequence, from the vector data expressed in FIG. 46. The first function approximated (smoothed) inter-edge point vector is a vector sequence connecting points F and C (which is obtained from (1) of FIG. 43). The second function approximated (smoothed) inter-edge point vector is a vector sequence connecting points C and E (which is obtained from (2) of FIG. 43). The third function approximated (smoothed) inter-edge point vector is a vector sequence connecting points E and F (which is obtained from (3) of FIG. 43).

In step S1040, the region boundary vector sequence identifying unit 410 allocates corresponding region color information (attribute information) to the region boundary vector sequence of the target region identified in step S1030. The processing of step S1040 includes referring to the region table 201 illustrated in FIG. 2 that indicates the region number of each region and color information (attribute information) of each region, acquiring the color information (attribute information) of the region corresponding to the region number input in step S1010, and allocating the attribute information to the region boundary vector sequence of the target region.

In step S1050, the region boundary vector sequence identifying unit 410 determines whether the processing of steps S1010 through S1040 has been completed for all region numbers. If the processing for all region numbers has not been completed (NO in step S1050), the processing flow returns to step S1010. If the processing for all region numbers has been completed (YES in step S1050), region boundary vector sequence identifying unit 410 terminates the individual region vector generation processing of step S100 in the flowchart of FIG. 10.

For example, the determination in step S1050 includes checking whether the processing for all region numbers in the region table 201 of FIG. 2 has been completed, i.e., whether processing starting with the first data and ending with the last data in the region table 201 has been completed.

In this manner, the first exemplary embodiment can realize the sequential processing for generating vectors representing a color image (in particular, an illustration image).

Figure 48:
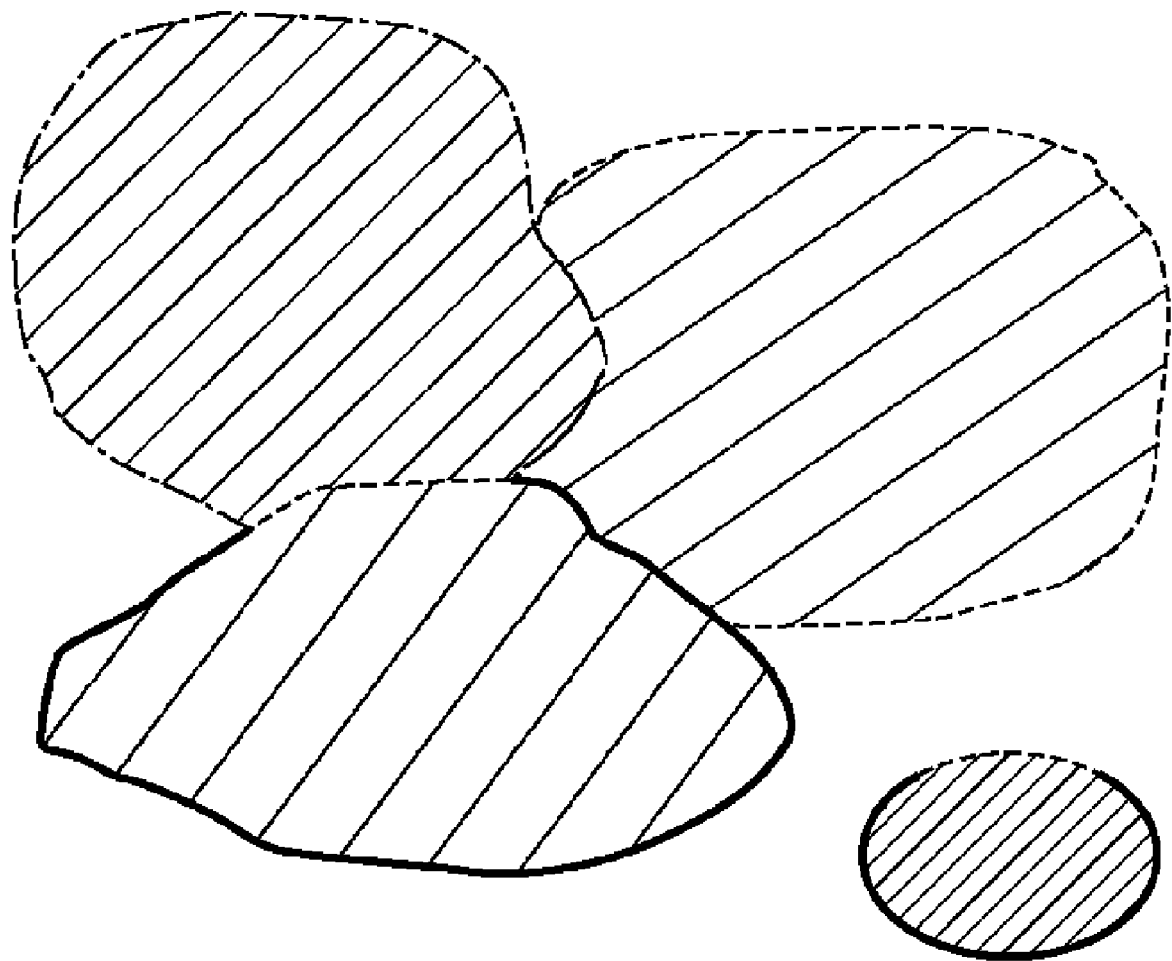
FIG. 48 illustrates an image reproduced from region vectors that include region attribute information according to the first exemplary embodiment of the present invention.

FIG. 48 illustrates an image reproduced from the region vector of each region obtained in step S100 that includes a surrounding function approximated (smoothed) inter-edge point vector sequence and its interior color.

The region dividing processing, the boundary point extracting processing, and the intersection extracting processing are described below in detail.

<Region Dividing Processing>

Figure 49:
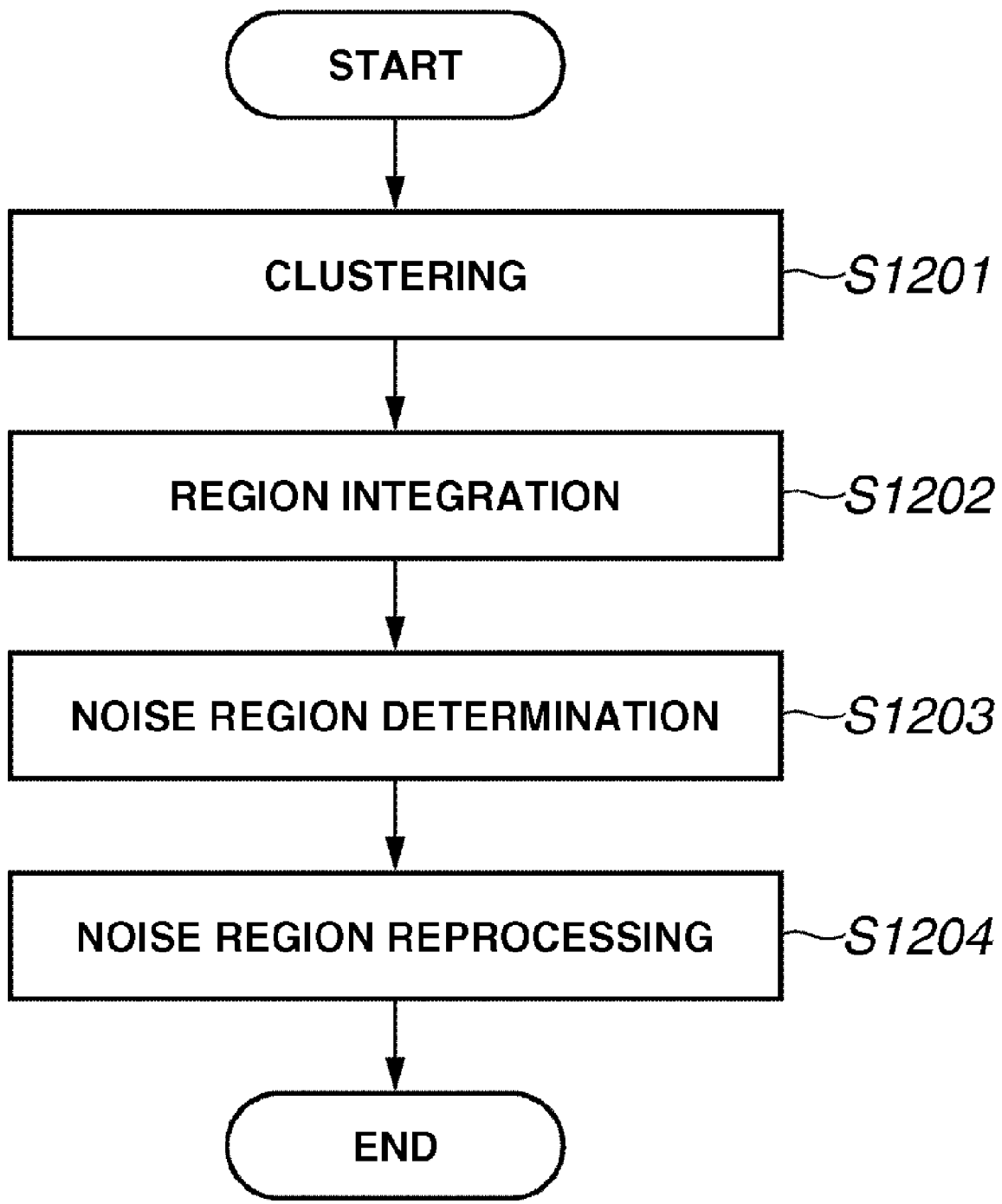
FIG. 49 is a flowchart illustrating details of region dividing processing in step S12 of FIG. 10 according to the first exemplary embodiment of the present invention.

FIG. 49 is a flowchart illustrating details of the region dividing processing in step S12 according to the first exemplary embodiment of the present invention.

In step S1201, the region dividing unit 121 performs clustering processing on a processing object image. The processing of step S1201 includes generating the first cluster from the start pixel having been raster scanned, and calculating the deviance of the next pixel relative to all clusters based on the features of the pixel. If the deviance is low, the pixel and the cluster have similar features. Namely, it can be determined that the pixel and the cluster are the same.

The pixel values (Ri, Gi, Bi) of a pixel i represent the features of this pixel. The averaged pixel values (Rc, Gc, Bc) of all pixels belonging to cluster c represent the features of this cluster. For example, the deviance is equal to an euclidean distance $\sqrt{\{(Rc-Ri)^2+(Gc-Gi)^2+(Bc-Bi)^2\}}$ on the color space between features values of the pixel i and features values of the cluster c.

Although the present embodiment uses RGB values in the calculation of the deviance, information of another color space or information not related to colors can represent the feature quantity of the pixel. The processing of step 1201 includes registering the number of a cluster that minimizes the deviance value and comparing the deviance value with a predetermined threshold. If the deviance value is less than the threshold, an object pixel belongs to the registered cluster. If the deviance value is equal to or greater than the threshold, a new cluster is generated based on the object pixel. The above-described processing is repeatedly executed until the processing of all pixels completes.

In step S1202, the region dividing unit 121 performs region integration processing based on the clustering processing result. The region integration processing includes inputting a target value representing the number of separated regions, counting the number of present clusters, and comparing the counted cluster number with the target value. In the present embodiment, the target value can be determined considering the number of colors to be separated. If the number of present clusters is equal to or greater than the target value, the region dividing unit 121 integrates the clusters. The region integration processing includes calculating the deviance value between clusters and integrating two clusters having the lowest deviance. The region integration processing is repeatedly executed until the number of present clusters becomes less than the target value.

In step S1203, the region dividing unit 121 performs noise region determination processing based on the region integration processing result. The noise region determination processing includes labeling the region dividing processing result and calculating the size of each label region. The size of a label region is equal to the number of pixels involved in the object region. If the size of a label region is less than a threshold, the region dividing unit 121 determines that this region is a noise region.

In step S1204, the region dividing unit 121 calculates the deviance of each pixel in the noise region relative to neighboring regions and performs noise region reprocessing so that a processing object pixel belongs to a region having the lowest deviance. The noise region determination processing is repeatedly executed until the processing of all label regions completes. The graphics regions, resulting from the region division of a document image, can be compressed before they are stored. The above-described noise region determination processing and the noise region reprocessing are effective to remove the noise which may be generated in the compression process.

As described above, the region dividing unit 121 can divide a color image into a plurality of regions which are serially joined on the image. Each region has the same or consistent features (having a deviance value not less than the threshold).

<Boundary Point Extracting Processing>

The horizontal boundary point extracting processing in step S21, the vertical boundary point extracting processing in step S23, and the diagonal boundary point extracting processing in step S25 are described below in detail with reference to FIG. 3.

The boundary point extracting processing includes scanning the region division result in the horizontal direction (→) and extracting pixels representing a boundary between two regions on each horizontal scanning line as horizontal boundary points. FIG. 3 illustrates an exemplary image including five regions of region 1 (background), region 2, region 3, region 4, and region 5.

As illustrated in FIG. 3, the horizontal scanning operation on the 10th row detects point B where the region number changes from 1 to 2. The detected point B is recorded as a horizontal boundary point. Similarly, the horizontal scanning operation on the 14th row detects point A which is recorded as a horizontal boundary point. Furthermore, the horizontal scanning operation successively detects point C on the 22nd row, point E on the 38th row, point F on the 44th row, points H and I on the 64th row which are recorded as horizontal boundary points.

The boundary point extracting processing includes scanning the region division result in the vertical direction (↓) and extracting pixels representing a boundary between two regions on each vertical scanning line as vertical boundary points.

As illustrated in FIG. 3, the vertical scanning operation successively detects point D on the 10th column, point A on the 15th column, point B on the 20th column, point F on the 24th column, points E and C on the 40th column, point H on the 58th column, and point I on the 66th column which are recorded as vertical boundary points.

Furthermore, the boundary point extracting processing includes scanning the region division result in the diagonal direction and extracting pixels representing a boundary between two regions on each diagonal scanning line as diagonal boundary points.

As illustrated in FIG. 3, the diagonal scanning operation detects point A on the 14th row and 15th column where the region number changes from 1 to 2. The detected point A is recorded as a diagonal boundary point. Similarly, the diagonal scanning operation successively detects points B, J, C, K, E, G, D, H, and I which are recorded as diagonal boundary points.

Hereinafter, some of the boundary points are described. FIGS. 50A through 50E illustrate exemplary extraction of horizontal, vertical, and diagonal boundary points along a boundary line connecting the points B and A.

In FIG. 50A, pixel (1) represents a pixel belonging to the region 1 and pixel (2) represents a pixel belonging to the region 2. In FIG. 50B, pixel (1) with a hatching pattern represents a horizontal boundary point extracted as a portion where the region number has first changed in the horizontal boundary point extracting processing.

In FIG. 50C, pixel (1) with a hatching pattern represents a vertical boundary point extracted in the vertical boundary point extracting processing. In FIG. 50D, pixel (1) with a hatching pattern represents a diagonal boundary point extracted in the diagonal boundary point extracting processing.

In FIG. 50E, pixel (1) with a hatching pattern represents a boundary point extracted in any one of the horizontal boundary point extracting, the vertical boundary point extracting, and the diagonal boundary point extracting processing. These boundary points are in a four-serially joined state.

To more specifically describe the boundary line image generation according to the first exemplary embodiment, the horizontal boundary point extracting processing, the vertical boundary point extracting processing, and the diagonal boundary point extracting processing are described in more detail with reference to FIGS. 51A through 51F.

FIG. 51A illustrates four rectangular regions as a region division result. FIG. 51B illustrates pixels positioned along boundary lines of FIG. 51A.

FIG. 51C illustrates horizontal boundary points (with a hatching pattern) extracted from FIG. 51B as a result of the horizontal boundary point extracting processing.

FIG. 51D illustrates vertical boundary points (with a hatching pattern) extracted from FIG. 51B as a result of the vertical boundary point extracting processing.

FIG. 51E illustrates diagonal boundary points (with a hatching pattern) extracted from FIG. 51B as a result of the diagonal boundary point extracting processing.

FIG. 51F illustrates all boundary points extracted from any one of the horizontal, vertical, and diagonal boundary point extracting processing. These boundary points are in a four-serially joined state.

<Intersection Extracting Processing>

Figure 52:
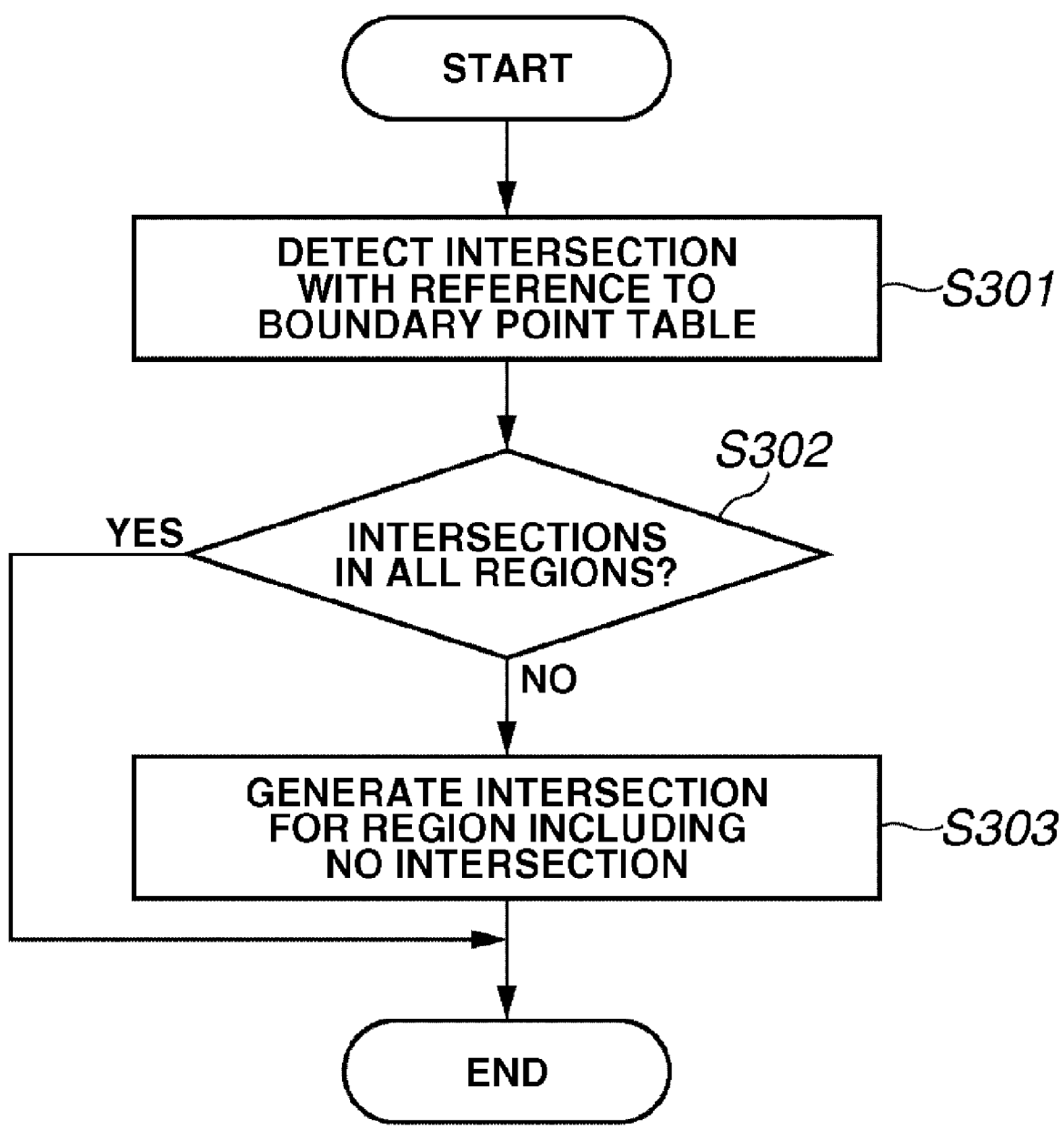
FIG. 52 is a flowchart illustrating details of intersection extracting processing in step S30 of FIG. 10 according to the first exemplary embodiment of the present invention.

FIG. 52 is a flowchart illustrating details of the intersection extracting processing in step S30 according to the first exemplary embodiment of the present invention.

In step S301, the intersection identifying unit 221 refers to the horizontal boundary point table 401 generated in step S22, the vertical boundary point table 402 generated in step S24, and the diagonal boundary point table 403 generated in step S26. The intersection identifying unit 221 detects boundary points having three or more neighboring region numbers, as intersections, from the boundary points existing in at least two of the three tables 401 to 403.

The boundary points existing in at least two of the three tables are any one of the boundary point serving as a horizontal boundary point and a vertical boundary point, the boundary point serving as a horizontal boundary point and a diagonal boundary point, the boundary point serving as a vertical boundary point and a diagonal boundary point, and the boundary point serving as a horizontal boundary point, a vertical boundary point, and a diagonal boundary point.

FIG. 5 illustrates exemplary extraction of intersections from the horizontal boundary point table 401, the vertical boundary point table 402, and the diagonal boundary point table 403 of FIG. 4, each of which includes the boundary points extracted from the region division result illustrated in FIG. 3.

The boundary point C is present in all of the three boundary point tables. The neighboring region numbers of the boundary point C in the horizontal direction are 2 and 3. The neighboring region numbers of the boundary point C in the vertical direction are 1 and 2. The neighboring region numbers of the boundary point C in the diagonal direction are 1 and 2. In other words, the point C has three neighboring region numbers and is extracted as an intersection.

Similarly, points E, F, and G are intersections. However, the remaining points A, B, D, H, and I are not intersections because the neighboring region numbers in the horizontal direction, the neighboring region numbers in the vertical direction, and the neighboring region numbers in the diagonal direction are the same.

FIG. 53A illustrates exemplary extraction of intersections from the region division result of FIG. 51A. FIG. 53A includes boundary point tables 401 to 403 generated through boundary point table generation processing in each direction applied to boundary points extracted in the boundary point extracting processing in respective (horizontal, vertical, and diagonal) directions. Any boundary point existing on at least two of the horizontal boundary point table 401, the vertical boundary point table 402, and the diagonal boundary point table 403 is marked with an individual line.

FIG. 53B illustrates an exemplary table of intersections (i.e., boundary points having three or more neighboring region numbers) detected from the boundary points marked in FIG. 53A, which is equivalent to the intersection table 601 of FIG. 6. FIG. 53C illustrates a rectangular gray pattern including the intersections of FIG. 53B.

In step S302, the intersection identifying unit 221 determines whether all region numbers are included in the neighboring region numbers of any one of the intersections extracted in step S301. If all region numbers are included (YES in step S302), the intersection identifying unit 221 determines that intersections are present in all regions and terminates the intersection extracting processing.

If there is any region number not included in the neighboring region numbers of the intersections (NO in step S302), the intersection identifying unit 221 determines that this region does not have a plurality of neighboring regions and no intersection has been detected in the processing of step S301.

According to the example of FIG. 3, the neighboring region numbers of the intersections C, E, F, and G extracted in step S301 include region numbers 1 to 4. The boundary points of the regions 1 to 4 include intersections. However, there is no intersection including the region number 5 as a neighboring region number. Thus, the intersection identifying unit 221 determines that the region 5 is an independent region because there is no intersection between the region 5 and another region.

In step S303, the intersection identifying unit 221 refers to the horizontal boundary point table 401 generated in step S22, the vertical boundary point table 402 generated in step S24, and the diagonal boundary point table 403 generated in step S26, and selects two boundary points including the region number corresponding to the region having no intersection determined in step S302. Namely, the intersection identifying unit 221 generates intersections for the region having no intersection determined in step S302.

For example, the intersection identifying unit 221 selects the boundary points H and I that have two neighboring region numbers including the region 5 with reference to the horizontal boundary point table 401, the vertical boundary point table 402, and the diagonal boundary point table 403 illustrated in FIG. 4. The intersection identifying unit 221 designates the selected boundary points H and I as intersections of the region 5.

Alternatively, the intersection identifying unit 221 can search all boundary points from the beginning on each of the horizontal boundary point table 401, the vertical boundary point table 402, and the diagonal boundary point table 403 illustrated in FIG. 4. Then, the intersection identifying unit 221 can select a first boundary point satisfying the conditions (i.e., a boundary point including the region 5 as a neighboring region number) and a second boundary point that is most spaced from the first boundary point among other boundary points satisfying the conditions.

As described above, the first exemplary embodiment divides an image into plural regions based on the deviance obtainable from the features between pixels in the vector generation processing. Furthermore, the first exemplary embodiment generates contour point information indicating the direction of an inter-edge point vector connecting two intersections (edge points of a boundary) as region boundary information relating to a boundary between neighboring regions.

Then, the first exemplary embodiment identifies an inter-edge point vector representing a boundary of divided regions based on the contour point information. More specifically, the first exemplary embodiment obtains a positional relationship between inter-edge point vectors based on the contour point information and identifies the inter-edge point vector representing the boundary of divided regions. Thus, the first exemplary embodiment can accurately and appropriately generate vector data representing a region that does not generate a clearance or an overlap between regions.

Second Exemplary Embodiment

Figure 54:
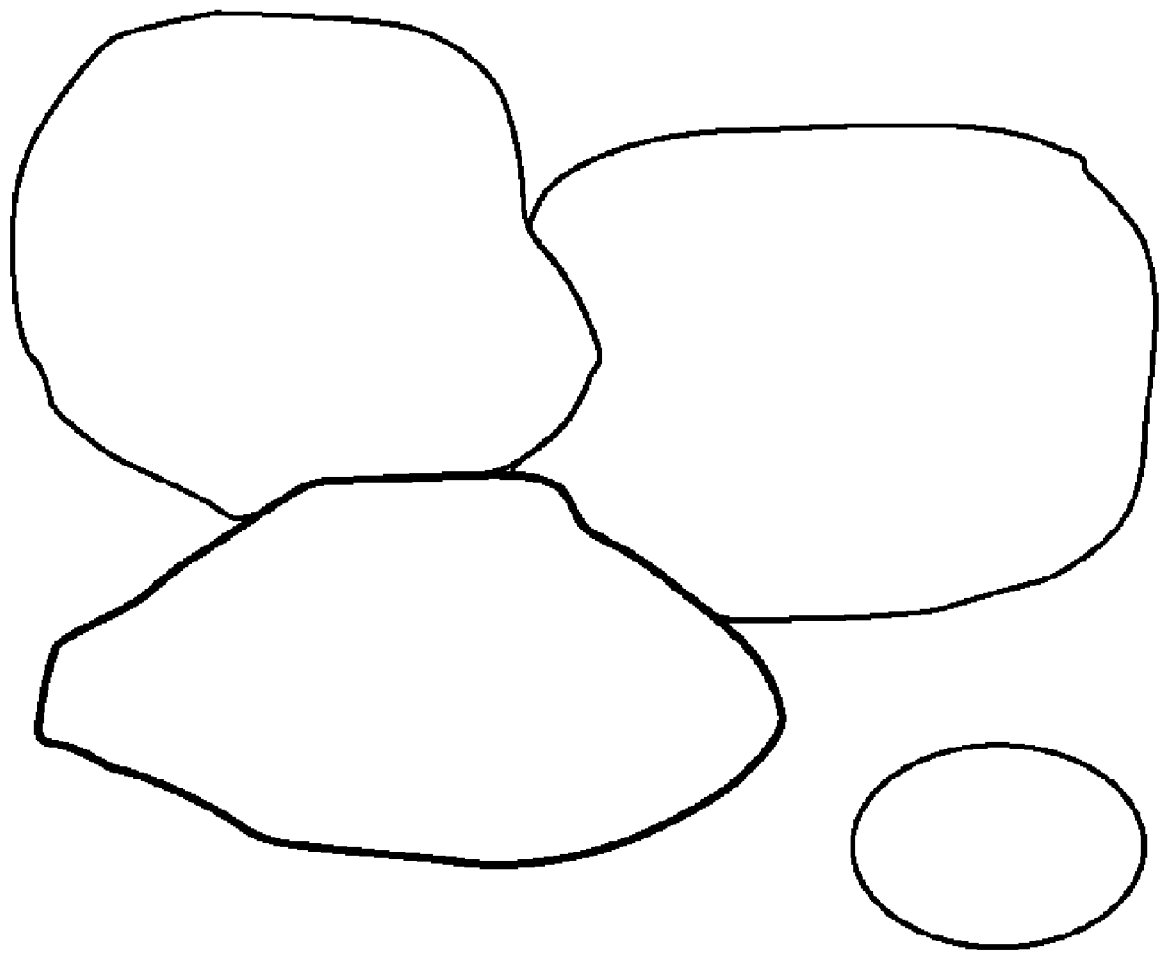
FIG. 54 illustrates an image including a thin line image representing all boundary lines according to the first exemplary embodiment of the present invention.

A second exemplary embodiment of the present invention generates a thin line image including images of all boundary lines as illustrated in FIG. 54, newly detects intersections for vector extraction based on the generated image, and collectively generates a vector group.

Figure 55:
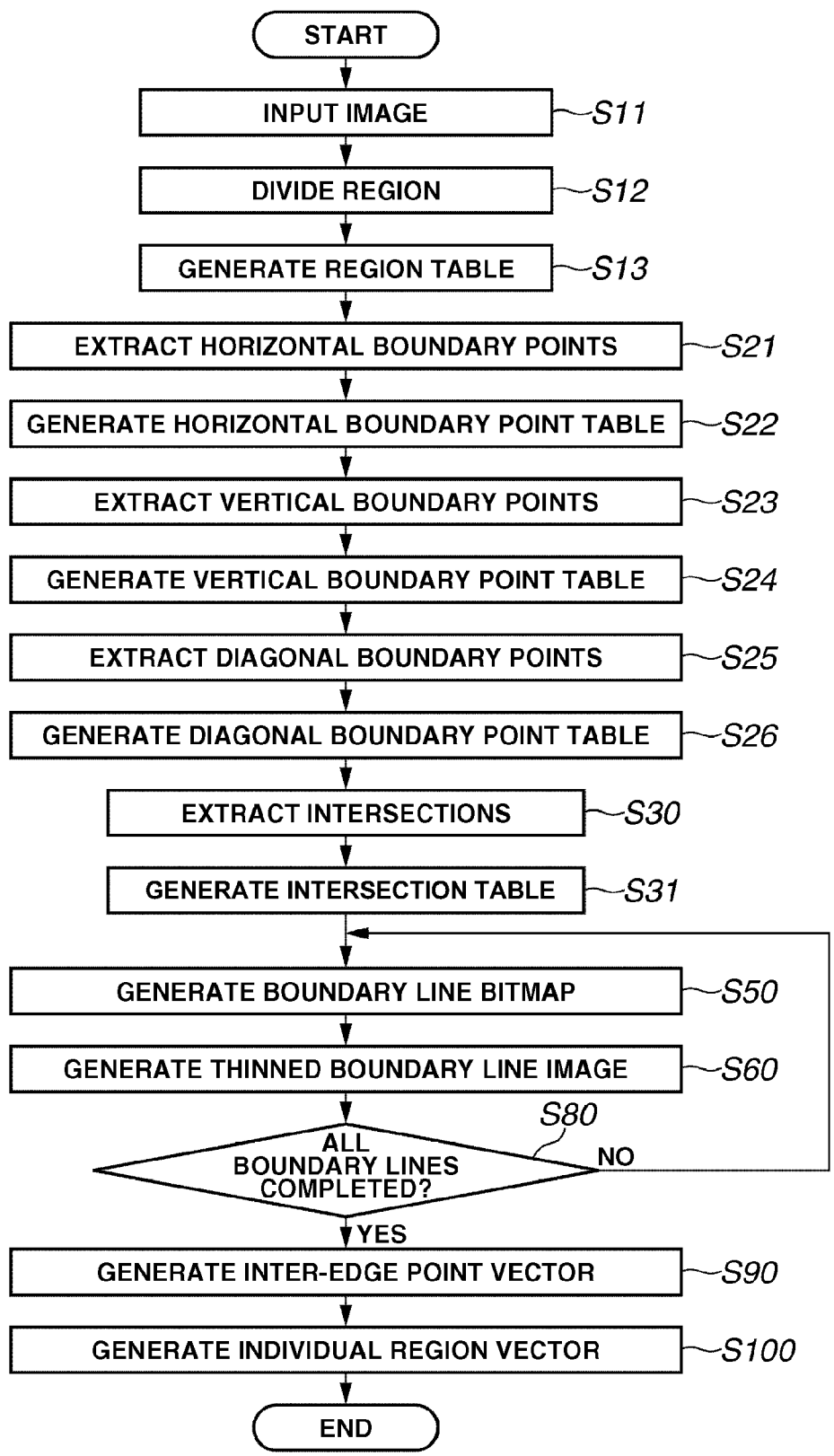
FIG. 55 is a flowchart illustrating an operation of an image processing apparatus according to a second exemplary embodiment of the present invention.

FIG. 55 is a flowchart illustrating an operation of an image processing apparatus according to the second exemplary embodiment of the present invention.

The flowchart of FIG. 55 according to the second exemplary embodiment is different from the flowchart of FIG. 10 according to the first exemplary embodiment in the processing order of the inter-edge point vector generation processing. FIG. 10 includes the inter-edge point vector generation processing (step S70) located in the processing loop of steps S50 through S80, while FIG. 55 includes the inter-edge point vector generation processing (step S90) located out of the processing loop of steps S50 through S80. Namely, after the thin line image of FIG. 54 is generated, intersections for vector extraction are newly detected based on the generated image, and a vector group is collectively generated.

In the inter-edge point vector generation processing in step S90 (which is similar to the inter-edge point vector generation processing in step S70 of FIG. 10), the inter-edge point vector generating unit 30 extracts an intersection portion as an edge point as described in the first exemplary embodiment. Therefore, similar to the first exemplary embodiment, an image including an assembly of inter-edge point smoothed (non-surrounding) vector sequence can be generated as illustrated in FIG. 45 or FIG. 46.

Namely, the intersections extracted in step S30 or each intersection in the image of a boundary line connecting intersections generated in step S50 are identified as intersections of an inter-edge point smoothed (non-surrounding) vector sequence in the inter-edge point vector generation processing of step S90. Then, the inter-edge point vector generating unit 30 collectively generates an inter-edge point vector group connecting the intersections. The processing in step S100 is similar to that described in the first exemplary embodiment.

As described above, in addition to the effects described in the first exemplary embodiment, the second exemplary embodiment can generate an inter-edge point vector group based on a thin line image including images of all boundary lines, and can generate an individual region vector based on the generated inter-edge point vector group. Thus, the second exemplary embodiment can efficiently generate an individual region vector.

Third Exemplary Embodiment

A third exemplary embodiment of the present invention enables a user to designate a division region to be subjected to the vector generation processing, via the communication I/F 4 of the image processing apparatus, or using an user interface (UI) of a pointing device (not illustrated).

In this case, in step S1010 of the flowchart illustrated in FIG. 47, the region boundary vector sequence identifying unit 410 inputs a division region to be subjected to the vector processing based on a user's instruction which may be entered via the communication I/F 4 or the UI, without automatically inputting target region numbers from the table 201 illustrated in FIG. 2. Then, the region boundary vector sequence identifying unit 410 applies the vector generation processing (i.e., individual region vector generation processing) to only the designated division region. For example, if a user designates three regions 2, 3, and 5 from the five division regions illustrated in FIGS. 2 and 3, the region boundary vector sequence identifying unit 410 generates an individual region vector for each of the designated regions 2, 3, and 5.

Figure 56:
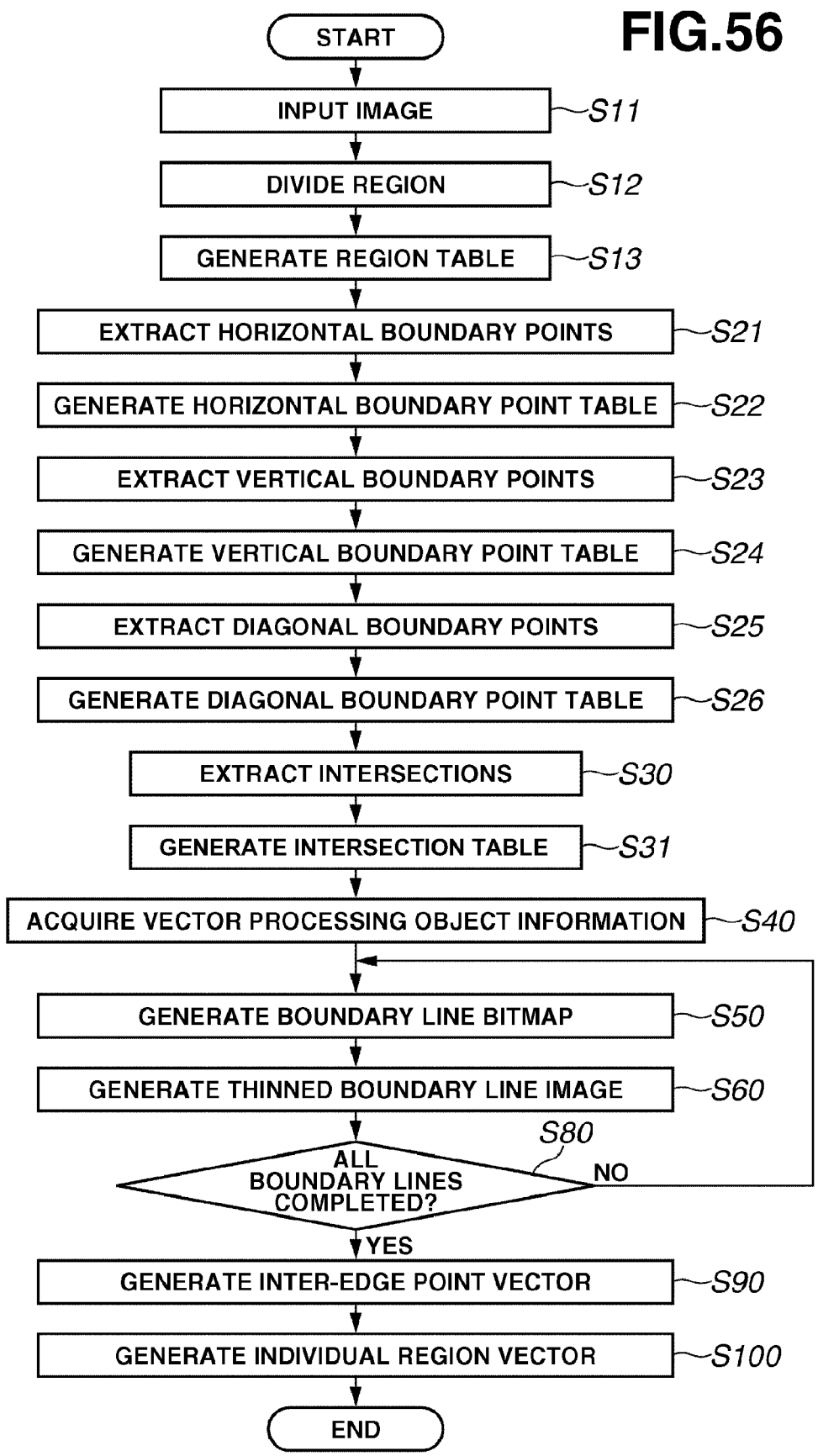
FIG. 56 is a flowchart illustrating an operation of an image processing apparatus according to a third exemplary embodiment of the present invention.
Figure 57:
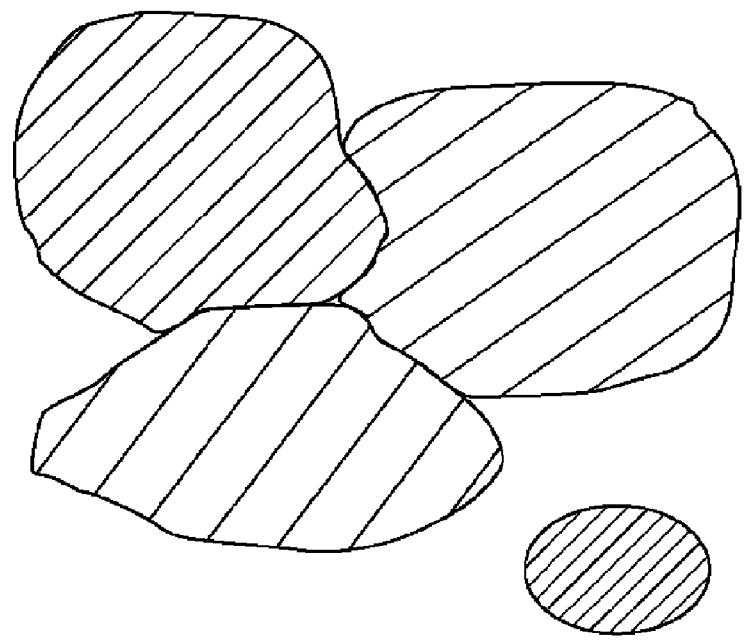
FIG. 57 illustrates an example of a processing object image.
Figure 58:
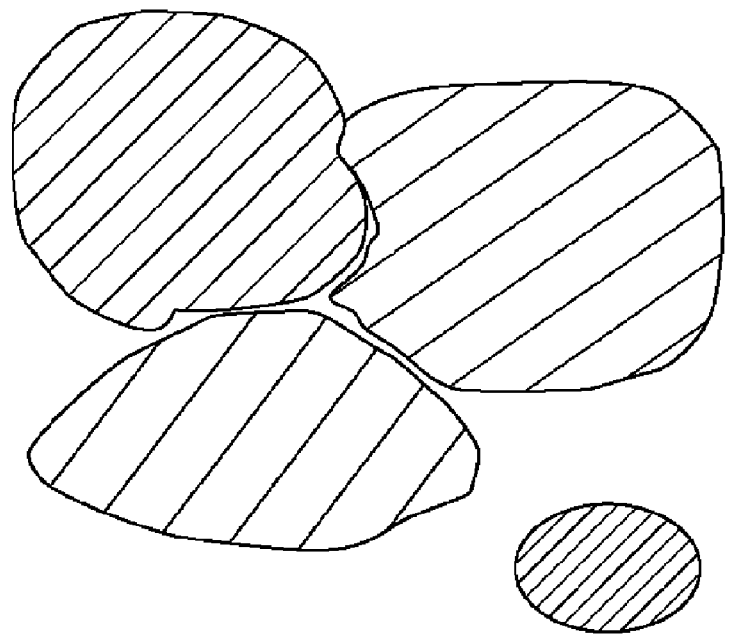
FIG. 58 illustrates an image including defects according to a conventional technique.

FIG. 56 is a flowchart illustrating an operation of an image processing apparatus according to the third exemplary embodiment of the present invention.

The flowchart of FIG. 56 includes step S40 that acquires vector processing object region information (target region number) to limit the division region(s) to be subjected to the above-described vector generation processing. The flowchart of FIG. 56 is similar to the flowchart of FIG. 55, except for the processing in step S40. Namely, the third exemplary embodiment is different from the above-described first and second exemplary embodiments in that a sequential operation of steps S50 through S100 is performed for only the region(s) designated in the vector processing object region information acquired in step S40.

As described above, in addition to the effects of the first exemplary embodiment, the third exemplary embodiment enables a user to designate a target region in an image as a processing object. The third exemplary embodiment can generate a region vector for a limited number of target region(s). The third exemplary embodiment can efficiently generate a region vector of a required region considering the use of purpose.

The present invention can be embodied as a system, an apparatus, a method, a program, or a storage medium. The present invention can be applied to a system including plural devices or can be applied to a single apparatus.

Furthermore, software program code for realizing the functions of the above-described exemplary embodiments (i.e., software program code corresponding to the flowcharts in the above-described exemplary embodiments) can be supplied to a system or an apparatus including various devices. A computer (or CPU or micro-processing unit (MPU)) in the system or the apparatus can execute the program to operate the devices to realize the functions of the above-described exemplary embodiments.

Accordingly, the present invention encompasses the program code installable on a computer when the functions or processes of the exemplary embodiments can be realized by the computer. In this case, the program code itself can realize the functions of the exemplary embodiments. The equivalents of programs can be used if they possess comparable functions. Furthermore, the present invention encompasses supplying program code to a computer with a storage (or recording) medium storing the program code.

In this case, the type of program can be any one of object code, interpreter program, and OS script data. A storage medium supplying the program can be, for example, selected from any one of a floppy disk, a hard disk, an optical disk, a magneto-optical (MO) disk, a compact disk—ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users.

The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-335070 filed Dec. 12, 2006, which is hereby incorporated by reference herein in its entirety.

What is claimed is:

1. An image processing apparatus configured to execute processing for generating a vector sequence representing an image, the image processing apparatus comprising at least one processor which executes a program stored in a memory, wherein the at least one processor functions as:
    a dividing unit configured to divide the image into a plurality of regions based on attribute information of the image;
    an extracting unit configured to extract region boundary information relating to a boundary line between regions divided by the dividing unit;
    an intersection information generating unit configured to identify intersections of different boundaries of the divided regions based on the region boundary information extracted by the extracting unit;
    an inter-edge point vector generating unit configured to generate inter-edge point vector data for each boundary connecting edge points corresponding to the intersections identified by the intersection information generating unit; and
    an individual region vector generating unit configured to generate vector data of each region divided by the dividing unit based on the inter-edge point vector data generated by the inter-edge point vector generating unit.

2. The image processing apparatus according to claim 1, wherein the individual region vector generating unit comprises:
    an identifying unit configured to identify at least one inter-edge point vector data constituting a boundary of each region divided by the dividing unit from the inter-edge point vector data generated by the inter-edge point vector generating unit, based on attribute information of the regions divided by the dividing unit; and
    an allocating unit configured to allocate attribute information to a region constituted by the inter-edge point vector data identified by the identifying unit,
    wherein the individual region vector generating unit generates, as vector data of one region, the attribute information allocated to the region constituted by the inter-edge point vector data identified by the identifying unit and the inter-edge point vector data constituting the region.

3. The image processing apparatus according to claim 1, wherein the region boundary information includes information relating to pixels representing a boundary of different neighboring regions.

4. The image processing apparatus according to claim 1, wherein the intersection information generating unit identifies intersections of boundaries of different regions based on the region boundary information extracted by the extracting unit, and generates intersection information indicating the identified intersections.

5. The image processing apparatus according to claim 4, wherein the individual region vector generating unit generates the vector data of each region based on the intersection information generated by the intersection information generating unit.

6. The image processing apparatus according to claim 1, wherein the dividing unit performs clustering of pixels in the image based on a deviance in features between the pixels in the image, and divides the image into a plurality of regions based on the cluster obtained by the clustering.

7. The image processing apparatus according to claim 1, wherein the inter-edge point vector generating unit generates the inter-edge point vector data from an image including boundary lines connecting edge points generated based on the region boundary information extracted by the extracting unit.

8. The image processing apparatus according to claim 1, wherein the inter-edge point vector generating unit generates images of all boundary lines based on the region boundary information extracted by the extracting unit, and generates the inter-edge point vector data based on the generated boundary line images and the edge points.

9. The image processing apparatus according to claim 1, further comprising a designating unit configured to designate a processing object region in the image.

10. The image processing apparatus according to claim 1, wherein the attribute information of the image includes color information of the image, and
    wherein the dividing unit divides the image into a plurality of different color regions based on the color information of the image.

11. A method for controlling an image processing apparatus configured to execute processing for generating a vector sequence representing an image, the method comprising:
    dividing the image into a plurality of regions based on attribute information of the image;
    extracting region boundary information relating to a boundary line between divided regions;
    identifying intersections of different boundaries of the divided regions based on the extracted region boundary information;
    generating inter-edge point vector data for each boundary connecting edge points corresponding to the identified intersections; and
    generating vector data of each divided region based on the generated inter-edge point vector data.

12. A non-transitory computer readable storage medium storing instructions for causing a computer to execute processing for generating a vector sequence representing an image, the instructions comprising:

computer-executable instructions for dividing the image into a plurality of regions based on attribute information of the image;
computer-executable instructions for extracting region boundary information relating to a boundary line between divided regions;
computer-executable instructions for identifying intersections of different boundaries of the divided regions based on the extracted region boundary information;
computer-executable instructions for generating inter-edge point vector data for each boundary connecting edge points corresponding to the identified intersections; and
computer-executable instructions for generating vector data of each divided region based on the generated inter-edge point vector data.

* * * * *